(12) United States Patent
Chae

(10) Patent No.: US 11,467,604 B2
(45) Date of Patent: Oct. 11, 2022

(54) CONTROL DEVICE AND METHOD FOR A PLURALITY OF ROBOTS

(71) Applicant: LG ELECTRONICS INC., Seoul (KR)

(72) Inventor: Jonghoon Chae, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 64 days.

(21) Appl. No.: 16/927,922

(22) Filed: Jul. 13, 2020

(65) Prior Publication Data

US 2021/0200239 A1 Jul. 1, 2021

(30) Foreign Application Priority Data

Dec. 30, 2019 (KR) .......... 10-2019-0177765

(51) Int. Cl.
*G05D 1/02* (2020.01)
*B25J 9/16* (2006.01)
*G05D 1/00* (2006.01)

(52) U.S. Cl.
CPC .......... *G05D 1/0287* (2013.01); *B25J 9/1664* (2013.01); *G05D 1/0088* (2013.01)

(58) Field of Classification Search
CPC .. G05D 1/0287; G05D 1/0088; G05D 1/0027; G05D 1/0246; G05D 2201/0211; B25J 9/1664; B25J 9/161; B25J 9/1669; B25J 9/1682; B25J 9/1697
See application file for complete search history.

(56) References Cited

U.S. PATENT DOCUMENTS

| 2018/0068514 A1* | 3/2018 | Li ............................ G07F 9/002 |
| 2019/0197885 A1* | 6/2019 | Matsuoka ........ G08G 1/096811 |
| 2020/0053324 A1* | 2/2020 | Deyle .................... H04N 7/185 |
| 2021/0137438 A1* | 5/2021 | Salfity .................... A61B 5/165 |

* cited by examiner

*Primary Examiner* — Abby Y Lin
*Assistant Examiner* — Dylan M Katz
(74) *Attorney, Agent, or Firm* — Lee Hong Degerman Kang Waimey

(57) ABSTRACT

Disclosed is a device and method of controlling a plurality of robots. According to an embodiment, a device and method of controlling a plurality of robots periodically measures variations in the density of people per unit quarter and deploys a robot, which is positioned close to a high-density unit quarter and has a low workload, in the unit quarter. According to an embodiment, the artificial intelligence (AI) module may be related to unmanned aerial vehicles (UAVs), robots, augmented reality (AR) devices, virtual reality (VR) devices, and 5G service-related devices.

18 Claims, 31 Drawing Sheets

[FIG. 1]
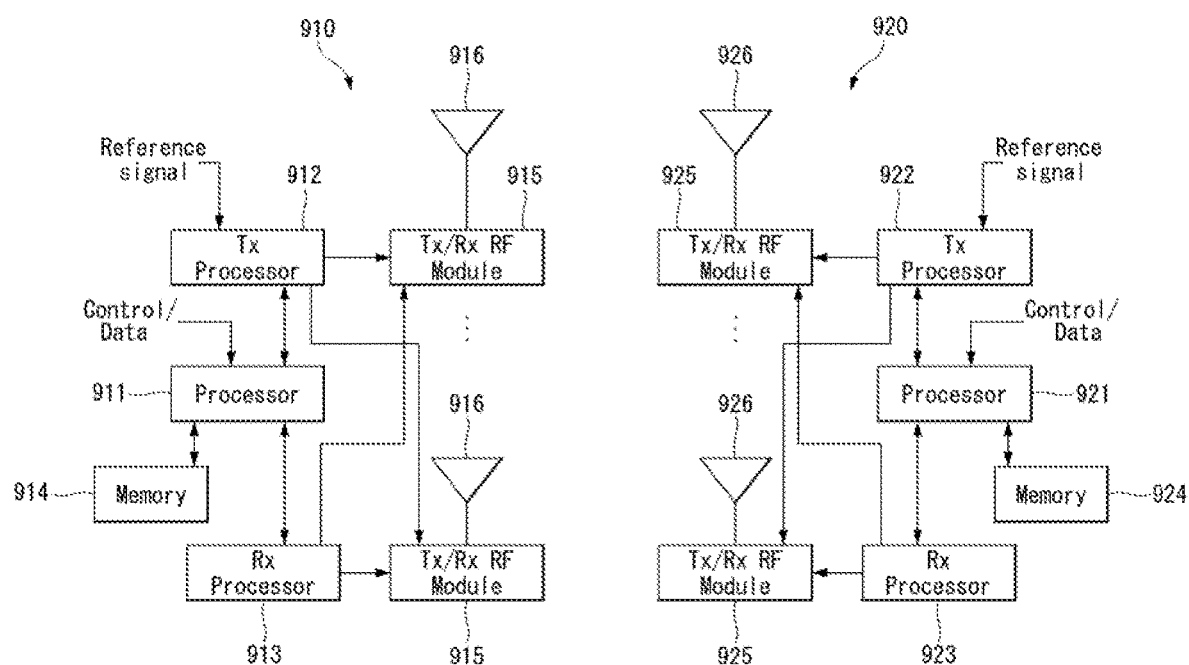

[FIG. 2]
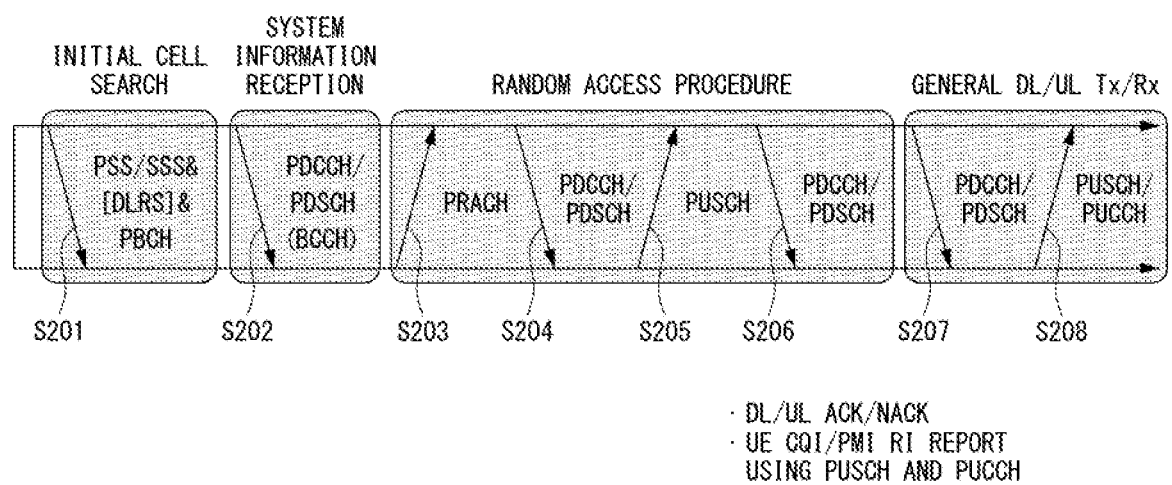

[FIG. 3]
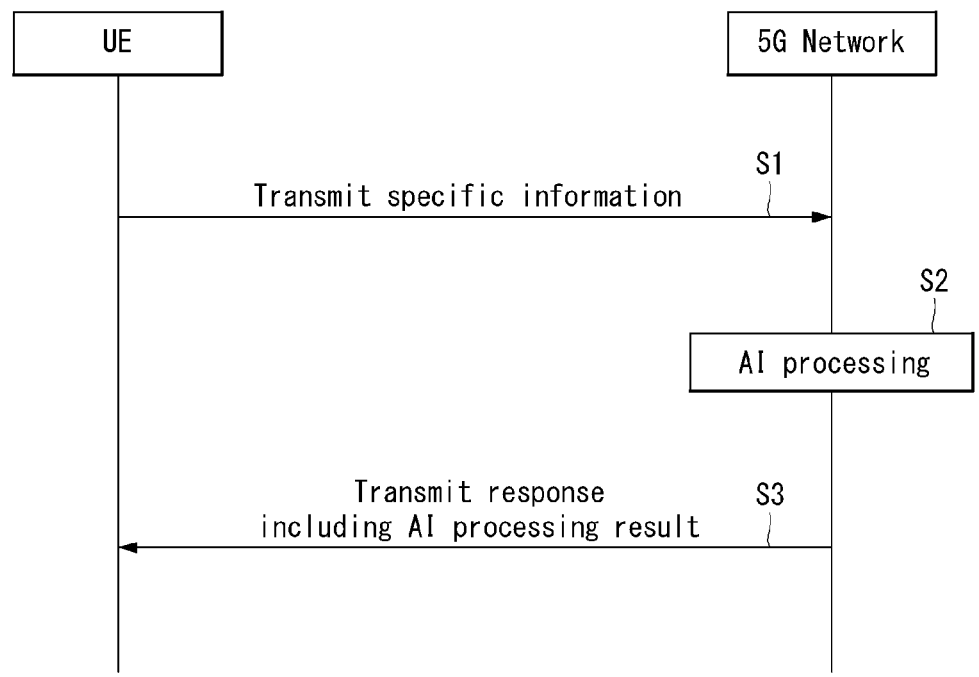

[FIG. 4]
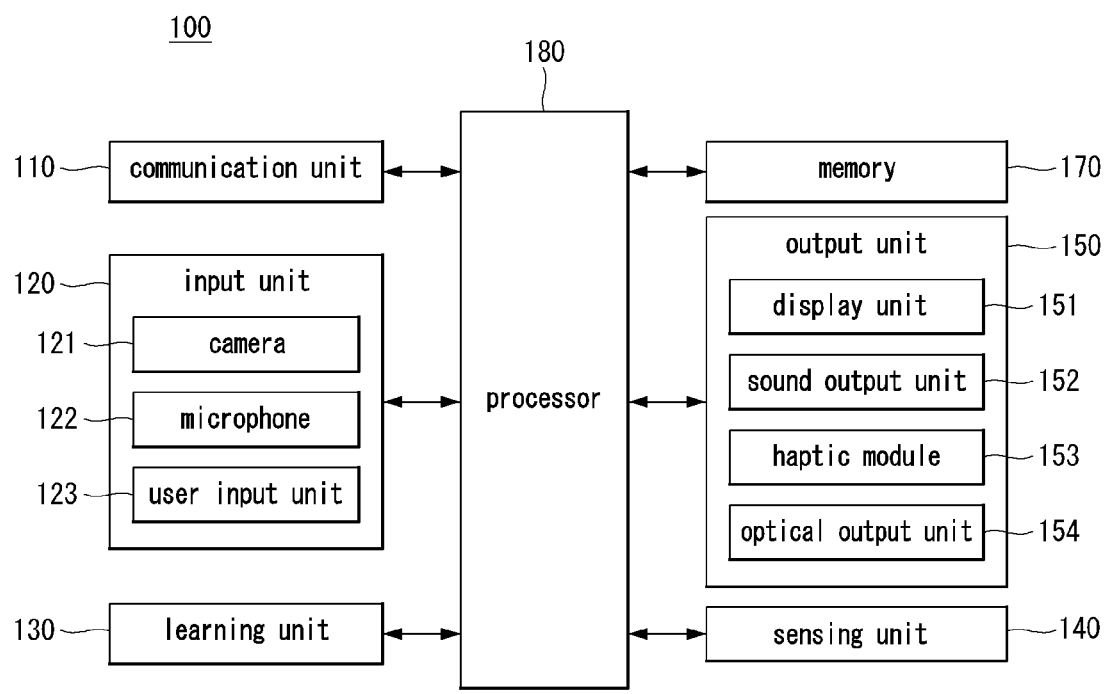

[FIG. 5]
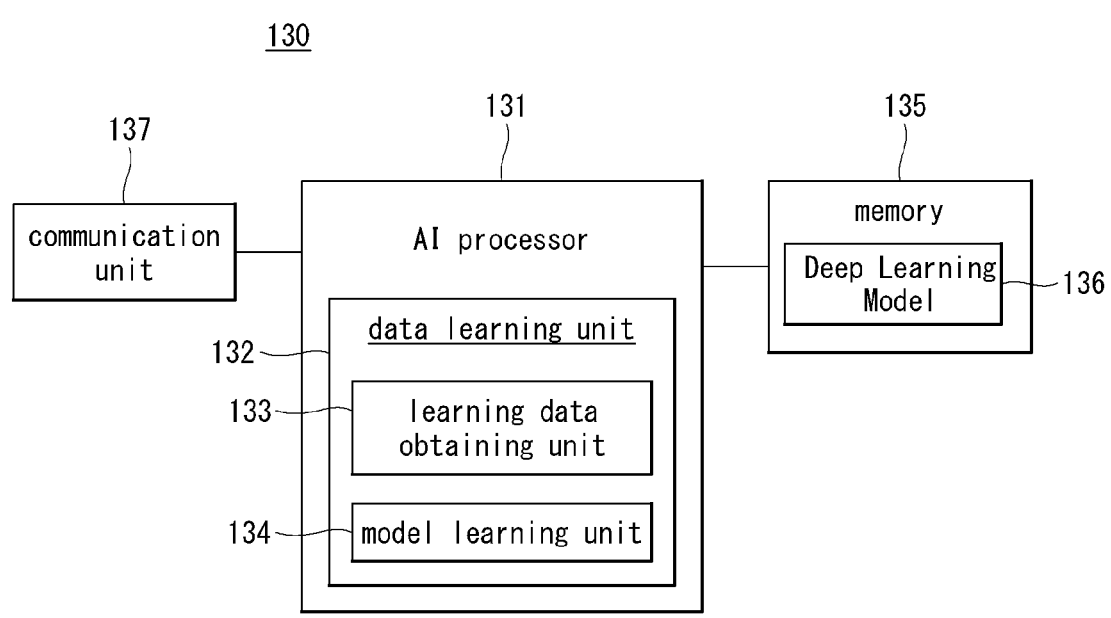

[FIG. 6]
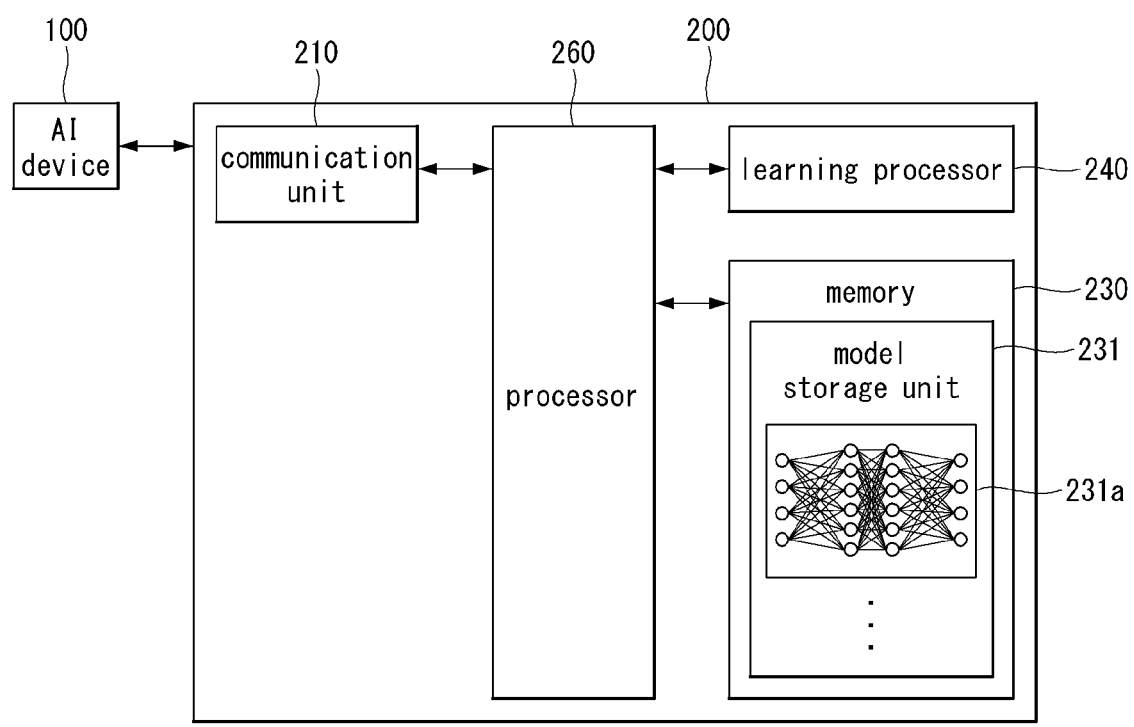

[FIG. 7]
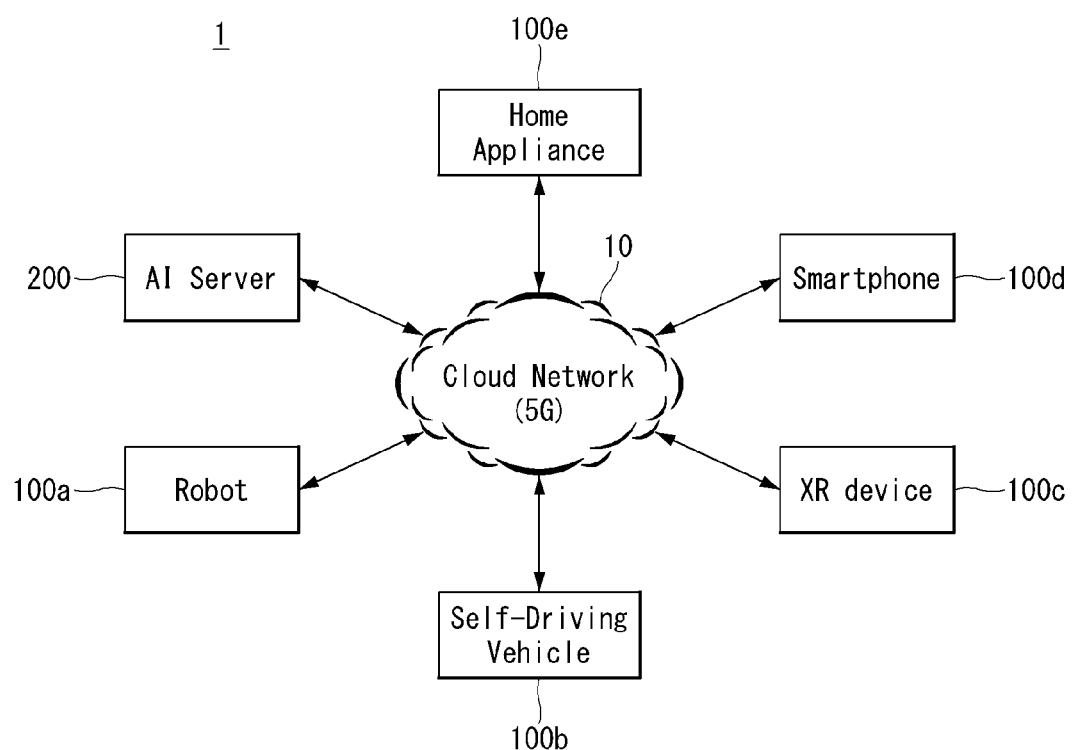

[FIG. 8]
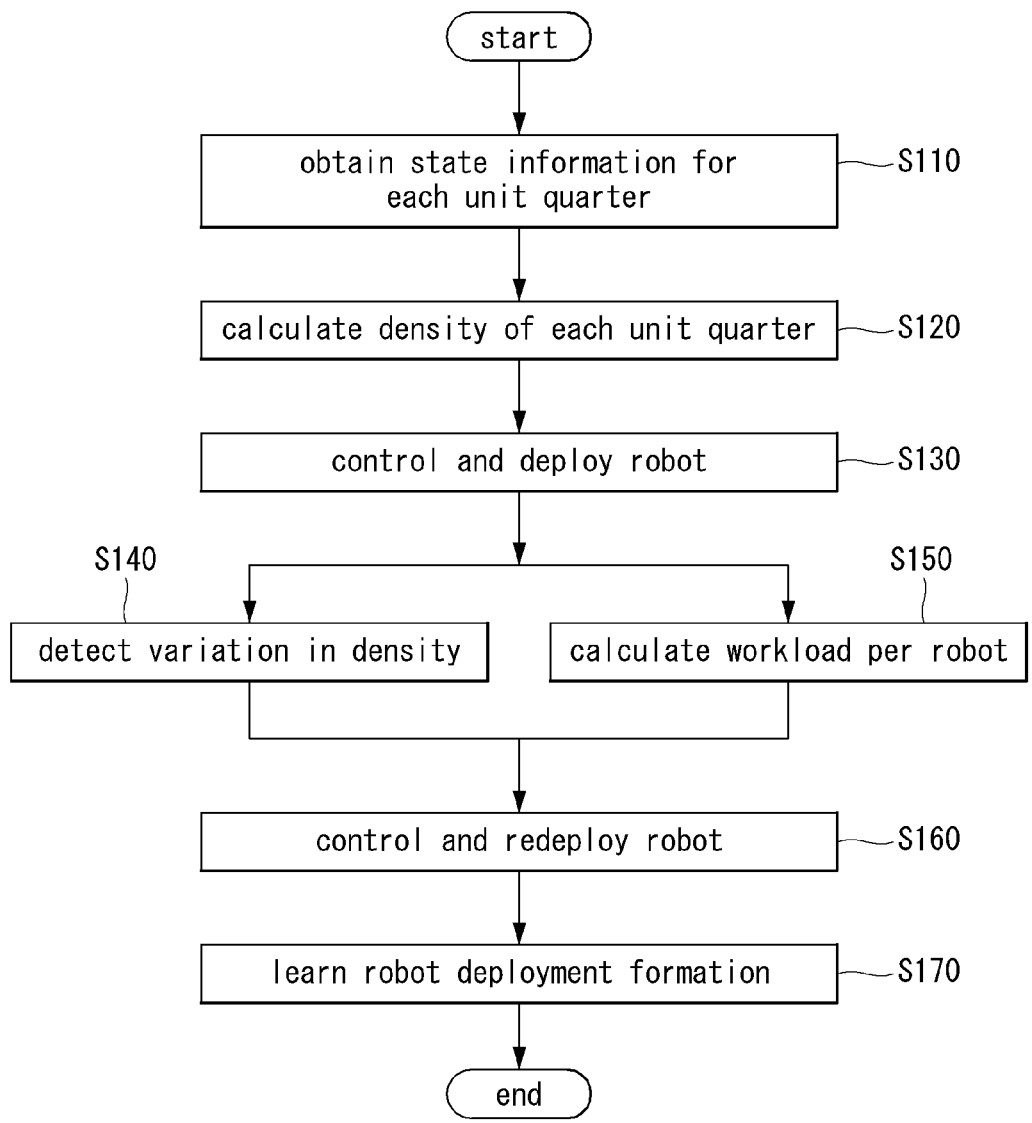

[FIG. 9]
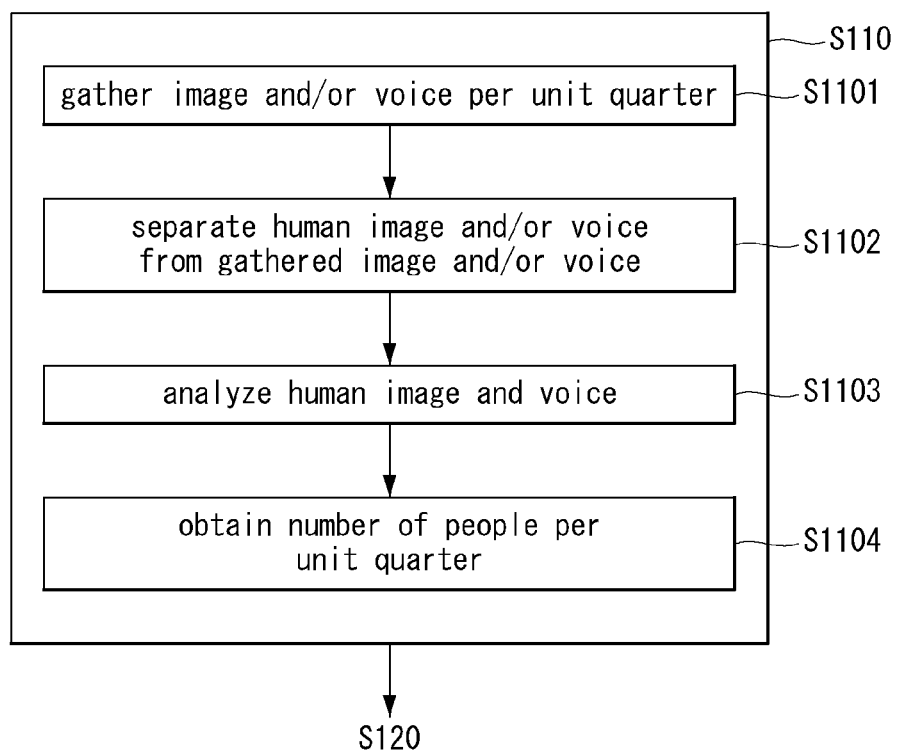

[FIG. 10]
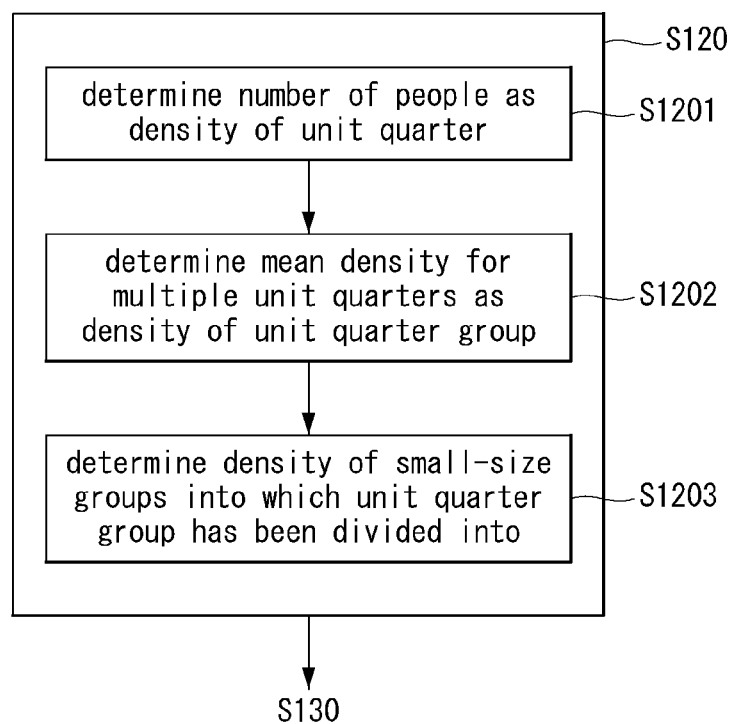

| 601 | 602 | 603 | 604 | 605 |
|---|---|---|---|---|
| 1 | 3 | 0 | 2 | 5 |
| 4 | 3 | 2 | 1 | 8 |
| 0 | 8 | 2 | 1 | 7 |
| 5 | 3 | 2 | 5 | 2 |
| 2 | 4 | 1 | 2 | 1 |

[FIG. 12]
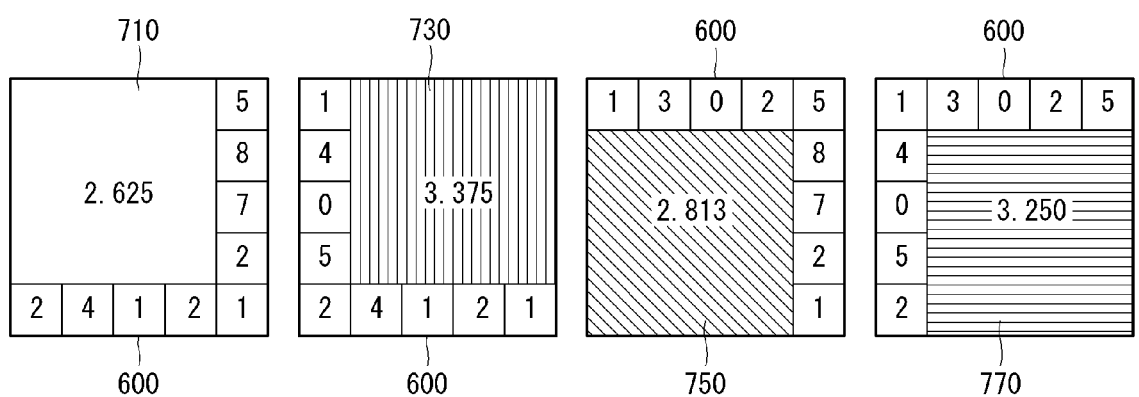

[FIG. 13]
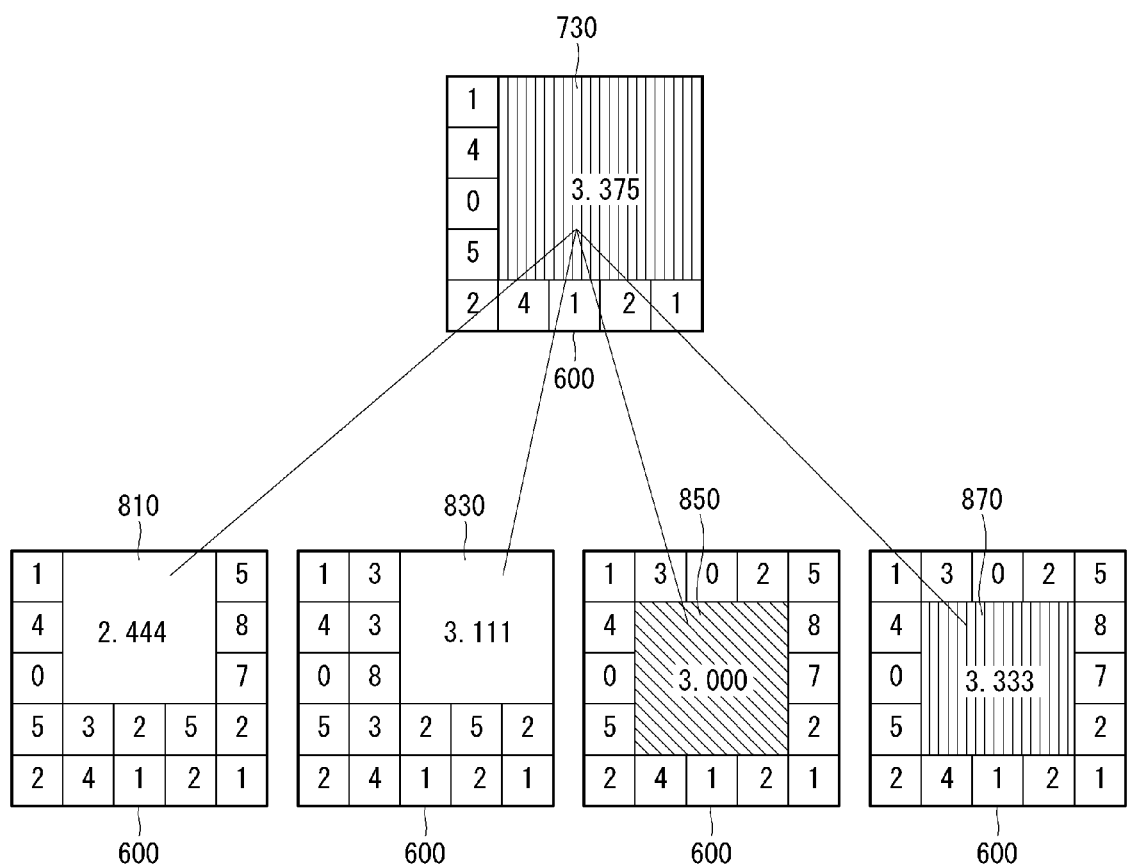

【FIG. 14】
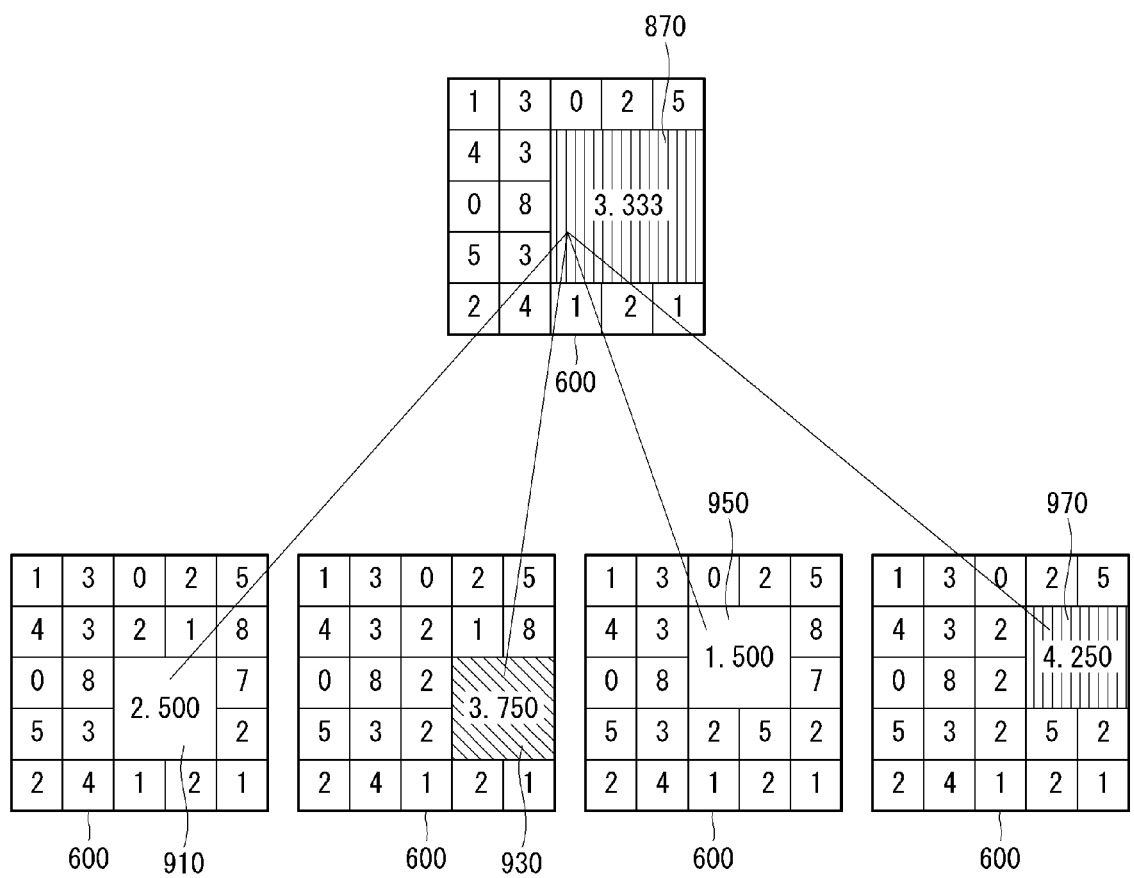

[FIG. 15]
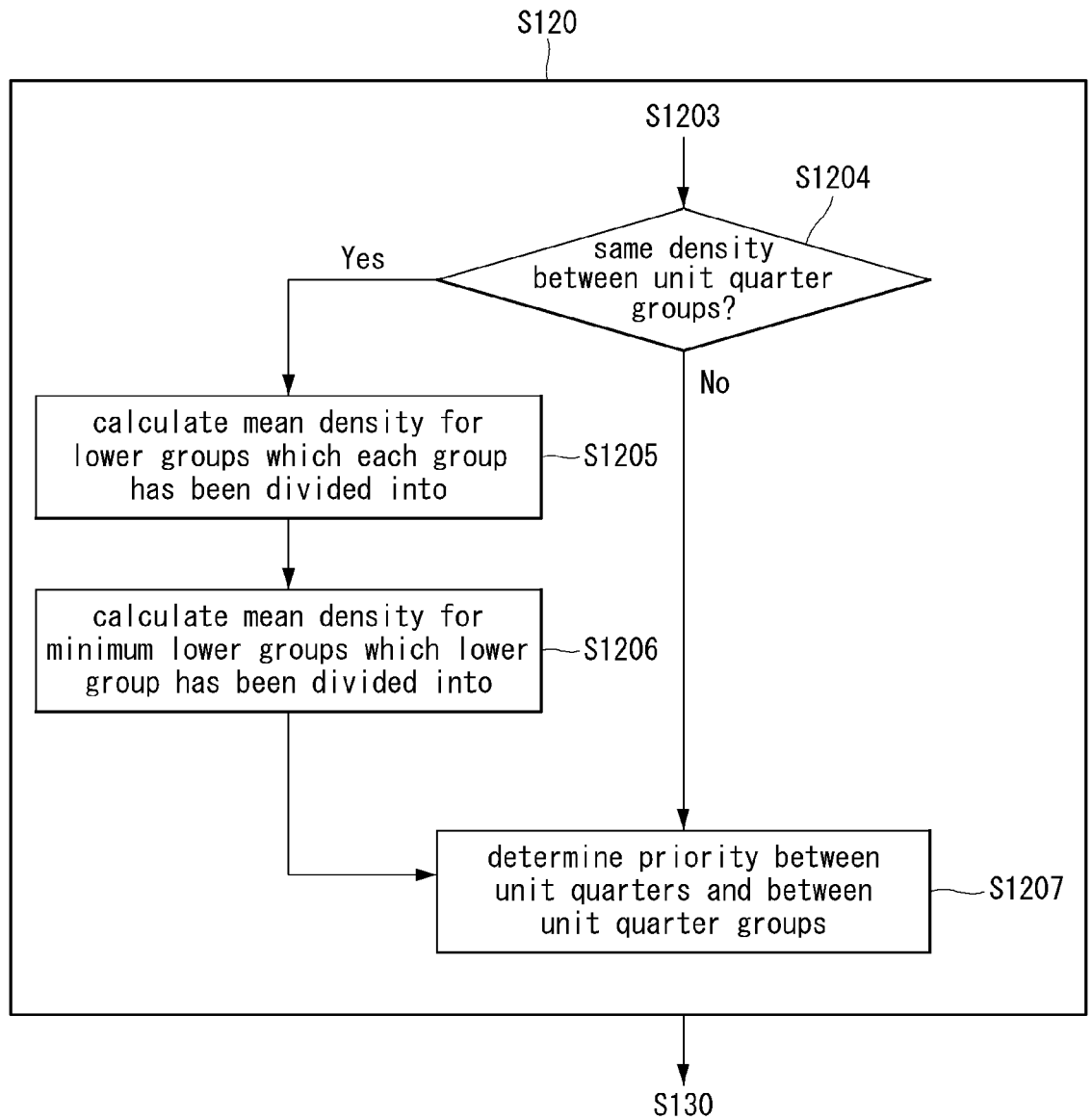

| 1 | 3 | 0 | 2 | 5 |
|---|---|---|---|---|
| 4 | \\\\ | \\\\ | \\\\ | 8 |
| 0 | \\3.000\\ lower:2.875 | | | 7 |
| 5 | \\\\ | \\\\ | \\\\ | 2 |
| 2 | 4 | 1 | 2 | 1 |

(b)

1130  600

| 1 | 3 | 0 | 2 | 5 |
|---|---|---|---|---|
| 4 | 3 | 2 | 1 | 8 |
| \\\\ | \\\\ | \\\\ | 1 | 7 |
| \\3.000\\ lower:3.438 | | | 5 | 2 |
| \\\\ | \\\\ | \\\\ | 2 | 1 |

[FIG. 17]
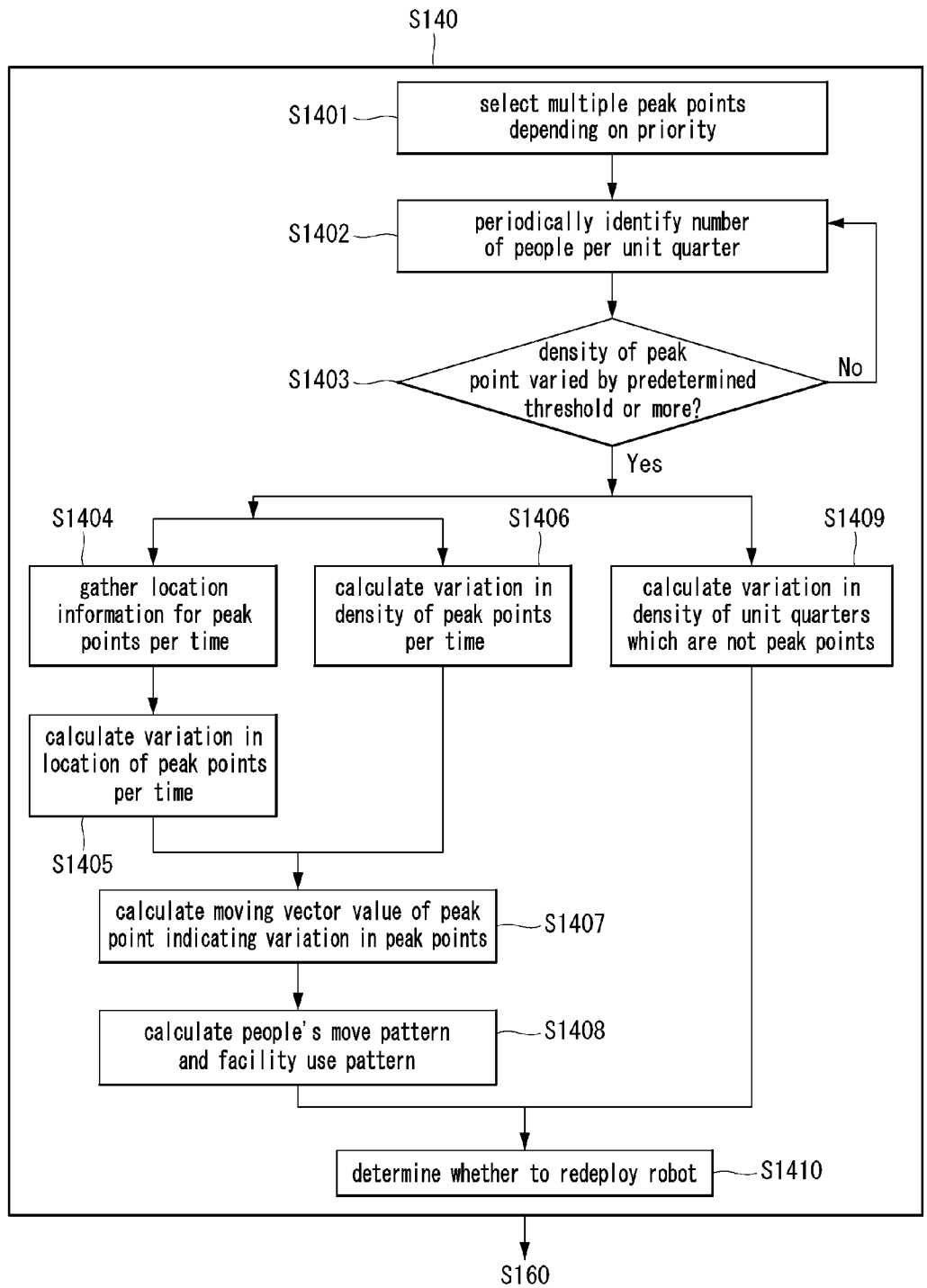

[FIG. 18]
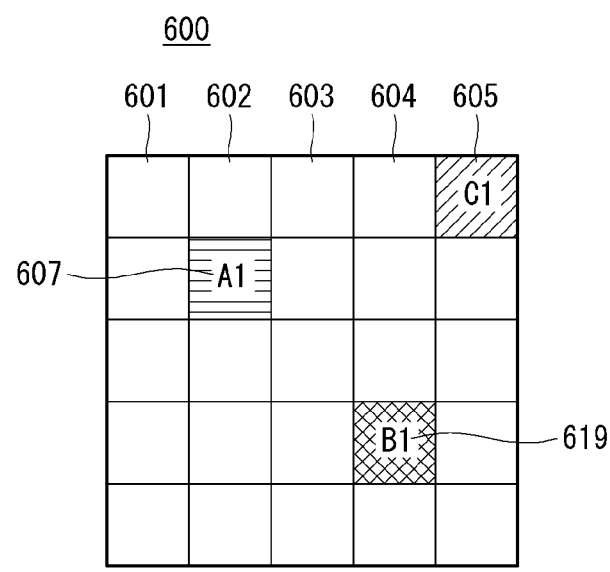

[FIG. 19]
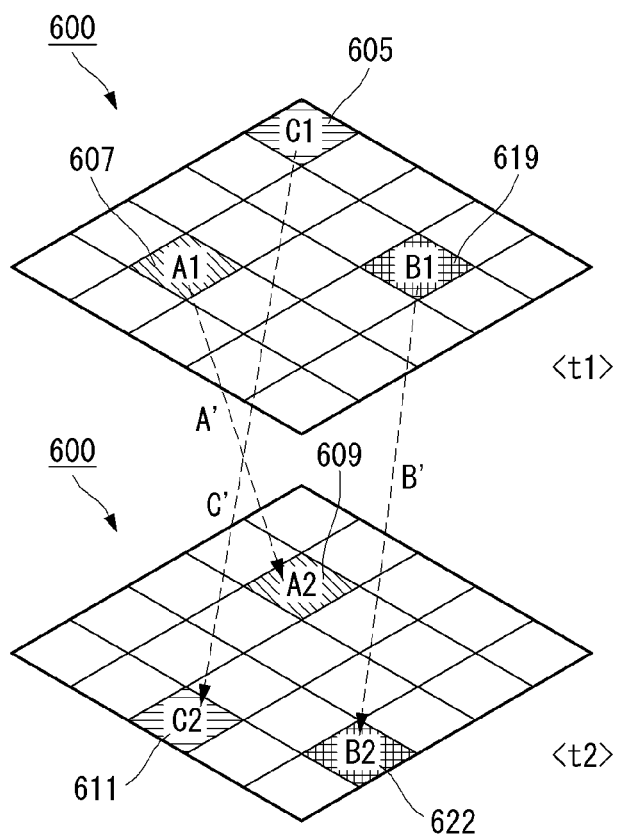

[FIG. 20]
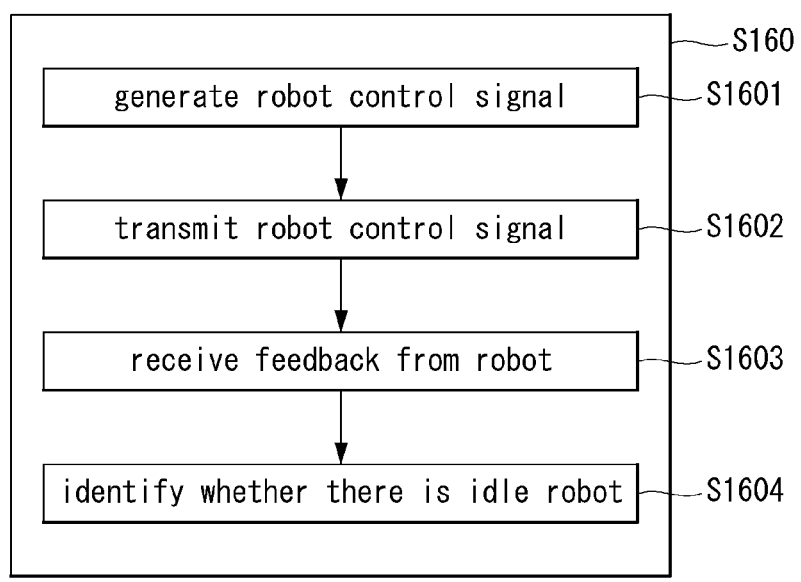

[FIG. 21]
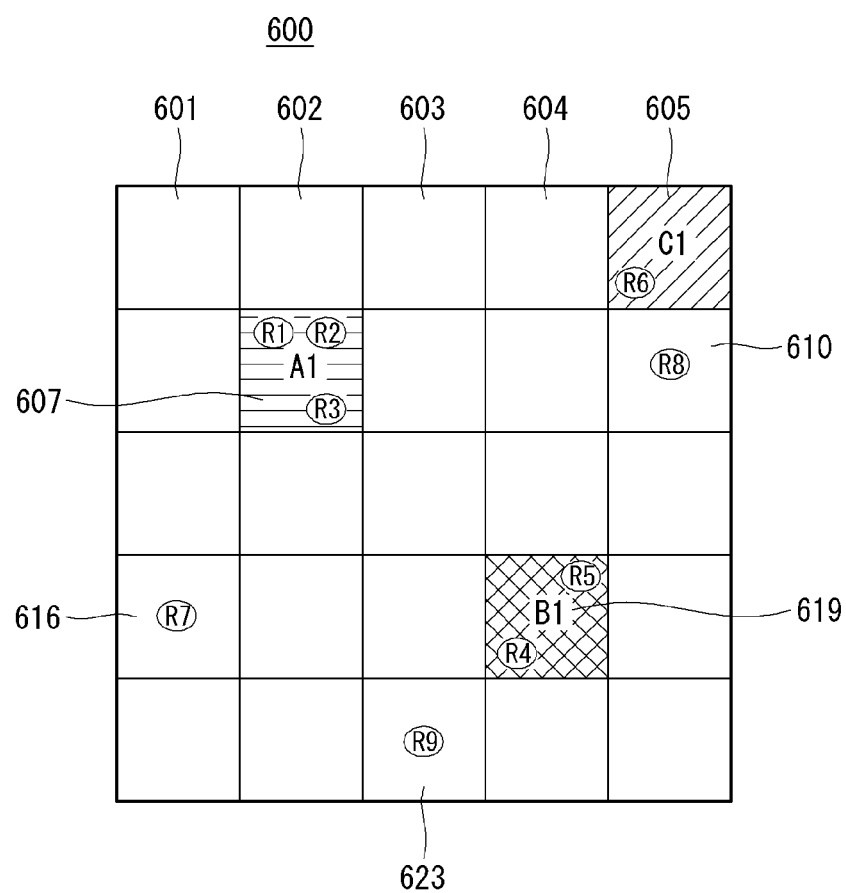

[FIG. 22]
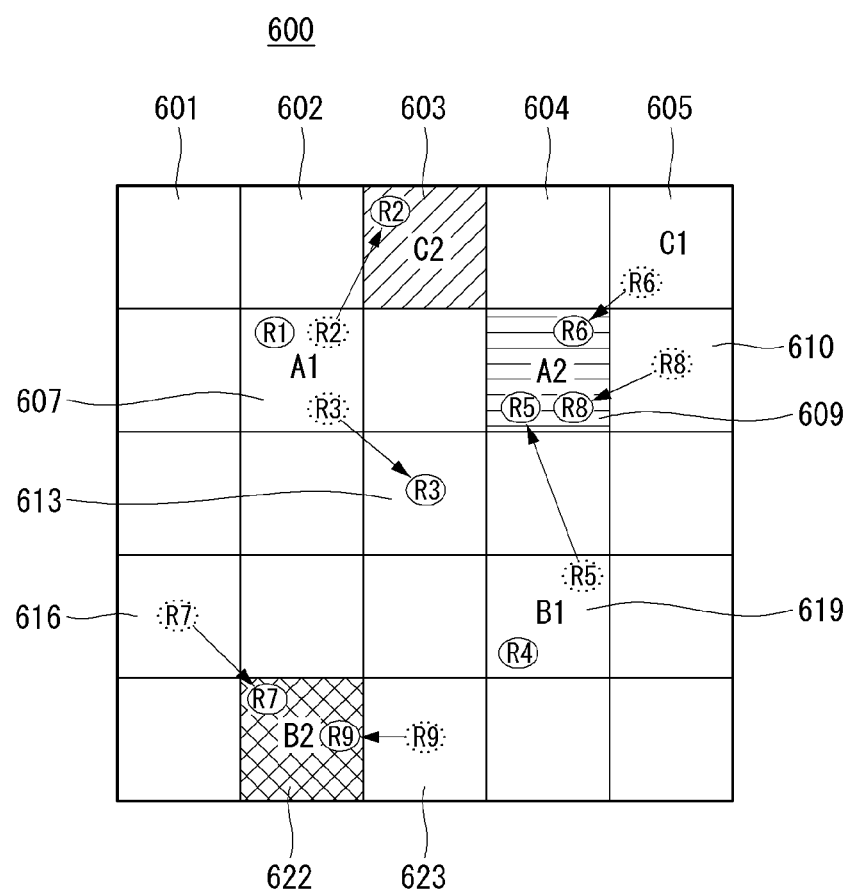

[FIG. 23]
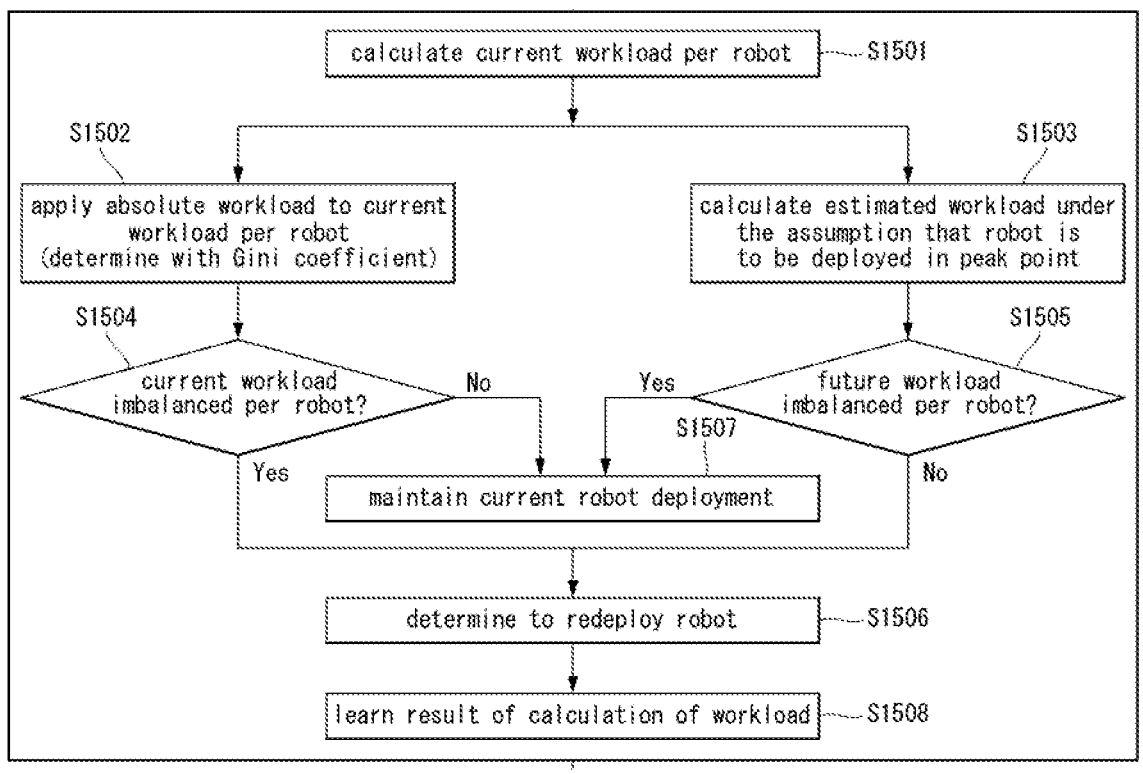

[FIG. 24]
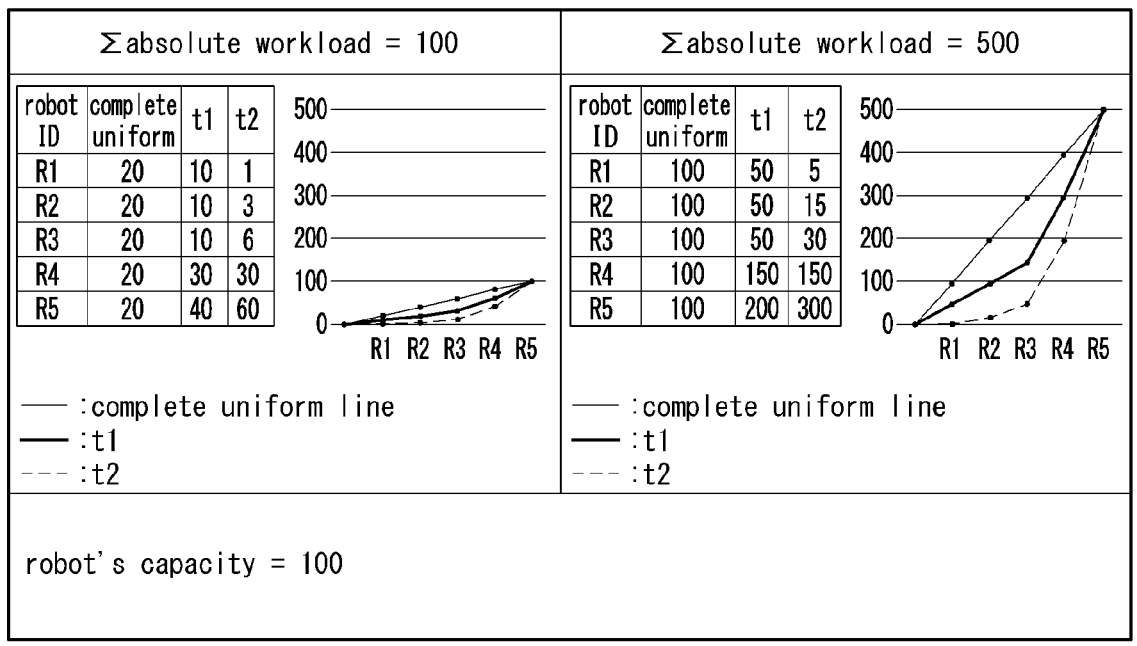

[FIG. 25]
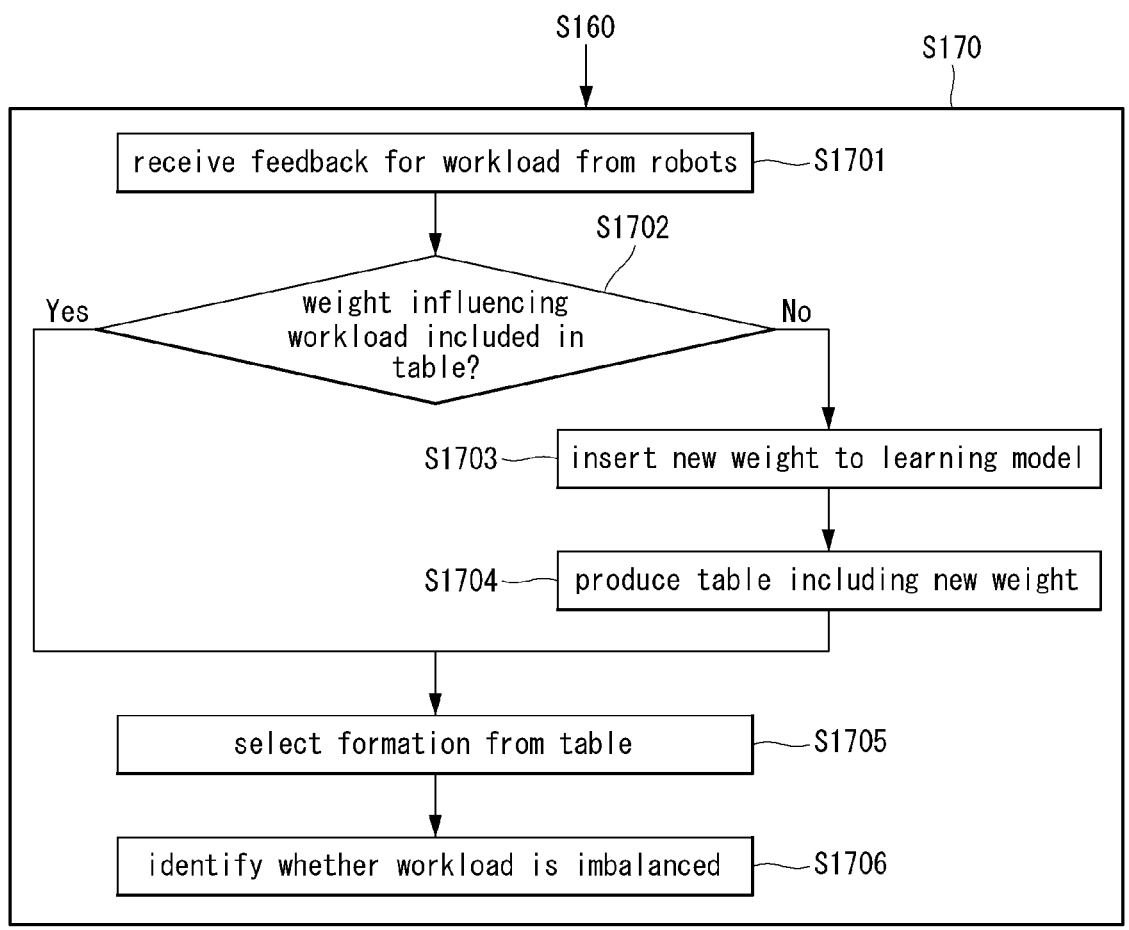

| formation | weight A | weight B | weight C |
|---|---|---|---|
| 1 set | 30 | 70 | 90 |
| 2 set | 80 | 80 | 80 |
| 3 set | 40 | 100 | 20 |
| 4 set | 100 | 70 | 50 |

D1 → 1 set row; E1 → 3 set row (b)

| formation | weight A | weight B | weight C | weight D |
|---|---|---|---|---|
| 1 set | 30 | 70 | 90 | 0 |
| 2 set | 80 | 80 | 80 | 0 |
| 3 set | 40 | 100 | 20 | 0 |
| 4 set | 100 | 70 | 50 | 0 |
| 5 set | 30 | 20 | 10 | 100 |

D2 → 1 set row; E2 → 5 set row

[FIG. 27]
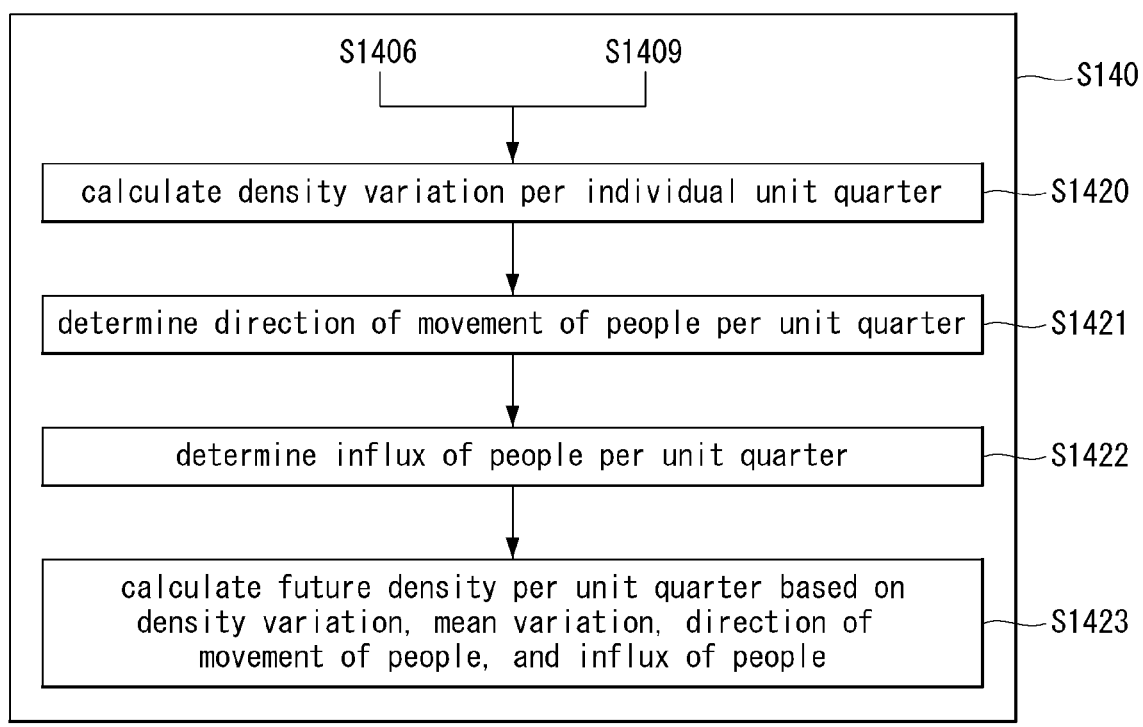

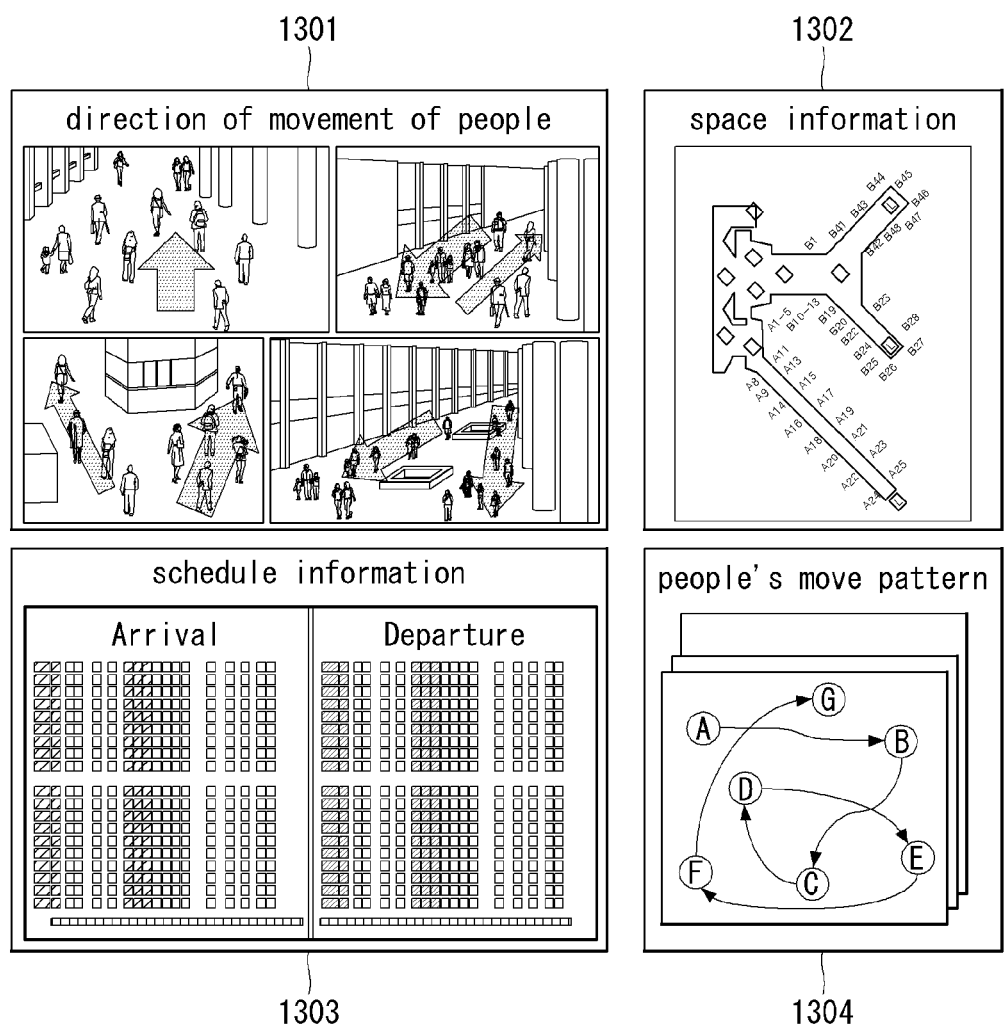
[FIG. 28]

[FIG. 29]
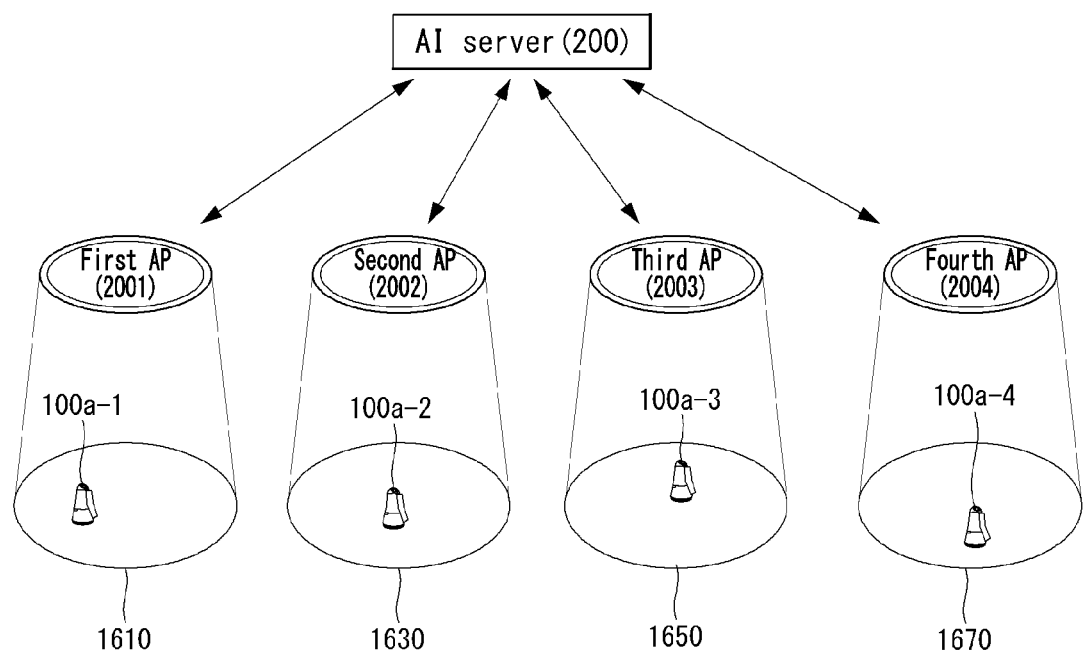

[FIG. 30]
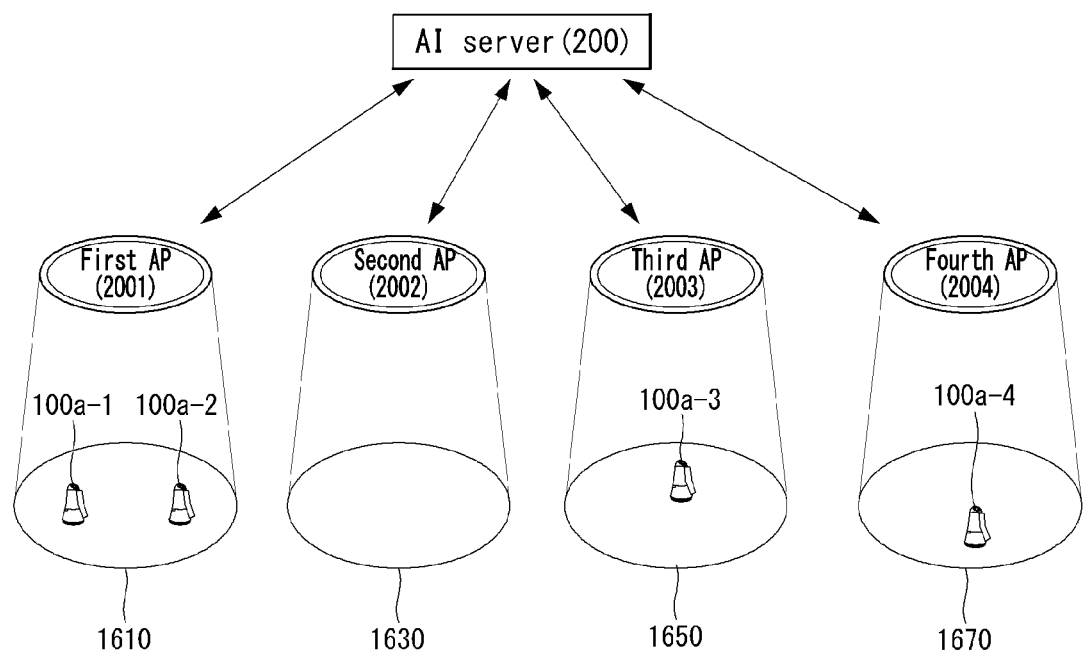

[FIG. 31]
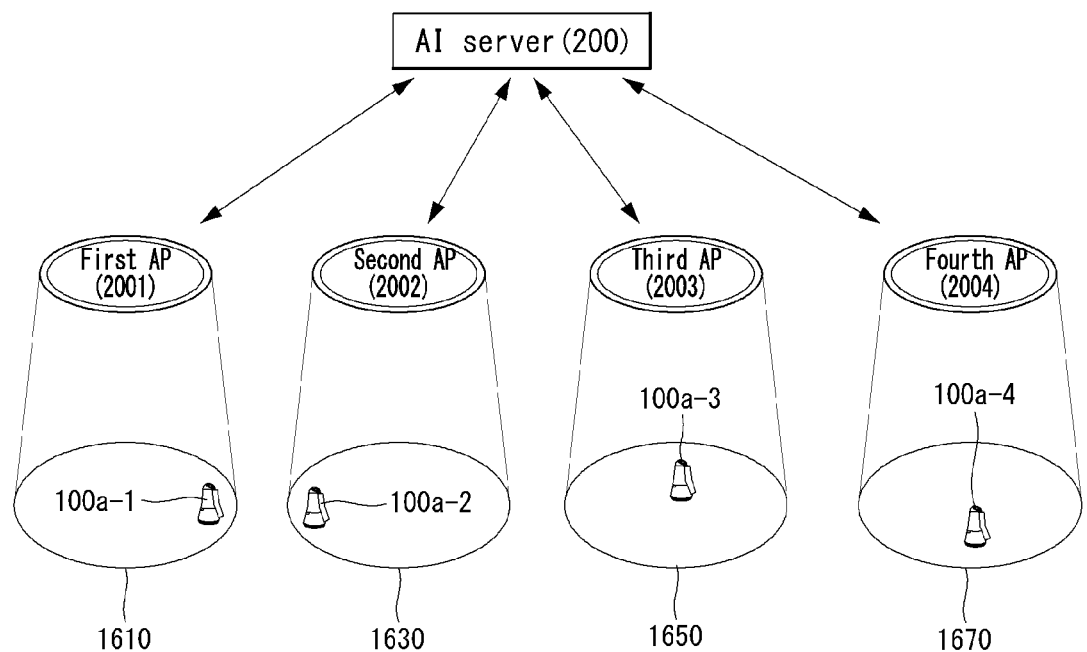

US 11,467,604 B2

CONTROL DEVICE AND METHOD FOR A PLURALITY OF ROBOTS

CROSS-REFERENCE TO RELATED APPLICATIONS

Pursuant to 35 U.S.C. § 119(a), this application claims the benefit of earlier filing date and right of priority to Korean Patent Application No. 10-2019-0177765, filed on Dec. 30, 2019, the contents of which are hereby incorporated by reference herein in its entirety.

TECHNICAL FIELD

Embodiments of the disclosure relate to devices and methods for controlling a plurality of robots.

DISCUSSION OF RELATED ART

To respond to increasing travelers in airports or train stations, robots are stationed to play a role as a smart hub to provide various services.

In particular, artificial intelligence (AI) robots may take place of conventional computers, signage, or kiosks to handle the tasks that the legacy devices cannot, thus delivering an enhancement in service in view of both quality and quantity.

AI robots are also useful as guides or info desks in busy places.

However, conventional robots are set to serve only in specific areas assigned thereto, but not in the other areas.

Thus, all of the robots deployed in an area may not efficiently be used, with only some on duty in a dense space overloaded.

Further, robots may stray out of their working area and roam around in other areas without returning, failing to properly deliver the services they are supposed to.

SUMMARY

According to an embodiment, a device for controlling a plurality of robots deployed in a certain area to provide a service to users comprises a communication unit receiving respective captured images of a plurality of unit quarters included in the certain area and a processor grasping the number of the users located in each of the unit quarters based on the received images and calculating a density of the users per unit quarter. The processor periodically measures a variation in the density per unit quarter and, upon detecting the variation not less than a predetermined threshold, transmitting a first control command, for moving at least one first robot to the unit quarter where the variation has been detected, to the first robot.

The processor may assign priorities to the unit quarters in descending order from a highest-density unit quarter among the unit quarters.

The processor may select the highest-density unit quarter as a first peak point and selects each of unit quarters, which are a second peak point and a third peak point, in descending order from the first peak point.

The processor may gather location information for each of a first unit quarter, a second unit quarter, and a third unit quarter selected as the first peak point, the second peak point, and the third peak point, respectively, at a first time and gather location information for each of a fourth unit quarter, a fifth unit quarter, and a sixth unit quarter selected as the first peak point, the second peak point, and the third peak point, respectively, at a second time.

The processor may calculate a first location variation value and a first density variation between the first and fourth unit quarters selected as the first peak point, calculate a second location variation value and a second density variation between the second and fifth unit quarters selected as the second peak point, calculate a third location variation value and a third density variation between the third and sixth unit quarters selected as the third peak point, and calculate the density variation for other unit quarters than the first to sixth unit quarters.

The processor may calculates the first to third location variation values using Equation 1: Euclidean($P_{i:After}$, $P_{i:Before}$) [Equation 1] wherein $P_{i:After}$ denotes a location value of a unit quarter corresponding to each ranking at the second time, and $P_{i:Before}$ denotes a location value of a unit quarter corresponding to each ranking at the first time, wherein calculates the first to third density variations using Equation 2: $|A_{i:After} - A_{i:Before}|$ [Equation 2] wherein $A_{i:After}$ denotes a density of a unit quarter corresponding to each ranking at the second time, and $A_{i:Before}$ denotes a density of a unit quarter corresponding to each ranking at the first time, wherein calculates a moving vector of the first to third peak points using Equation 3: $\alpha * \Sigma_{i=1}^{n} P_i + \beta * \Sigma_{i=1}^{n} A_i$ [Equation 3] wherein $\alpha$ denotes a first weight, and $\beta$ denotes a second weight.

The processor may calculate an estimated workload of each robot considering a current workload caused by a task being currently performed by each of the plurality of robots, a location value per robot, and a density of a higher-ranking unit quarter. The estimated workload may be a sum of the current workload and a workload to be caused when each robot is deployed in a higher-density unit quarter to perform an additional task and is data for a variation in workload of each robot.

The processor may use Equation 4 below to calculate the estimated workload (RL) of each robot, $$RL = \alpha * \sum_{i=1}^{n} \frac{Amp(PP_i)}{|Pos(R) - Pos(PP_i)|} + \beta * WL(R) \quad \text{[Equation 4]}$$

wherein $\alpha$ denotes a first weight, $\beta$ denotes a second weight, R denotes each robot, WL denotes the current workload of the task currently being performed by the robot, PP denotes a peak point which is a unit quarter higher in density than the other unit quarters, Amp denotes the number of people in the unit quarter, including the density of the unit quarter, and Pos denotes coordinates of a location of each robot. The peak point may mean a higher-ranking unit quarter among unit quarters labeled with rankings in descending order from the highest-density unit quarter.

The first weight may include information for an estimated time of arrival of a transportation including an aircraft, a ship, a train, or a bus and a store located around the robot. The second weight includes information for a workload assigned to the robot depending on a kind of task that may be performed by the robot.

The processor may generate a second control command to control to allow a second robot with a lower estimated workload among the plurality of robots to move to the higher-ranking unit quarter earlier than the first robot moving according to the first control command.

The processor may generate a third control command to control to allow a third robot currently positioned closest to the higher-ranking unit quarter, among robots moving to the higher-ranking unit quarter by the second control command, to the higher-ranking unit quarter.

The processor may apply an inequality coefficient to each of the current workload and the estimated workload to determine whether the current workload and the estimated workload are imbalanced per robot.

The processor may use Equation 5 below to determine the imbalance: Gini*ΣRL [Equation 5] wherein Gini means the inequality coefficient including an absolute workload.

The processor may, when there is a fourth robot for which the estimated workload is determined to be excessively high as compared with the other robots, generate a fourth control command to leave the fourth robot in a current location.

The processor may, when there is a fourth robot for which the estimated workload is determined to be excessively high as compared with the other robots, generate a fifth control command to redeploy the fourth robot in a lower-ranking unit quarter.

The processor may, after the at least one first robot is redeployed, receive a feedback for workload from the first robot and extract a weight from the workload and selects a formation to be formed by the at least one first robot according to the weight.

The processor may learn the weight via a machine learning algorithm and modify the formation according to a result of the learning.

According to an embodiment, a method of dividing a certain area into a plurality of unit quarters and controlling a plurality of robots to be deployed in at least one or more unit quarters using a control device comprises receiving respective captured images of the unit quarters, determining the number of users located in each unit quarter based on the received images, calculating a density of the users per unit quarter, periodically measuring a variation in the density per unit quarter, determining whether the variation is not less than a predetermined threshold, and when the variation is not less than the predetermined threshold, transmitting a first control command, for moving at least one first robot to the unit quarter where the variation has been detected, to the first robot.

Calculating the density of the users per unit quarter may comprise assigning priorities to the unit quarters in descending order from a highest-density unit quarter among the unit quarters, selecting the highest-density unit quarter as a first peak point and selects each of unit quarters, which are a second peak point and a third peak point, in descending order from the first peak point. Periodically measuring the variation in the density per unit quarter may comprise determining a variation in location of the first to third peak points at a first time and the first to third peak points at a second time and calculating the variation in the density of other unit quarters than the unit quarters corresponding to the first to third peak points.

Transmitting the first control command, for moving at least one first robot to the unit quarter where the variation has been detected, to the first robot may comprise calculating a current workload of a task being currently performed by each of the plurality of robots, calculating coordinates of a location of each robot, calculating a distance between the higher-ranking unit quarter and each robot, and calculating an estimated workload of each robot.

BRIEF DESCRIPTION OF THE DRAWINGS

A more complete appreciation of the disclosure and many of the attendant aspects thereof will be readily obtained as the same becomes better understood by reference to the following detailed description when considered in connection with the accompanying drawings, wherein:

FIG. 1 is a block diagram illustrating a configuration of a wireless communication system to which methods proposed herein may apply;

FIG. 2 is a view illustrating an example method of transmitting/receiving signals in a wireless communication system;

FIG. 3 is a view illustrating example basic operations of a user terminal and a 5G network in a 5G communication system;

FIG. 4 is a block diagram illustrating an AI device according to an embodiment of the disclosure;

FIG. 5 is a block diagram illustrating an AI module according to an embodiment of the disclosure;

FIG. 6 is a view illustrating an AI server according to an embodiment of the disclosure;

FIG. 7 is a view illustrating an AI system according to an embodiment of the disclosure;

FIG. 8 is a flowchart illustrating an example of controlling robots by a control device according to an embodiment of the disclosure;

FIG. 9 is a flowchart illustrating a method of calculating the number of users in an individual unit quarter by an AI server according to an embodiment of the disclosure;

FIG. 10 is a flowchart illustrating a method of calculating a density for an individual unit quarter, a unit quarter group, and a predetermined area by an AI server according to an embodiment of the disclosure;

FIG. 11 is a view illustrating a density measured per unit quarter according to an embodiment of the disclosure;

FIGS. 12, 13, and 14 are concept views illustrating a method of calculating the density of a unit quarter group by an AI server according to an embodiment of the disclosure;

FIG. 15 is a flowchart illustrating a method of determining the priority between groups by an AI server when the same density applies to unit quarter groups, according to an embodiment of the disclosure;

FIG. 16 is a view illustrating an example of determining the priority between unit quarter groups when a plurality of unit quarter groups have the same density according to an embodiment of the disclosure;

FIG. 17 is a flowchart illustrating a method of detecting a variation in density per unit quarter by an AI server according to an embodiment of the disclosure;

FIG. 18 is a view illustrating an example of setting a peak point for an individual unit quarter by an AI server according to an embodiment of the disclosure;

FIG. 19 is a view illustrating an example of a variation in peak point in a predetermined area over time;

FIG. 20 is a flowchart illustrating a method of redeploying robots per unit quarter by an AI server according to an embodiment of the disclosure;

FIG. 21 is a layout view illustrating robots deployed in a predetermined area at a first time;

FIG. 22 is a layout view illustrating robots deployed in a predetermined area at a second time;

FIG. 23 is a flowchart illustrating a per-robot task load by an AI server according to an embodiment of the disclosure;

FIG. 24 is a graph illustrating an example of applying Gini's coefficient to the task load calculated per robot;

FIG. 25 is a flowchart illustrating a method of machine learning for robot layout formation by an AI server according to an embodiment of the disclosure;

FIG. 26 is a view illustrating an example of selecting a robot layout formation in a table depending on weights by an AI server;

FIG. 27 is a flowchart illustrating a method of calculating a future density for an individual unit quarter by an AI server according to an embodiment of the disclosure;

FIG. 28 is a view illustrating an example of training data used to calculate a future density by an AI server according to an embodiment of the disclosure; and FIGS. 29, 30, and 31 are views illustrating a process of controlling a plurality of robots to maintain a formation by an AI server according to an embodiment of the disclosure.

DETAILED DESCRIPTION OF EXEMPLARY EMBODIMENTS

Hereinafter, embodiments of the disclosure will be described in detail with reference to the attached drawings. The same or similar components are given the same reference numbers and redundant description thereof is omitted. The suffixes "module" and "unit" of elements herein are used for convenience of description and thus can be used interchangeably and do not have any distinguishable meanings or functions. Further, in the following description, if a detailed description of known techniques associated with the disclosure would unnecessarily obscure the gist of the disclosure, detailed description thereof will be omitted. In addition, the attached drawings are provided for easy understanding of embodiments of the disclosure and do not limit technical spirits of the disclosure, and the embodiments should be construed as including all modifications, equivalents, and alternatives falling within the spirit and scope of the embodiments.

While terms, such as "first", "second", etc., may be used to describe various components, such components must not be limited by the above terms. The above terms are used only to distinguish one component from another.

When an element is "coupled" or "connected" to another element, it should be understood that a third element may be present between the two elements although the element may be directly coupled or connected to the other element. When an element is "directly coupled" or "directly connected" to another element, it should be understood that no element is present between the two elements.

The singular forms are intended to include the plural forms as well, unless the context clearly indicates otherwise.

In addition, in the specification, it will be further understood that the terms "comprise" and "include" specify the presence of stated features, integers, steps, operations, elements, components, and/or combinations thereof, but do not preclude the presence or addition of one or more other features, integers, steps, operations, elements, components, and/or combinations.

Hereinafter, 5G communication (5th generation mobile communication) required by an apparatus requiring AI processed information and/or an AI processor will be described through paragraphs A through G.

A. Example of Block Diagram of UE and 5G Network

FIG. 1 is a block diagram of a wireless communication system to which methods proposed in the disclosure are applicable.

Referring to FIG. 1, a device (AI device) including an AI module is defined as a first communication device (910 of FIG. 1), and a processor 911 can perform detailed AI operation.

A 5G network including another device (AI server) communicating with the AI device is defined as a second communication device (920 of FIG. 1), and a processor 921 can perform detailed AI operations.

The 5G network may be represented as the first communication device and the AI device may be represented as the second communication device.

For example, the first communication device or the second communication device may be a base station, a network node, a transmission terminal, a reception terminal, a wireless device, a wireless communication device, an autonomous device, or the like.

For example, the first communication device or the second communication device may be a base station, a network node, a transmission terminal, a reception terminal, a wireless device, a wireless communication device, a vehicle, a vehicle having an autonomous function, a connected car, a drone (Unmanned Aerial Vehicle, UAV), and AI (Artificial Intelligence) module, a robot, an AR (Augmented Reality) device, a VR (Virtual Reality) device, an MR (Mixed Reality) device, a hologram device, a public safety device, an MTC device, an IoT device, a medical device, a Fin Tech device (or financial device), a security device, a climate/environment device, a device associated with 5G services, or other devices associated with the fourth industrial revolution field.

For example, a terminal or user equipment (UE) may include a cellular phone, a smart phone, a laptop computer, a digital broadcast terminal, personal digital assistants (PDAs), a portable multimedia player (PMP), a navigation device, a slate PC, a tablet PC, an Ultrabook, a wearable device (e.g., a smartwatch, a smart glass and a head mounted display (HMD)), etc. For example, the HMD may be a display device worn on the head of a user. For example, the HMD may be used to realize VR, AR or MR. For example, the drone may be a flying object that flies by wireless control signals without a person therein. For example, the VR device may include a device that implements objects or backgrounds of a virtual world. For example, the AR device may include a device that connects and implements objects or background of a virtual world to objects, backgrounds, or the like of a real world. For example, the MR device may include a device that unites and implements objects or background of a virtual world to objects, backgrounds, or the like of a real world. For example, the hologram device may include a device that implements 360-degree 3D images by recording and playing 3D information using the interference phenomenon of light that is generated by two lasers meeting each other which is called holography. For example, the public safety device may include an image repeater or an imaging device that can be worn on the body of a user. For example, the MTC device and the IoT device may be devices that do not require direct interference or operation by a person. For example, the MTC device and the IoT device may include a smart meter, a bending machine, a thermometer, a smart bulb, a door lock, various sensors, or the like. For example, the medical device may be a device that is used to diagnose, treat, attenuate, remove, or prevent diseases. For example, the medical device may be a device that is used to diagnose, treat, attenuate, or correct injuries or disorders. For example, the medial device may be a device that is used to examine, replace, or change structures or functions. For example, the medical device may be a device that is used to control pregnancy. For example, the medical device may include a device for medical treatment, a device for operations, a device for (external) diagnose, a hearing aid, an operation device, or the like. For example, the security device may be a device that is installed to prevent a danger that is likely to occur and to keep safety.

For example, the security device may be a camera, a CCTV, a recorder, a black box, or the like. For example, the Fin Tech device may be a device that can provide financial services such as mobile payment.

Referring to FIG. 1, the first communication device 910 and the second communication device 920 include processors 911 and 921, memories 914 and 924, one or more Tx/Rx radio frequency (RF) modules 915 and 925, Tx processors 912 and 922, Rx processors 913 and 923, and antennas 916 and 926. The Tx/Rx module is also referred to as a transceiver. Each Tx/Rx module 915 transmits a signal through each antenna 926. The processor implements the aforementioned functions, processes and/or methods. The processor 921 may be related to the memory 924 that stores program code and data. The memory may be referred to as a computer-readable medium. More specifically, the Tx processor 912 implements various signal processing functions with respect to L1 (i.e., physical layer) in DL (communication from the first communication device to the second communication device). The Rx processor implements various signal processing functions of L1 (i.e., physical layer).

UL (communication from the second communication device to the first communication device) is processed in the first communication device 910 in a way similar to that described in association with a receiver function in the second communication device 920. Each Tx/Rx module 925 receives a signal through each antenna 926. Each Tx/Rx module provides RF carriers and information to the Rx processor 923. The processor 921 may be related to the memory 924 that stores program code and data. The memory may be referred to as a computer-readable medium.

B. Signal Transmission/Reception Method in Wireless Communication System

FIG. 2 is a diagram showing an example of a signal transmission/reception method in a wireless communication system.

Referring to FIG. 2, when a UE is powered on or enters a new cell, the UE performs an initial cell search operation such as synchronization with a BS (S201). For this operation, the UE can receive a primary synchronization channel (P-SCH) and a secondary synchronization channel (S-SCH) from the BS to synchronize with the BS and acquire information such as a cell ID. In LTE and NR systems, the P-SCH and S-SCH are respectively called a primary synchronization signal (PSS) and a secondary synchronization signal (SSS). After initial cell search, the UE can acquire broadcast information in the cell by receiving a physical broadcast channel (PBCH) from the BS. Further, the UE can receive a downlink reference signal (DL RS) in the initial cell search step to check a downlink channel state. After initial cell search, the UE can acquire more detailed system information by receiving a physical downlink shared channel (PDSCH) according to a physical downlink control channel (PDCCH) and information included in the PDCCH (S202).

Meanwhile, when the UE initially accesses the BS or has no radio resource for signal transmission, the UE can perform a random access procedure (RACH) for the BS (steps S203 to S206). To this end, the UE can transmit a specific sequence as a preamble through a physical random access channel (PRACH) (S203 and S205) and receive a random access response (RAR) message for the preamble through a PDCCH and a corresponding PDSCH (S204 and S206). In the case of a contention-based RACH, a contention resolution procedure may be additionally performed.

After the UE performs the above-described process, the UE can perform PDCCH/PDSCH reception (S207) and physical uplink shared channel (PUSCH)/physical uplink control channel (PUCCH) transmission (S208) as normal uplink/downlink signal transmission processes. Particularly, the UE receives downlink control information (DCI) through the PDCCH. The UE monitors a set of PDCCH candidates in monitoring occasions set for one or more control element sets (CORESET) on a serving cell according to corresponding search space configurations. A set of PDCCH candidates to be monitored by the UE is defined in terms of search space sets, and a search space set may be a common search space set or a UE-specific search space set. CORESET includes a set of (physical) resource blocks having a duration of one to three OFDM symbols. A network can configure the UE such that the UE has a plurality of CORESETs. The UE monitors PDCCH candidates in one or more search space sets. Here, monitoring means attempting decoding of PDCCH candidate(s) in a search space. When the UE has successfully decoded one of PDCCH candidates in a search space, the UE determines that a PDCCH has been detected from the PDCCH candidate and performs PDSCH reception or PUSCH transmission on the basis of DCI in the detected PDCCH. The PDCCH can be used to schedule DL transmissions over a PDSCH and UL transmissions over a PUSCH. Here, the DCI in the PDCCH includes downlink assignment (i.e., downlink grant (DL grant)) related to a physical downlink shared channel and including at least a modulation and coding format and resource allocation information, or an uplink grant (UL grant) related to a physical uplink shared channel and including a modulation and coding format and resource allocation information.

An initial access (IA) procedure in a 5G communication system will be additionally described with reference to FIG. 2.

The UE can perform cell search, system information acquisition, beam alignment for initial access, and DL measurement on the basis of an SSB. The SSB is interchangeably used with a synchronization signal/physical broadcast channel (SS/PBCH) block.

The SSB includes a PSS, an SSS and a PBCH. The SSB is configured in four consecutive OFDM symbols, and a PSS, a PBCH, an SSS/PBCH or a PBCH is transmitted for each OFDM symbol. Each of the PSS and the SSS includes one OFDM symbol and 127 subcarriers, and the PBCH includes 3 OFDM symbols and 576 subcarriers.

Cell search refers to a process in which a UE acquires time/frequency synchronization of a cell and detects a cell identifier (ID) (e.g., physical layer cell ID (PCI)) of the cell. The PSS is used to detect a cell ID in a cell ID group and the SSS is used to detect a cell ID group. The PBCH is used to detect an SSB (time) index and a half-frame.

There are 336 cell ID groups and there are 3 cell IDs per cell ID group. A total of 1008 cell IDs are present. Information on a cell ID group to which a cell ID of a cell belongs is provided/acquired through an SSS of the cell, and information on the cell ID among 336 cell ID groups is provided/acquired through a PSS.

The SSB is periodically transmitted in accordance with SSB periodicity. A default SSB periodicity assumed by a UE during initial cell search is defined as 20 ms. After cell access, the SSB periodicity can be set to one of {5 ms, 10 ms, 20 ms, 40 ms, 80 ms, 160 ms} by a network (e.g., a BS).

Next, acquisition of system information (SI) will be described.

SI is divided into a master information block (MIB) and a plurality of system information blocks (SIBs). SI other than the MIB may be referred to as remaining minimum system information. The MIB includes information/parameter for monitoring a PDCCH that schedules a PDSCH carrying SIB1 (SystemInformationBlock1) and is transmitted by a BS through a PBCH of an SSB. SIB1 includes information related to availability and scheduling (e.g., transmission periodicity and SI-window size) of the remaining SIBs (hereinafter, SIBx, x is an integer equal to or greater than 2). SiBx is included in an SI message and transmitted over a PDSCH. Each SI message is transmitted within a periodically generated time window (i.e., SI-window).

A random access (RA) procedure in a 5G communication system will be additionally described with reference to FIG. 2.

A random access procedure is used for various purposes. For example, the random access procedure can be used for network initial access, handover, and UE-triggered UL data transmission. A UE can acquire UL synchronization and UL transmission resources through the random access procedure. The random access procedure is classified into a contention-based random access procedure and a contention-free random access procedure. A detailed procedure for the contention-based random access procedure is as follows.

A UE can transmit a random access preamble through a PRACH as Msg1 of a random access procedure in UL. Random access preamble sequences having different two lengths are supported. A long sequence length 839 is applied to subcarrier spacings of 1.25 kHz and 5 kHz and a short sequence length 139 is applied to subcarrier spacings of 15 kHz, 30 kHz, 60 kHz and 120 kHz.

When a BS receives the random access preamble from the UE, the BS transmits a random access response (RAR) message (Msg2) to the UE. A PDCCH that schedules a PDSCH carrying a RAR is CRC masked by a random access (RA) radio network temporary identifier (RNTI) (RA-RNTI) and transmitted. Upon detection of the PDCCH masked by the RA-RNTI, the UE can receive a RAR from the PDSCH scheduled by DCI carried by the PDCCH. The UE checks whether the RAR includes random access response information with respect to the preamble transmitted by the UE, that is, Msg1. Presence or absence of random access information with respect to Msg1 transmitted by the UE can be determined according to presence or absence of a random access preamble ID with respect to the preamble transmitted by the UE. If there is no response to Msg1, the UE can retransmit the RACH preamble less than a predetermined number of times while performing power ramping. The UE calculates PRACH transmission power for preamble retransmission on the basis of most recent pathloss and a power ramping counter.

The UE can perform UL transmission through Msg3 of the random access procedure over a physical uplink shared channel on the basis of the random access response information. Msg3 can include an RRC connection request and a UE ID. The network can transmit Msg4 as a response to Msg3, and Msg4 can be handled as a contention resolution message on DL. The UE can enter an RRC connected state by receiving Msg4.

C. Beam Management (BM) Procedure of 5G Communication System

A BM procedure can be divided into (1) a DL MB procedure using an SSB or a CSI-RS and (2) a UL BM procedure using a sounding reference signal (SRS). In addition, each BM procedure can include Tx beam swiping for determining a Tx beam and Rx beam swiping for determining an Rx beam.

The DL BM procedure using an SSB will be described.

Configuration of a beam report using an SSB is performed when channel state information (CSI)/beam is configured in RRC_CONNECTED.

A UE receives a CSI-ResourceConfig IE including CSI-SSB-ResourceSetList for SSB resources used for BM from a BS. The RRC parameter "csi-SSB-ResourceSetList" represents a list of SSB resources used for beam management and report in one resource set. Here, an SSB resource set can be set as {SSBx1, SSBx2, SSBx3, SSBx4, . . . }. An SSB index can be defined in the range of 0 to 63.

The UE receives the signals on SSB resources from the BS on the basis of the CSI-SSB-ResourceSetList.

When CSI-RS reportConfig with respect to a report on SSBRI and reference signal received power (RSRP) is set, the UE reports the best SSBRI and RSRP corresponding thereto to the BS. For example, when reportQuantity of the CSI-RS reportConfig IE is set to 'ssb-Index-RSRP', the UE reports the best SSBRI and RSRP corresponding thereto to the BS.

When a CSI-RS resource is configured in the same OFDM symbols as an SSB and 'QCL-TypeD' is applicable, the UE can assume that the CSI-RS and the SSB are quasi co-located (QCL) from the viewpoint of 'QCL-TypeD'. Here, QCL-TypeD may mean that antenna ports are quasi co-located from the viewpoint of a spatial Rx parameter. When the UE receives signals of a plurality of DL antenna ports in a QCL-TypeD relationship, the same Rx beam can be applied.

Next, a DL BM procedure using a CSI-RS will be described.

An Rx beam determination (or refinement) procedure of a UE and a Tx beam swiping procedure of a BS using a CSI-RS will be sequentially described. A repetition parameter is set to 'ON' in the Rx beam determination procedure of a UE and set to 'OFF' in the Tx beam swiping procedure of a BS.

First, the Rx beam determination procedure of a UE will be described.

The UE receives an NZP CSI-RS resource set IE including an RRC parameter with respect to 'repetition' from a BS through RRC signaling. Here, the RRC parameter 'repetition' is set to 'ON'.

The UE repeatedly receives signals on resources in a CSI-RS resource set in which the RRC parameter 'repetition' is set to 'ON' in different OFDM symbols through the same Tx beam (or DL spatial domain transmission filters) of the BS.

The UE determines an RX beam thereof.

The UE skips a CSI report. That is, the UE can skip a CSI report when the RRC parameter 'repetition' is set to 'ON'.

Next, the Tx beam determination procedure of a BS will be described.

A UE receives an NZP CSI-RS resource set IE including an RRC parameter with respect to 'repetition' from the BS through RRC signaling. Here, the RRC parameter 'repetition' is related to the Tx beam swiping procedure of the BS when set to 'OFF'.

The UE receives signals on resources in a CSI-RS resource set in which the RRC parameter 'repetition' is set to 'OFF' in different DL spatial domain transmission filters of the BS.

The UE selects (or determines) a best beam.

The UE reports an ID (e.g., CRI) of the selected beam and related quality information (e.g., RSRP) to the BS. That is, when a CSI-RS is transmitted for BM, the UE reports a CRI and RSRP with respect thereto to the BS.

Next, the UL BM procedure using an SRS will be described.

A UE receives RRC signaling (e.g., SRS-Config IE) including a (RRC parameter) purpose parameter set to 'beam management" from a BS. The SRS-Config IE is used to set SRS transmission. The SRS-Config IE includes a list of SRS-Resources and a list of SRS-ResourceSets. Each SRS resource set refers to a set of SRS-resources.

The UE determines Tx beamforming for SRS resources to be transmitted on the basis of SRS-SpatialRelation Info included in the SRS-Config IE. Here, SRS-SpatialRelation Info is set for each SRS resource and indicates whether the same beamforming as that used for an SSB, a CSI-RS or an SRS will be applied for each SRS resource.

When SRS-SpatialRelationInfo is set for SRS resources, the same beamforming as that used for the SSB, CSI-RS or SRS is applied. However, when SRS-SpatialRelationInfo is not set for SRS resources, the UE arbitrarily determines Tx beamforming and transmits an SRS through the determined Tx beamforming.

Next, a beam failure recovery (BFR) procedure will be described.

In a beamformed system, radio link failure (RLF) may frequently occur due to rotation, movement or beamforming blockage of a UE. Accordingly, NR supports BFR in order to prevent frequent occurrence of RLF. BFR is similar to a radio link failure recovery procedure and can be supported when a UE knows new candidate beams. For beam failure detection, a BS configures beam failure detection reference signals for a UE, and the UE declares beam failure when the number of beam failure indications from the physical layer of the UE reaches a threshold set through RRC signaling within a period set through RRC signaling of the BS. After beam failure detection, the UE triggers beam failure recovery by initiating a random access procedure in a PCell and performs beam failure recovery by selecting a suitable beam. (When the BS provides dedicated random access resources for certain beams, these are prioritized by the UE). Completion of the aforementioned random access procedure is regarded as completion of beam failure recovery.

D. URLLC (Ultra-Reliable and Low Latency Communication)

URLLC transmission defined in NR can refer to (1) a relatively low traffic size, (2) a relatively low arrival rate, (3) extremely low latency requirements (e.g., 0.5 and 1 ms), (4) relatively short transmission duration (e.g., 2 OFDM symbols), (5) urgent services/messages, etc. In the case of UL, transmission of traffic of a specific type (e.g., URLLC) needs to be multiplexed with another transmission (e.g., eMBB) scheduled in advance in order to satisfy more stringent latency requirements. In this regard, a method of providing information indicating preemption of specific resources to a UE scheduled in advance and allowing a URLLC UE to use the resources for UL transmission is provided.

NR supports dynamic resource sharing between eMBB and URLLC. eMBB and URLLC services can be scheduled on non-overlapping time/frequency resources, and URLLC transmission can occur in resources scheduled for ongoing eMBB traffic. An eMBB UE may not ascertain whether PDSCH transmission of the corresponding UE has been partially punctured and the UE may not decode a PDSCH due to corrupted coded bits. In view of this, NR provides a preemption indication. The preemption indication may also be referred to as an interrupted transmission indication.

With regard to the preemption indication, a UE receives DownlinkPreemption IE through RRC signaling from a BS. When the UE is provided with DownlinkPreemption IE, the UE is configured with INT-RNTI provided by a parameter int-RNTI in DownlinkPreemption IE for monitoring of a PDCCH that conveys DCI format 2_1. The UE is additionally configured with a corresponding set of positions for fields in DCI format 2_1 according to a set of serving cells and positionInDCI by INT-ConfigurationPerServing Cell including a set of serving cell indexes provided by servingCellID, configured having an information payload size for DCI format 2_1 according to dci-Payloadsize, and configured with indication granularity of time-frequency resources according to timeFrequencySect.

The UE receives DCI format 2_1 from the BS on the basis of the DownlinkPreemption IE.

When the UE detects DCI format 2_1 for a serving cell in a configured set of serving cells, the UE can assume that there is no transmission to the UE in PRBs and symbols indicated by the DCI format 2_1 in a set of PRBs and a set of symbols in a last monitoring period before a monitoring period to which the DCI format 2_1 belongs. For example, the UE assumes that a signal in a time-frequency resource indicated according to preemption is not DL transmission scheduled therefor and decodes data on the basis of signals received in the remaining resource region.

E. mMTC (Massive MTC)

mMTC (massive Machine Type Communication) is one of 5G scenarios for supporting a hyper-connection service providing simultaneous communication with a large number of UEs. In this environment, a UE intermittently performs communication with a very low speed and mobility. Accordingly, a main goal of mMTC is operating a UE for a long time at a low cost. With respect to mMTC, 3GPP deals with MTC and NB (NarrowBand)-IoT.

mMTC has features such as repetitive transmission of a PDCCH, a PUCCH, a PDSCH (physical downlink shared channel), a PUSCH, etc., frequency hopping, retuning, and a guard period.

That is, a PUSCH (or a PUCCH (particularly, a long PUCCH) or a PRACH) including specific information and a PDSCH (or a PDCCH) including a response to the specific information are repeatedly transmitted. Repetitive transmission is performed through frequency hopping, and for repetitive transmission, (RF) retuning from a first frequency resource to a second frequency resource is performed in a guard period and the specific information and the response to the specific information can be transmitted/received through a narrowband (e.g., 6 resource blocks (RBs) or 1 RB).

F. Basic Operation Between Autonomous Vehicles Using 5G Communication

FIG. 3 shows an example of basic operations of an autonomous vehicle and a 5G network in a 5G communication system.

The autonomous vehicle transmits specific information to the 5G network (S1). The specific information may include autonomous driving related information. In addition, the 5G network can determine whether to remotely control the vehicle (S2). Here, the 5G network may include a server or a module which performs remote control related to autonomous driving. In addition, the 5G network can transmit information (or signal) related to remote control to the autonomous vehicle (S3).

G. Applied Operations Between Autonomous Vehicle and 5G Network in 5G Communication System Hereinafter, the operation of an autonomous vehicle using 5G communication will be described in more detail with reference to wireless communication technology (BM procedure, URLLC, mMTC, etc.) described in FIGS. 1 and 2.

First, a basic procedure of an applied operation to which a method proposed by the disclosure which will be described later and eMBB of 5G communication are applied will be described.

As in steps S1 and S3 of FIG. 3, the autonomous vehicle performs an initial access procedure and a random access procedure with the 5G network prior to step S1 of FIG. 3 in order to transmit/receive signals, information and the like to/from the 5G network.

More specifically, the autonomous vehicle performs an initial access procedure with the 5G network on the basis of an SSB in order to acquire DL synchronization and system information. A beam management (BM) procedure and a beam failure recovery procedure may be added in the initial access procedure, and quasi-co-location (QCL) relation may be added in a process in which the autonomous vehicle receives a signal from the 5G network.

In addition, the autonomous vehicle performs a random access procedure with the 5G network for UL synchronization acquisition and/or UL transmission. The 5G network can transmit, to the autonomous vehicle, a UL grant for scheduling transmission of specific information. Accordingly, the autonomous vehicle transmits the specific information to the 5G network on the basis of the UL grant. In addition, the 5G network transmits, to the autonomous vehicle, a DL grant for scheduling transmission of 5G processing results with respect to the specific information. Accordingly, the 5G network can transmit, to the autonomous vehicle, information (or a signal) related to remote control on the basis of the DL grant.

Next, a basic procedure of an applied operation to which a method proposed by the disclosure which will be described later and URLLC of 5G communication are applied will be described.

As described above, an autonomous vehicle can receive DownlinkPreemption IE from the 5G network after the autonomous vehicle performs an initial access procedure and/or a random access procedure with the 5G network. Then, the autonomous vehicle receives DCI format 2_1 including a preemption indication from the 5G network on the basis of DownlinkPreemption IE. The autonomous vehicle does not perform (or expect or assume) reception of eMBB data in resources (PRBs and/or OFDM symbols) indicated by the preemption indication. Thereafter, when the autonomous vehicle needs to transmit specific information, the autonomous vehicle can receive a UL grant from the 5G network.

Next, a basic procedure of an applied operation to which a method proposed by the disclosure which will be described later and mMTC of 5G communication are applied will be described.

Description will focus on parts in the steps of FIG. 3 which are changed according to application of mMTC.

In step S1 of FIG. 3, the autonomous vehicle receives a UL grant from the 5G network in order to transmit specific information to the 5G network. Here, the UL grant may include information on the number of repetitions of transmission of the specific information and the specific information may be repeatedly transmitted on the basis of the information on the number of repetitions. That is, the autonomous vehicle transmits the specific information to the 5G network on the basis of the UL grant. Repetitive transmission of the specific information may be performed through frequency hopping, the first transmission of the specific information may be performed in a first frequency resource, and the second transmission of the specific information may be performed in a second frequency resource.

The specific information can be transmitted through a narrowband of 6 resource blocks (RBs) or 1 RB.

The above-described 5G communication technology can be combined with methods proposed in the disclosure which will be described later and applied or can complement the methods proposed in the disclosure to make technical features of the methods concrete and clear.

Described below are basic procedures of applied operations to which methods proposed herein and 5G communication URLLC technology apply.

As described above, after performing the initial access procedure and/or any access procedure with the 5G network, the UE may receive a DownlinkPreemption IE from the 5G network. The UE receives, from the 5G network, DCI format 2_1 including a preemption indication based on the DownlinkPreemption IE. The UE does not perform (or expect or assume) reception of eMBB data in the resource (PRB and/or OFDM symbol) indicated with the preemption indication. Thereafter, when transmission of specific information is needed, the UE may receive a UL grant from the 5G network.

Described below are basic procedures of applied operations to which methods proposed herein and 5G communication mMTC technology apply.

The description focuses on variations due to application of mMTC technology among the steps of FIG. 3.

In step S1 of FIG. 3, the UE receives a UL grant from the 5G network to transmit specific information to the 5G network. Here, the UL grant may include information for the number of repetitions of transmission of the specific information, and the specific information may be repeatedly transmitted based on the information for the number of repetitions. That is, the UE transmits the specific information to the 5G network based on the UL grant. Repeated transmission of the specific information may be carried out via frequency hopping, and first specific information may be transmitted in a first frequency resource, and second specific information may be transmitted in a second frequency resource. The specific information may be transmitted via the narrowband of 6 resource blocks (6RB) or 1RB.

The above-described 5G communication technology may be combined with the methods described below according to the disclosure or may be provided to specify or clarify the technical features of the methods proposed herein.

Meanwhile, the above descriptions of the user equipment (UE) may be applied to the robot 100 and/or server 200 which is an embodiment of the AI device described in connection with FIGS. 4 to 7.

That is, the user equipment (UE) may be configured of an AI device. Specifically, the UE may be the robot 100 or server 200 that includes an AI processor or an AI module and has artificial intelligence learning/training capability.

H. A Robot Implemented as an Example AI Device

FIG. 4 is a view illustrating a configuration of a robot according to an embodiment of the disclosure. However, the robot 400 shown in FIG. 4 is simply so denoted to specify the role and features of the user equipment. The robot 100 may include an AI processor or AI module in which case the robot 100 serves as an AI device. Thus, in such a case, the robot 100 of FIG. 4 may also be referred to as an AI device.

Further, the robot 100 may be configured to perform data communication with an AI device although it does not include an AI processor or AI module. In this case, because of being able to have AI learning capability via data communication with an AI device despite lacking the features of an AI device, the robot 100 may be regarded as an AI device in broad interpretations.

Thus, according to the disclosure, the user equipment may be denoted an AI device or robot. However, for ease of description, reference number 100 of FIG. 4 denotes a robot. Further, for ease of description, the robot 100 of FIG. 4 includes a learning unit 130 which is an AI module, as an example.

Referring to FIG. 4, the robot 100 may include, e.g., a communication unit 110, an input unit 120, a learning unit 130, a sensing unit 140, an output unit 150, a memory 170, and a processor 180.

The communication unit 110 may transmit and receive data to/from other devices, e.g., other user equipment, AI device, or robot, or server or other external devices, via wired/wireless communication technology. For example, the communication unit 110 may transmit and receive, e.g., sensor information, user input, learning models, and control signals, to/from external devices.

The communication unit 110 may also perform data transmission/reception with other various components of the robot 100, such as the input unit 120, learning unit 130, sensing unit 140, output unit 150, memory 170, and processor 180.

The communication module 110 may use various communication schemes, such as global system for mobile communication (GSM), code division multiple access (CDMA), long-term evolution (LTE), 5th generation (5G), wireless local area network (WLAN), wireless-fidelity (Wi-Fi), Bluetooth™, radio frequency identification (RFID), infrared data association (IrDA), ZigBee, or near field communication (NFC).

The input unit 120 may obtain various types of data. The input unit 120 may include a camera 121 for inputting image signals, a microphone 122 for receiving audio signals, and a user input unit 123 for receiving information from the user. The camera or microphone may be taken as a sensor, and a signal obtained by the camera or microphone may be referred to as sensing data or sensor information.

The input unit 120 may obtain and learn input data which is to be used when obtaining output using a learning model and learning data for machine learning. The input unit 120 may obtain unprocessed input data in which case the processor 180 or learning processor 130 may extract input features by pre-processing the input data.

The input unit 120 may include a camera 121 for inputting image signals, a microphone 122 for receiving audio signals, and a user input unit 123 for receiving information from the user.

The voice data or image data gathered by the input unit 120 may be analyzed and be processed by the user's control command.

The input unit 120 may be one for inputting information from the user or image information (or signal), audio information (or signal), or data, and the input unit 120 may include one or more cameras 121.

The camera 121 processes image frames, such as still images or videos, obtained by the image sensor in video call mode or recording mode. The processed image frames may be displayed on the display unit 151 or be stored in the memory 170.

The microphone 122 processes external sound signals into electrical voice data. The processed voice data may be utilized in various manners according to the function performed by the robot 100 (or an application program running on the robot 100). Various noise canceling algorithms may be applied to remove noise generated while the microphone 122 receives external sound signals.

The user input unit 123 may be provided for receiving information from the user. When information is input through the user input unit 123, the processor 180 may control the operation of the robot 100 corresponding to the input information.

The user input unit 123 may include a mechanical input means (or mechanical keys, e.g., buttons, dome switches, a jog wheel, or jog switch positioned on the front/back or side surface of the robot 100) and a touch-type input means. As an example, the touch-type input means may include virtual keys, soft keys, or visual keys displayed on the touchscreen via software processing or touch keys disposed on a portion other than the touchscreen.

The learning unit 130 may include an AI device, an AI module, or an AI processor. However, the learning unit 130 included in the robot 100 may be formed of, at least, an AI module or AI processor itself. In the following description, the learning unit 130 is configured as an AI module.

The learning unit 130 may train a model constituted of an ANN using learning data. The trained ANN may be referred to as a learning model. The learning model may be used to infer resultant values for new input data, rather than learning data, and the inferred values may be used as a basis for determining a certain operation.

Thus, the learning unit 130 may include a memory 135 and communication unit 137, separately from the AI processor 131. The AI processor 131 communicates with other component in the robot 100 and/or an external device via the communication unit 110 and stores learning data in the memory 170.

Referring to FIG. 5, the learning unit 130 which is an AI module is described in greater detail. FIG. 5 is a block diagram illustrating an AI module according to an embodiment of the disclosure.

The AI processor 131 may train the ANN based on the program stored in the memory 135. In particular, the AI processor 131 may train a neural network for recognizing relevant data. The neural network for recognizing the relevant data of the washer 10 may be designed to mimic the human brain on the computer and may include a plurality of weighted network nodes which mimic the neurons of the human neural network. The plurality of network nodes can transmit and receive data in accordance with each connection relationship to simulate the synaptic activity of neurons in which neurons transmit and receive signals through synapses. Here, the neural network may include a deep learning model developed from a neural network model. In the deep learning model, a plurality of network nodes is positioned in different layers and can transmit and receive data in accordance with a convolution connection relationship. The neural network, for example, includes various deep learning techniques such as deep neural networks (DNN), convolutional deep neural networks (CNN), recurrent neural networks (RNN), a restricted Boltzmann machine (RBM), deep belief networks (DBN), and a deep Q-network, and can be applied to fields such as computer vision, voice recognition, natural language processing, and voice/signal processing.

Meanwhile, a processor that performs the functions described above may be a general purpose processor (e.g., a CPU), but may be an AI-only processor (e.g., a GPU) for artificial intelligence learning.

The memory 135 can store various programs and data for the operation of the Learning unit 130. The memory 135 may be a nonvolatile memory, a volatile memory, a flash-memory, a hard disk drive (HDD), a solid state drive (SDD), or the like. The memory 135 is accessed by the AI processor 131 and reading-out/recording/correcting/deleting/updating, etc. of data by the AI processor 131 can be performed. Further, the memory 135 can store a neural network model (e.g., a deep learning model 136) generated through a learning algorithm for data classification/recognition according to an embodiment of the disclosure.

Meanwhile, the AI processor 131 may include a data learning unit 132 that learns a neural network for data classification/recognition. The data learning unit 132 can learn references about what learning data are used and how to classify and recognize data using the learning data in order to determine data classification/recognition. The data learning unit 132 can learn a deep learning model by acquiring learning data to be used for learning and by applying the acquired learning data to the deep learning model.

The data learning unit 132 may be manufactured in the type of at least one hardware chip and mounted on the Learning unit 130. For example, the data learning unit 132 may be manufactured in a hardware chip type only for artificial intelligence, and may be manufactured as a part of a general purpose processor (CPU) or a graphics processing unit (GPU) and mounted on the Learning unit 130. Further, the data learning unit 132 may be implemented as a software module. When the data leaning unit 132 is implemented as a software module (or a program module including instructions), the software module may be stored in non-transitory computer readable media that can be read through a computer. In this case, at least one software module may be provided by an OS (operating system) or may be provided by an application.

The data learning unit 132 may include a learning data acquiring unit 133 and a model learning unit 134.

The learning data acquiring unit 133 can acquire learning data required for a neural network model for classifying and recognizing data. For example, the learning data acquiring unit 133 can acquire, as learning data, vehicle data and/or sample data to be input to a neural network model.

The model learning unit 134 can perform learning such that a neural network model has a determination reference about how to classify predetermined data, using the acquired learning data. In this case, the model learning unit 134 can train a neural network model through supervised learning that uses at least some of learning data as a determination reference. Alternatively, the model learning unit 134 can train a neural network model through unsupervised learning that finds out a determination reference by performing learning by itself using learning data without supervision. Further, the model learning unit 134 can train a neural network model through reinforcement learning using feedback about whether the result of situation determination according to learning is correct. Further, the model learning unit 134 can train a neural network model using a learning algorithm including error back-propagation or gradient decent.

When a neural network model is learned, the model learning unit 134 can store the learned neural network model in the memory. The model learning unit 134 may store the learned neural network model in the memory of a server connected with the Learning unit 130 through a wire or wireless network.

The data learning unit 132 may further include a learning data preprocessor (not shown) and a learning data selector (not shown) to improve the analysis result of a recognition model or reduce resources or time for generating a recognition model.

The learning data preprocessor can preprocess acquired data such that the acquired data can be used in learning for situation determination. For example, the learning data preprocessor can process acquired data in a predetermined format such that the model learning unit 134 can use learning data acquired for learning for image recognition.

Further, the learning data selector can select data for learning from the learning data acquired by the learning data acquiring unit 133 or the learning data preprocessed by the preprocessor. The selected learning data can be provided to the model learning unit 134. For example, the learning data selector can select only data for objects included in a specific area as learning data by detecting the specific area in an image acquired through a camera of a vehicle.

Further, the data learning unit 132 may further include a model estimator (not shown) to improve the analysis result of a neural network model.

The model estimator inputs estimation data to a neural network model, and when an analysis result output from the estimation data does not satisfy a predetermined reference, it can make the model learning unit 134 perform learning again. In this case, the estimation data may be data defined in advance for estimating a recognition model. For example, when the number or ratio of estimation data with an incorrect analysis result of the analysis result of a recognition model learned with respect to estimation data exceeds a predetermined threshold, the model estimator can estimate that a predetermined reference is not satisfied.

Referring back to FIG. 4, the sensing unit 140 may obtain at least one of internal information of the robot 100, ambient environment information of the robot 100, and user information via various sensors.

The sensing unit 140 may include, e.g., a proximity sensor, an illuminance sensor, an acceleration sensor, a magnetic sensor, a gyro sensor, an inertia sensor, a red-green-blue (RGB) sensor, an infrared (IR) sensor, a fingerprint recognition sensor, an ultrasonic sensor, a light sensor, a microphone, a lidar, or radar.

Referring to FIG. 4, the output unit 150 may include at least one of a display unit 151, a sound output unit 152, a haptic module 153, or an optical output unit 154.

The display unit 151 displays (outputs) information processed by the robot 100. For example, the display unit 151 may display execution screen information for the application program running on the robot 100 or user interface (UI) or graphic user interface (GUI) according to the execution screen information.

The display unit 151 may be layered or integrated with a touch sensor, implementing a touchscreen. The touchscreen may function as the user input unit 123 to provide an input interface between the robot 100 and the user, as well as an output interface between the user and the UE 100.

The sound output unit 152 may output audio data stored in the memory 170 or received from the communication unit 110 in, e.g., a call signal reception, call or recording mode, voice recognition mode, or broadcast reception mode.

The sound output unit 152 may include at least one or more of a receiver, a speaker, and a buzzer.

The haptic module 153 generates various tactile effects that may be felt by the user. A representative example of the haptic effects generated by the haptic module 153 may be a vibration.

The optical output unit 154 outputs a signal for indicating an occurrence of an event using light from a light source. Examples of the event occurring in the robot 100 may include receiving a message or a call signal, a missing call, an alarm, a schedule notification, receiving an email, or receiving information via an application.

As an example device for controlling the robot according to an embodiment of the disclosure, an AI server is described below with reference to FIG. 6. FIG. 6 is a block diagram illustrating an AI server according to an embodiment of the disclosure.

Since the robot 100 of FIG. 4 includes an AI module to serve as an AI device on its own, the robot 100 of FIG. 6 may be denoted an AI device 100.

Referring to FIG. 6, the AI server 200 may mean a device which trains the ANN using a machine learning algorithm or uses the trained ANN. The AI server 200 may be constituted of a plurality of servers for distributed processing and may be defined as one component of a 5G network. The AI server 200, together with the AI device 100, may constitute the 5G network or the AI server 200 may perform at least part of the AI processing performed by the AI device 100.

The AI server 200 may include a separate communication unit 210, a memory 230, a learning processor 240, and a processor 260.

The communication unit 210 may transmit and receive data to/from an external device, e.g., the AI device 100.

The memory 230 may include a model storage unit 231. The model storage unit 231 may store a model (or ANN 231a) which is being trained or has been trained by the learning processor 240.

The learning processor 240 is configured to play the same role as the AI processor 131 and is so denoted to differentiate between the processor included in the AI server 200 and the processor included in the AI device 100. Thus, the learning processor 240 may be configured to have the same functions and effects as those of the AI processor 131. Hence, the learning processor 240 may train the ANN 231a using learning data. The learning model may be equipped and used in the AI server 200 of the artificial neural network or, as described above, may be equipped and used, in the form of the AI processor 131 equipped in the AI device 100, in an external device.

The learning model may be implemented in hardware, software, or a combination thereof. When the whole or part of the learning model is implemented in software, one or more instructions constituting the learning model may be stored in the memory 230.

The processor 260 may infer a resultant value for new input data using the learning model and generate a response or control command based on the inferred resultant value.

Since the learning unit 130 of the AI device 100 is able to perform AI processing along with the AI processor 240 of the AI server 200, the deep learning model 136 included in the learning unit 130 may be stored in the memory included in the AI server 200.

An AI system according to an embodiment of the disclosure is described below with reference to FIG. 7. According to an embodiment of the disclosure, the AI system 1 may use the AI server 200 to control a plurality of robots, and each robot 100 may perform data communication with the AI server 200. According to an embodiment, as described above, each robot 100 may include an AI module so that it by itself may be implemented as an AI device 100. Thus, the robots 100 may perform data communication with each other. The data communication therebetween may be performed by the above-described 5G network standards.

The AI system 1 described with reference to FIG. 7 is merely an embodiment to practice the disclosure. Thus, according to another embodiment of the disclosure, the AI system 1 may use a master robot, instead of the AI server 200, to control the plurality of robots.

Referring to FIG. 7, according to an embodiment, the AI system 1 includes an AI server 200, a robot 100a as at least one user equipment, an autonomous vehicle 100b, an XR device 100c, a smartphone 100d and/or a home appliance 100e.

According to an embodiment, in the AI system 1, the AI server 200, the robot 100a as at least one user equipment, the autonomous vehicle 100b, the XR device 100c, the smartphone 100d, and/or the home appliance 100e may be connected with at least one other user equipment over the cloud network 10, and the cloud network 10 may mean a network constituting part of, or present in, a cloud computing infrastructure. The cloud network 10 may be configured as a 3G network, 4G network, a long-term evolution (LTE) network, or 5G network.

Here, AI technology may be applied to the robot 100a, autonomous vehicle 100b, XR device 100c, smartphone 100d, and/or home appliance 100e, as well as the AI server 200, and they may be denoted AI devices 100a to 100e. However, the devices are so termed as shown in FIG. 7 to intuitively grasp the respective functions of the devices.

Since the devices 100a to 100e and 200 which are UEs constituting the AI system 1 are connected with each other via the cloud network 10, the devices 100a to 100e and 200 may communicate with each other directly or via a base station.

The AI server 200 may include a server for performing AI processing and a server for performing computation on bigdata.

The AI server 200 may be connected, via the cloud network 10, with at least one or more of the robot 100a, the autonomous vehicle 100b, the XR device 100c, the smartphone 100d, or the home appliance 100e which are AI devices constituting the AI system 1 and may at least partially assist in AI processing of the connected AI devices 100a to 100e.

The AI server 200 may train an ANN according to a machine learning algorithm, on behalf of each AI device 100a to 100e and may directly store a learning model or transfer the learning model to the AI devices 100a to 100e.

The AI server 200 may receive input data from each AI device 100a to 100e, infer a resultant value for the received input data using the learning model, generate a control command or response based on the inferred resultant value, and transmit the response or control command to the AI devices 100a to 100e.

Each AI devices 100a to 100e themselves may infer resultant values for the input data using the learning model and generate responses or control commands based on the inferred resultant values.

Hereinafter, some exemplary embodiments of the AI system 1 are described.

<AI+Robot>

The robot 100a may adopt AI technology and may be implemented as a guider robot, a transportation robot, a robot vacuum, a wearable robot, an entertainment robot, a robot pet, or an unmanned aerial robot.

The robot 100a may include a robot control module for controlling the operation, and the robot control module may mean a software module or a hardware chip in which the software module is implemented.

The robot 100a may obtain status information about the robot 100a using sensor information obtained from various kinds of sensors, detect (recognize) the ambient environment and objects, generate map data, determine a driving route and plan, determine a response to the user's interaction, or determine operations.

The robot 100a may use sensor information obtained from at least one or more sensors among a lidar, radar, and camera so as to determine a driving route and plan.

The robot 100a may perform the above-mentioned operations using a learning model constituted of at least one or more ANNs. For example, the robot 100a may recognize the ambient environment and objects using the learning model and determine operations using the recognized ambient environment information or object information. The learning model may be learned directly by the robot 100a or by an external device, e.g., the AI server 200.

The robot 100a itself may generate a result using the learning model to thereby perform an operation or the robot 100a may transmit sensor information to an external device, e.g., the AI server 200, receive a result generated by the external device and perform an operation.

The robot 100a may determine a driving route and plan using at least one or more of object information detected from the sensor information or object information obtained from the external device and control the driver to drive the robot 100a according to the determined driving route and plan.

The map data include object identification information about various objects arranged in the space where the robot 100a travels. For example, the map data may include identification information about stationary objects, e.g., walls and doors, and movable objects, e.g., pots and desks. The object identification information may include names, kinds, distances, and locations.

The robot 100a may control the driver based on the user's control/interaction to thereby perform an operation or drive. The robot 100a may obtain intent information about the interaction according to the user's motion or voice utterance, determine a response based on the obtained intent information, and perform an operation.

<AI+Autonomous Vehicle>

The autonomous vehicle 100b may adopt AI technology and may be implemented as a mobile robot, vehicle, or unmanned aerial vehicle (UAV).

The autonomous vehicle 100b may include an autonomous driving control module for controlling autonomous driving functions, and the autonomous driving control module may mean a software module or a hardware chip in which the software module is implemented. The autonomous driving control module may be included, as a component of the autonomous vehicle 100b, in the autonomous vehicle 100b or may be configured as a separate hardware device outside the autonomous vehicle 100b and be connected with the autonomous vehicle 100b.

The autonomous vehicle 100b may obtain status information about the autonomous vehicle 100b using sensor information obtained from various kinds of sensors, detect (recognize) the ambient environment and objects, generate map data, determine a driving route and plan, or determine operations.

The autonomous vehicle 100b may use sensor information obtained from at least one or more sensors among a lidar, radar, and camera so as to determine a driving route and plan as does the robot 100a.

The autonomous vehicle 100b may recognize the environment of, or objects in an area where the view is blocked or an area away in a predetermined distance or more by receiving sensor information from external devices or may receive recognized information directly from the external devices.

The autonomous vehicle 100b may perform the above-mentioned operations using a learning model constituted of at least one or more ANNs. For example, the autonomous vehicle 100b may recognize the ambient environment and objects using the learning model and determine a driving route using the recognized ambient environment information or object information. The learning model may be learned directly by the autonomous vehicle 100b or by an external device, e.g., the AI server 200.

The autonomous vehicle 100b itself may generate a result using the learning model to thereby perform an operation or the autonomous vehicle 100b may transmit sensor information to an external device, e.g., the AI server 200, receive a result generated by the external device and perform an operation.

The autonomous vehicle 100b may determine a driving route and plan using at least one or more of object information detected from the sensor information or object information obtained from the external device and control the driver to drive the autonomous vehicle 100b according to the determined driving route and plan.

The map data include object identification information about various objects placed in the space where the autonomous vehicle 100b drives. For example, the map data may include identification information about stationary objects, e.g., street lights, rocks, or buildings, and movable objects, e.g., vehicles or pedestrians. The object identification information may include names, kinds, distances, and locations.

The autonomous vehicle 100b may control the driver based on the user's control/interaction to thereby perform an operation or drive. The autonomous vehicle 100b may obtain intent information about the interaction according to the user's motion or voice utterance, determine a response based on the obtained intent information, and perform an operation.

<AI+XR>

The XR device 100c may adopt AI technology and may be implemented as a head-mount display (HMD), a head-up display (HUD) equipped in a vehicle, a television, a mobile phone, a smartphone, a computer, a wearable device, a home appliance, digital signage, a vehicle, a stationary robot, or a movable robot.

The XR device 100c may analyze three-dimensional (3D) point cloud data or image data obtained from an external device or via various sensors and generate location data and property data about 3D points, thereby obtaining information about the ambient environment or real-world objects and rendering and outputting XR objects. For example, the XR device 100c may match an XR object including additional information about a recognized battery to the recognized object and output the resultant XR object.

The XR device 100c may perform the above-mentioned operations using a learning model constituted of at least one or more ANNs. For example, the XR device 100c may recognize a real-world object from the 3D point cloud data or image data using the learning model and provide information corresponding to the recognized real-world object. The learning model may be learned directly by the XR device 100c or by an external device, e.g., the AI server 200.

The XR device 100c itself may generate a result using the learning model to thereby perform an operation or the XR device 100c may transmit sensor information to an external device, e.g., the AI server 200, receive a result generated by the external device and perform an operation.

<AI+Robot+Autonomous Vehicle>

The robot 100a may adopt AI and autonomous driving technology and may be implemented as a guider robot, a transportation robot, a robot vacuum, a wearable robot, an entertainment robot, a robot pet, or an unmanned aerial robot.

The AI technology and autonomous driving technology-adopted robot 100a may mean an autonomous drivable robot or the robot 100a interacting with the autonomous vehicle 100b.

The autonomous drivable robot 100a may refer to any device which may travel on its own along a given driving route even without the user's control or itself determine and travel a driving route.

The autonomous drivable robot 100a and the autonomous vehicle 100b may use a common sensing method to determine one or more of a driving route or driving schedule. For example, the autonomous drivable robot 100a and the autonomous vehicle 100b may determine one or more of a driving route or a driving schedule using information sensed by a lidar, radar, or camera.

The robot 100a interacting with the autonomous vehicle 100b may be present separately from the autonomous vehicle 100b and perform operations associated with the autonomous driving capability inside the autonomous vehicle 100b or associated with the user aboard the autonomous vehicle 100b.

The robot 100a interacting with the autonomous vehicle 100b, on behalf of the autonomous vehicle 100b, may obtain sensor information and provide the sensor information to the autonomous vehicle 100b, or the robot 100a may obtain sensor information, generate ambient environment information or object information, and provide the ambient environment information or object information to the autonomous vehicle 100b, thereby controlling or assisting in the autonomous driving capability of the autonomous vehicle 100b.

The robot 100a interacting with the autonomous vehicle 100b may monitor the user aboard the autonomous vehicle 100b or control the functions of the autonomous vehicle 100b via interactions with the user. For example, when the driver is determined to node off, the robot 100a may activate the autonomous driving function of the autonomous vehicle 100b or assist in the control of the driving unit of the autonomous vehicle 100b. The functions of the autonomous vehicle 100b, controlled by the robot 100a, may include not merely the autonomous driving function but also the functions which the navigation system or audio system in the autonomous vehicle 100b provide.

The robot 100a interacting with the autonomous vehicle 100b may provide information to the autonomous vehicle 100b outside the autonomous vehicle 100b or may assist in the functions of the autonomous vehicle 100b. For example, the robot 100a may provide traffic information including signal information to the autonomous vehicle 100b, e.g., as does a smart traffic light, or may interact with the autonomous vehicle 100b to automatically connect an electric charger to the charging port, e.g., as does an auto-electric charger of electric vehicle.

<AI+Robot+XR>

The robot 100a may adopt AI technology and XR technology and may be implemented as a guider robot, a transportation robot, a robot vacuum, a wearable robot, an entertainment robot, a robot pet, an unmanned aerial robot, or a drone.

The XR technology-adopted robot 100a may mean a robot targeted for control/interaction in an XR image. In this case, the robot 100a may be distinguished from the XR device 100c and they may interact with each other.

When the robot 100a targeted for control/interaction in the XR image obtains sensor information from sensors including a camera, the robot 100a or the XR device 100c may generate an XR image based on the sensor information, and the XR device 100c may output the generated XR image. The robot 100a may be operated based on the user's interactions or control signals received via the XR device 100c.

For example, the user may identify the XR image corresponding to the gaze of the robot 100a remotely interacting via an external device, e.g., the XR device 100c, and adjust the autonomous driving route of the robot 100a, control operations or driving of the robot 100a, or identify information about ambient objects via the interactions.

<AI+Autonomous Driving+XR>

The autonomous vehicle 100b may adopt AI and XR technology and may be implemented as a mobile robot, vehicle, or unmanned aerial vehicle (UAV).

The XR technology-adopted autonomous vehicle 100b may mean, e.g., an autonomous vehicle equipped with an XR image providing means or an autonomous vehicle targeted for control/interactions in the XR image. The autonomous vehicle 100b targeted for control/interactions in the XR image may be distinguished from, and interact with, the XR device 100c.

The autonomous vehicle 100b equipped with the XR image providing means may obtain sensor information from sensors including a camera and output an XR image generated based on the obtained sensor information. For example, the autonomous vehicle 100b may have an HUD and output an XR image, thereby providing an XR object corresponding to the real-world object or an object on screen to the passenger.

When the XR object is output on the HUD, at least part of the XR object may be output, overlaid on the real-world object the passenger's gaze is facing. In contrast, when the XR object is output on a display provided inside the autonomous vehicle 100b, at least part of the XR object may be output, overlaid on the object on the screen. For example, the autonomous vehicle 100b may output XR objects corresponding to such objects as lanes, other vehicles, traffic lights, traffic signs, motorcycles, pedestrians, or buildings.

When the autonomous vehicle 100b targeted for control/interaction in the XR image obtains sensor information from sensors including a camera, the autonomous vehicle 100b or the XR device 100c may generate an XR image based on the sensor information, and the XR device 100c may output the generated XR image. The autonomous vehicle 100b may be operated based on the user's interactions or control signals received via an external device, e.g., the XR device 100c.

A device for controlling a robot and a method for controlling the robot by the device are described below in detail with reference to FIGS. 8 to 31, according to an embodiment of the disclosure. According to an embodiment, the robot controlling device may be configured as the above-described AI device or as an AI feature-embedded master robot or AI server 200. For ease of description, the robot controlling device is configured as an AI server as an example. However, embodiments of the AI device are not limited by the following description.

According to an embodiment, the robot controlling device, i.e., the AI server, may be configured in the same manner as the AI server 200 of FIG. 6. For ease of description, the robot controlling device is hereinafter referred to as an AI server 200.

According to an embodiment of the disclosure, the robot may encompass a regular robot lacking the AI feature and an AI feature-equipped artificial intelligence robot. Where the robot is implemented as an AI feature-equipped AI robot, the robot may have the same configuration as the robot 100 of FIG. 4. Thus, the robot controlled by the AI server 200 is denoted as the robot 100 regardless of whether it has the AI features. However, this is merely for illustration purposes, and denoting as the robot 100 does not necessarily mean that the robot 100 lacks the AI features.

According to an embodiment, the AI server 200, along with other device, e.g., other robot and/or other server, may constitute the above-described 5G network. The other robot and/or other server may, together with the AI server 200 according to an embodiment, form a 5G network regardless of whether it has AI features.

In other words, according to an embodiment, the AI server 200 may perform data communication with at least one or more other robots 100, other AI robots 100, other servers 200, and other AI servers 200 and may determine the unit quarters where the other robot 100 and other AI robot 100 are to be deployed, the driving route to the area, and tasks to be performed in the area.

The AI server 200 may be configured as part of a control system controlling a plurality of robots deployed in various facilities, such as airports, stations, movie theaters, or shopping malls. In this case, as shown in FIG. 7, according to an embodiment of the disclosure, the robot controlling device may be configured as the AI system 1. In such a case, the AI server 200 may control other various UEs, e.g., the autonomous vehicle 100*b*, XR device 100*c*, smartphone 100*d*, and home appliance 100*e*, than the robot 100*a*.

To control a plurality of robots deployed in a certain area in various facilities such as airports, stations, movie theaters, or shopping malls, the AI server 200 may be configured to split the area into a plurality of unit quarters and monitor the unit quarters in various ways. Thus, the certain area may be regarded as a control quarter monitored by the AI server 200. The certain area may mean a set of unit quarters where the AI server 200 provides various services via the robots 100 or all of the unit quarters and the certain area may also be denoted the entire quarter. That is, the AI server 200 controls the robots 100 to operate within the control quarter. The certain area, as the control quarter, may mean the maximum activity range of the robot 100.

Meanwhile, the plurality of unit quarters included in the certain area may be set in predetermined shapes and sizes.

Each unit quarter may be shaped as a rectangle, square, pentagon, or hexagon. The unit quarters may have the same shape and size. However, this is merely an example of the unit quarter, and the shape and size of the unit quarter are not limited thereto.

The memory 230 of the AI server 200 may store location information indicating the location of each unit quarter. The location information includes all of the GPS coordinates of the unit quarters and/or coordinates according to the building architectural drawings.

A process of controlling the robots 100 by the AI server 200 is described below with reference to FIG. 8. FIG. 8 is a flowchart illustrating an example of controlling robots by a control device according to an embodiment of the disclosure.

Referring to FIG. 8, a processor 260 of an AI server 200 gathers state information for each of a plurality of unit quarters via a communication unit 210. The state information includes the kind of stores located in the unit quarter, sensors deployed in the unit quarter and sensing data, the kind of safety devices installed in the unit quarter, images and voice data for the unit quarter.

As an example of gathering state information for each unit quarter, the AI server 200 may receive captured images for the unit quarter and voice data. Thus, an example of receiving voice data and captured images for each unit quarter by the AI server 200 is described below.

The AI server 200 may receive image data captured for the unit quarter from the robots previously deployed in each unit quarter (S110). That is, the robots distributed in the plurality of unit quarters may capture their respective unit quarters using their cameras and transmit image data for the captured unit quarters to the AI server 200.

The AI server 200 may receive image data captured for each unit quarter from at least one stationary cameras capturing a predetermined area. The stationary camera for capturing each unit quarter may include a surveillance camera or closed circuit television (CCTV).

As described above, according to an embodiment, the AI server 200 may receive, along with the image data, voice data uttered by the people in each unit quarter from at least one or more microphones installed in each unit quarter. The people in each unit quarter may be potential users that may use the robot 100 and may be denoted as users.

According to an embodiment, the AI server 200 may receive the users' voice data through the microphones of the robots 100 pre-deployed in each unit quarter. That is, the robots pre-deployed in each unit quarter may gather the users' utterances in their located unit quarters using the microphones and transmit voice data for the gathered utterances to the AI server 200.

Referring to FIG. 8, the AI server 200 may figure out the number of users located in each unit quarter using the voice and image data gathered per unit quarter and calculate the density indicating how many users are located in each unit quarter (S120).

That is, the processor 260 included in the AI server 200 may absolutely or relatively compare the number of users located in each unit quarter and the number of users located in the other unit quarters using the image and voice data gathered per unit quarter and calculate the density of users per unit quarter (S120).

As used herein, "density" may denote the respective densities of the unit quarters included in a certain area, as well as a representative density of the certain area. Thus, according to an embodiment, the processor 260 of the AI server 200 may calculate all of the density for the entire certain area, the respective densities for the unit quarters of the certain area, and the density of each unit quarter group of a predetermined number of unit quarters.

As used herein, unit quarter group is smaller than the certain area but larger than each unit quarter and means a combination of the individual unit quarters.

Although the processor 260 of the AI server 200 calculates the densities for a certain area, individual unit quarters, and unit quarter groups at the current time of gathering image and voice data (which may be denoted as current densities), as default, the processor 260 of the AI server 200 may also calculate the densities for the certain area, individual unit quarters, and unit quarter groups at a prior time using the image and/or voice data gathered at a prior time (which may be denoted as past densities).

To calculate the density, according to an embodiment, the processor 260 of the AI server 200 may calculate the number of users located in the individual unit quarter, determine the calculated number of users as the density of each unit quarter, and then calculate the density of unit quarter group based on the density of each unit quarter.

Referring to FIG. 9, according to an embodiment, a method of determining the number of users in the individual unit quarter to calculate the current density by the processor 260 of the AI server 200 is described below in detail. FIG. 9 is a flowchart illustrating a method of calculating the number of users in an individual unit quarter by an AI server 200 according to an embodiment of the disclosure.

Referring to FIG. 9, the processor 260 of the AI server 200 may receive image data captured for the unit quarter from robots 100 previously deployed in each unit quarter (S1101). The processor 260 of the AI server 200 may receive image data captured for each unit quarter from at least one or more surveillance cameras capturing a certain area (S1101).

The processor 260 of the AI server 200 may receive, along with the image data, voice data for the utterances of the people in each unit quarter from at least one or more microphones installed in each unit quarter (S1101). The processor 260 of the AI server 200 may receive the users' voice data through the microphones of the robots 100 pre-deployed in each unit quarter (S1101).

The processor 260 of the AI server 200 may extract the faces or overall shapes of the users from the received image data (S1102) and analyze whether the extracted faces or shapes indicate a human (S1103).

The processor 260 may extract the faces or overall shapes of the users from the image data using an image recognition model (S1102) and perform analysis and learning as to whether they are a human face or shape (S1103). The image recognition model may be an artificial neural network-based model trained using a deep learning algorithm or machine learning algorithm.

The processor 260 may extract the user's voice from the received voice data (S1102) and analyze whether the extracted voice is a human voice (S1103).

In this case, the processor 260 may extract a plurality of frequency bands from the voice data (S1102) and determine the number of frequencies corresponding to a human voice frequency band among the plurality of frequency bands extracted using a voice recognition model (S1103). The voice recognition model may be an artificial neural network-based model trained using a deep learning algorithm or machine learning algorithm.

The processor 260 of the AI server 200 may determine the number of users in each unit quarter based on the number of images determined based on the users' faces or shapes and/or the number of frequencies determined based on the users' voices (S1104).

When the processor 260 of the AI server 200 determines the number of users in the individual unit quarter, the processor 260 of the AI server 200 calculates the densities for the individual unit quarters, unit quarter groups, and the certain area as shown in FIG. 8 (S120).

A process of calculating the density by the processor 260 of the AI server 200, according to an embodiment, is described below in detail with reference to FIGS. 10 to 14.

FIG. 10 is a flowchart illustrating a method of calculating a density for an individual unit quarter, a unit quarter group, and a predetermined area by an AI server 200 according to an embodiment of the disclosure. FIG. 11 is a view illustrating a density measured per unit quarter according to an embodiment of the disclosure.

Referring to FIG. 10, the processor 260 of the AI server 200 determines the number of users in each individual unit quarter and converts the determined number into the density of the unit quarter (S1201). This process is described with reference to FIG. 11. The certain area 600 may be divided into a plurality of unit quarters 601, 602, 603, 604, and 605, and the certain area 600 includes the plurality of unit quarters.

Although FIG. 11 illustrates an example in which the certain area 600 includes 25 unit quarters 601, 602, 603, 604, and 605 arranged in a 5×5 pattern, this is merely an example.

For example, the certain area 600 may be configured of 15 square unit quarters arranged in a 3×5 pattern or of 16 square unit quarters arranged in a 4×4 pattern. The certain area and the unit quarters may be configured in other various patterns or shapes.

As shown in FIG. 11, the density measured per unit quarter 601, 602, 603, 604, and 605 is marked in the unit quarter. Thus, the number marked in each individual unit quarter means the density of the unit quarter.

For example, the unit quarters 601, 602, 603, 604, and 605 in the first row of the certain area 600 have the densities [1, 3, 0, 2, 5], respectively. The processor 260 of the AI server 200 calculates the density based on the number of users in each unit quarter.

The memory 230 of the AI server 200 may store location information indicating the locations of the individual unit quarters 601, 602, 603, 604, and 605. The location information for the unit quarters 601, 602, 603, 604, and 605 may be geographical or building architectural coordinates with respect to the origin point of each unit quarter. Unless the memory 230 stores the location information for the individual unit quarters 601, 602, 603, 604, and 605, the processor 260 of the AI server 200, according to an embodiment, may obtain the location information for the unit quarters 601, 602, 603, 604, and 605 using a positioning module, such as a GPS module.

The processor 260 of the AI server 200 according to an embodiment calculates the density of the unit quarter group using the densities calculated per individual unit quarter 601, 602, 603, 604, and 605 as shown in FIG. 10 (S1202). That is, the processor 260 calculates the density of a certain unit quarter group using the mean of the densities calculated for the individual unit quarters 601, 602, 603, 604, and 605 (S1202).

A process of calculating the density of the unit quarter group is described in detail with reference to FIGS. 12 to 14. FIGS. 12, 13, and 14 are concept views illustrating a method of calculating the density of a unit quarter group by an AI server 200 according to an embodiment of the disclosure.

FIGS. 12 to 14 illustrate a process of calculating the densities of a plurality of unit quarter groups 710, 730, 750, 770, 810, 830, 850, 870, 910, 930, 950, and 970 based on the example of density distribution for the certain area 600 as shown in FIG. 11.

Referring to FIG. 12, a certain area 600 shaped as a 5×5 square may be divided into 4×4 squared unit quarter groups 710, 730, 750, and 770.

Since each unit quarter group 710, 730, 750, and 770 is configured as 4×4, each may include 16 unit quarters. Meanwhile, the location information for each unit quarter group 710, 730, 750, and 770 may previously be stored in the memory 230. Unless the location information for the unit quarter groups 710, 730, 750, and 770 is previously stored in the memory 230, the AI server 200 may calculate the location information for the origin point of the unit quarter group based on the location information for each unit quarter. The location information for each unit quarter group may be geographical or building architectural coordinates with respect to the origin point of each unit quarter group.

The processor 260 may average the densities of the unit quarters in each group and determine that the mean value is the density of the group. When the unit quarter groups 710, 730, 750, and 770 include a first group 710, a second group 730, a third group 750, and a fourth group 770, the density of the first group 710 may be the mean of the respective densities of the unit quarters included in the first group 710.

For example, the density of the first group 710 may be calculated as (1+3+0+2+4+3+2+1+0+8+2+1+5+3+2+5)/16=2.625, as shown in FIG. 12.

The density of the second group 730 is the mean of the respective densities of the unit quarters included in the second group 730. As shown in FIG. 11, the density of the second group 730 may be calculated as 3.375.

Likewise, the density of the third group 750 is the mean of the respective densities of the unit quarters included in the third group 750. Thus, the density of the third group 750 may be calculated as 2.813.

The density of the fourth group 770 is the mean of the respective densities of the unit quarters included in the fourth group 770. Thus, the density of the third group 770 may be calculated as 3.250.

As shown in FIG. 12, among the first to fourth groups 710, 730, 750, and 770, the second group 730 has the highest density, the fourth group 770 the next, the third 750 third highest, and the first group 710 is relatively lowest in density. The processor 260 of the AI server 200 sets the second group 730 as a first peak point, the fourth group 770 as a second peak point, and the third group 730 as a third peak point. The first to third in FIG. 12 may be distinguished by shading or hatching in each group.

The processor 260 of the AI server 200 may determine the quarter to which the robot 100 is supposed to first move in the certain area 600 or the moving route of the robot 100 based on the calculated densities of the first to fourth groups 710, 730, 750, and 770 and the above-described first to third peak point settings.

The densities of the first to fourth groups 710, 730, 750, and 770 may be used when the processor 260 determines the priority between the groups 710, 730, 750, and 770 as described above. The priority may mean the priority of destination to which the robot 100 is supposed to move.

For example, the higher density is, the higher priority the corresponding group may be assigned. Thus, as described above, in the certain area 600 of FIG. 12, the second group 730 is determined to be the first, the fourth group 770 the second, the third group 750 the third, and the first group 710 the last.

Referring to FIG. 13, the 4×4 square second group 730 may be divided into four first to fourth mid-size groups 810, 830, 850, and 870. The mid-size group has a 3×3 square shape and has nine unit quarters as shown in FIG. 13, as an example.

Although FIG. 13 illustrates an example in which the second group 730 is divided into a plurality of mid-size groups, other groups, e.g., the first, third, and fourth groups 710, 750, and 730, each may also be split into four mid-size groups. The example mid-size groups may have a 3×3 square shape.

Meanwhile, the location information for each mid-size group 810, 830, 850, and 870 may previously be stored in the memory 230. The location information for each mid-size group may be geographical or architectural coordinates of each mid-size group with respect to the origin point of each mid-size group. Unless the location information for the mid-size groups 810, 830, 850, and 870 is previously stored in the memory 230, the AI server 200 may calculate the location information for the origin point of the mid-size group based on the location information for each unit quarter.

According to an embodiment, the processor 260 of the AI server 200 may calculate the density of each of the plurality of mid-size groups 810, 830, 850, and 870 constituting the second group 730 so as to identify a denser quarter in the second group 730.

Referring to FIG. 13, the processor 260 of the AI server 200 may calculate the mean of the respective densities of the unit quarters included in each mid-size group and determine that the mean value is the density of the mid-size group. When 810, 830, 850, and 870 are a first mid-size group, a second mid-size group, a third mid-size group, and a fourth mid-size group, respectively, in FIG. 13, the density of the first mid-size group 810 is the mean of the respective densities of the plurality of unit quarters included in the first mid-size group 810. Thus, the density of the first mid-size group 810 may be calculated as (3+0+2+3+2+1+8+2+1)/9=2.444.

The density of the second mid-size group 830 is the mean of the respective densities of the unit quarters included in the second mid-size group 830. Thus, the density of the second mid-size group 830 may be calculated as 3.111.

The density of the third mid-size group 870 is the mean of the respective densities of the unit quarters included in the third mid-size group 870. Thus, the density of the third mid-size group 870 may be calculated as 3.0.

Likewise, the density of the fourth mid-size group 870 is the mean of the respective densities of the unit quarters included in the fourth mid-size group 870. Thus, the density of the fourth mid-size group 870 may be calculated as 3.333.

The so-calculated densities of the first to fourth mid-size groups 810, 830, 850, and 870 may be used to determine the quarter to which the robot 100 is supposed to first move in the second group 730 or the moving route of the robot.

The calculated densities of the first to fourth mid-size groups 810, 830, 850, and 870 may be used when the processor 260 of the AI server 200 determines the priority between the mid-size groups 810, 830, 850, and 870. The priority may mean the priority of destination to which the robot 100 is supposed to move.

For example, among the mid-size groups 810, 830, 850, and 870, the mid-size group with a relatively large density may be assigned a higher priority.

For example, as shown in FIG. 13, in the second group 730, the fourth mid-size group 870, the second mid-size group 830, the third mid-size group 850, and the first mid-size group 810 may be determined to have a first, second, third, and fourth priority, respectively.

The processor 260 of the AI server 200 may set the fourth mid-size group 870 as a first peak point, the second mid-size group 830 as a second peak point, and the third mid-size group 850 as a third peak point. The first to third in FIG. 13 may be distinguished by shading or hatching in each group.

Referring to FIG. 14, the 3×3 square fourth mid-size group 870 may be divided into four 2×2 square small-size groups 910, 930, 950, and 970.

Although FIG. 14 illustrates an example in which the fourth mid-size group 870 is divided into a plurality of small-size groups, other groups, e.g., the first to third mid-size groups 810, 830, and 850, each may also be split into four 2×2 square small-size groups.

Each small-size group 910, 930, 950, and 970 may be shaped as a 2×2 square and may include four unit quarters, and location information for each small-size group 910, 930, 950, and 970 may previously be stored in the memory 230.

Unless the location information for the small-size groups 910, 930, 950, and 970 is previously stored in the memory 230, the AI server 200 may calculate the location information for the origin point of the small-size group based on the location information for each unit quarter. The location information for each small-size group may be geographical or building architectural coordinates with respect to the origin point of each small-size group.

Meanwhile, the processor 260 of the AI server 200 may calculate the density of each of the plurality of small-size groups 910, 930, 950, and 970 constituting the fourth mid-size group 870 so as to identify a denser quarter in the fourth mid-size group 870.

The processor 260 of the AI server 200 may average the densities of the unit quarters in each small-size group 910, 930, 950, and 970 and determine that the mean value is the density of the small-size group. When the small-size groups 910, 930, 950, and 970 of FIG. 14 include a first small-size group 910, a second small-size group 930, a third small-size group 950, and a fourth small-size group 970, the density of the first small-size group 910 may be the mean of the respective densities of the unit quarters included in the first small-size group 910. Thus, the density of the first small-size group 910 may be calculated as (2+1+2+5)/4=2.5.

The density of the second small-size group 930 is the mean of the respective densities of the unit quarters included in the second mid-size group 930. Thus, the density of the second small-size group 930 may be calculated as 3.75.

The density of the third small-size group 950 is the mean of the respective densities of the unit quarters included in the third small-size group 950. Thus, the density of the third small-size group 950 may be calculated as 1.5.

The density of the fourth small-size group 970 is the mean of the respective densities of the unit quarters included in the fourth small-size group 970. Thus, the density of the fourth small-size group 970 may be calculated as 4.25.

The so-calculated densities of the first to fourth small-size groups 910, 930, 950, and 970 may be used when the processor 260 determines the quarter to which the robot 100 is supposed to first move in the fourth mid-size group 870 or the moving route of the robot 100.

The calculated densities of the first to fourth small-size groups 910, 930, 950, and 970 may be used when the processor 260 of the AI server 200 determines the priority between the small-size groups 910, 930, 950, and 970. The priority may mean the priority of destination to which the robot 100 is supposed to move.

For example, among the small-size groups 910, 930, 950, and 970, the small-size group with a relatively large density may be assigned a higher priority.

For example, in the fourth mid-size group 870, the fourth small-size group 970, the second small-size group 930, the first small-size group 910, and the third small-size group 950 may be determined to have a first, second, third, and fourth priority, respectively.

As such, the processor 260 of the AI server 200 according to an embodiment may divide the certain area 600 into individual unit quarters and unit quarter groups, which are combinations of the individual unit quarters, and calculates the density, which indicates the density of users in each unit quarter (S1203). Thus, the processor 260 of the AI server 200 according to an embodiment may precisely grasp the dense area where more users are located and control the route to allow the robots 100 to effectively approach the user dense area. In other words, the processor 260 of the AI server 200 according to an embodiment may control the robot 100 moving from a unit quarter to another to get to the destination while getting around the place crowded with people.

A process of determining the priority between unit quarter groups with the same density as calculated is described below with reference to FIGS. 15 and 16.

FIG. 15 is a flowchart illustrating a method of determining the priority between groups by a processor 260 of an AI server 200 when the same density applies to unit quarter groups, according to an embodiment of the disclosure.

Referring to FIG. 15, after performing step S1203 described above, the processor 260 of the AI server 200 identifies the density of each unit quarter group and determines whether there are unit quarters with the same density (S1204).

Upon identifying the presence of unit quarter groups with the same density, the processor 260 of the AI server 200 calculates the mean of the densities of the lower groups of each group (S1205). In other words, the processor 260 calculates the mean of the respective densities of the mid-size groups which are lower groups of the unit quarter group (S1205) and, if further needed, calculates the mean of the respective densities of the small-size groups which are lower groups of the mid-size groups (S1206).

The processor 260 compares the calculated mean densities to determine the priority between the unit quarter groups which are higher groups of the mid-size groups or to determine the priority between the mid-size groups which are higher groups of the small-size groups (S1207).

A specific example of the method of FIG. 15 is described below with reference to FIG. 16. FIG. 16 is a view illustrating an example of determining the priority between unit quarter groups when a plurality of unit quarter groups have the same density according to an embodiment of the disclosure.

Referring to FIG. 16, a certain area 600 includes a first mid-size group 1110 and a second mid-size group 1130 which are shaped as a 3×3 square.

The first mid-size group 1110 and the second mid-size group 1130 each have a density of 3.0.

To determine the priority between the first mid-size group 1110 and the second mid-size group 1130, the processor 260 obtains the mean of the respective densities of the small-size groups which are lower groups constituting the first mid-size group 1110 and the mean of the respective densities of the small-size groups which are lower groups constituting the second mid-size group 1130.

The respective lower groups of the first mid-size group 1110 and the second mid-size group 1130 mean 2×2 square-shape small-size groups, and calculating the mean of densities means obtaining the mean of the respective densities of the small-size groups.

Thereafter, as shown in FIG. 16, the processor 260 compares the mean 2.2875 (a) of the respective densities of the small-size groups which are lower groups constituting the first mid-size group 1110 and the mean 3.438 (b) of the respective densities of the small-size groups which are lower groups constituting the second mid-size group 1130.

Since the mean density 3.438 for the small-size groups constituting the second mid-size group 1130 is larger, the processor 260 may assign a higher priority to the second mid-size group 1130 than to the first mid-size group 1110.

According to an embodiment, when the unit quarter groups have the same density, the AI server 200 may determine the priority of each group based on the mean density for the lower groups of each group and precisely figure out the quarter more crowded with users. According to an embodiment, the AI server 200 may more efficiently deploy the robot 100 in the certain area.

Referring back to FIG. 8, according to an embodiment, the AI server 200 calculates the respective densities of unit quarters (S120), determines the priority between the unit quarters and between the unit quarter groups using the calculated densities (S1207), and generates a control signal for controlling each robot 100 (S130). The AI server 200 transmits the control signal to the robot 100 so that the robots 100 may be deployed per unit quarter (S130).

The methods shown in FIGS. 8 to 10 are performed by the AI server 200 in the above description. However, as mentioned earlier in the disclosure, since the AI server 200 is an example AI device, when the AI device is configured as any one robot 100*a* as shown in FIG. 7 among a plurality of robots, the robot 100*a* may perform the methods of FIGS. 8 to 10 and control the other robot 100. In this case, any one robot 100*a* may be configured as a master robot to control the other robots 100.

According to an embodiment, after the robots 100 are deployed per unit quarter, the AI server 200 periodically measures variations in the density of the people per unit quarter and controls the robots 100 to be redeployed according to the density variations.

Described below in detail is a method of periodically detecting variations in density per unit quarter by the AI server 200 and/or the processor 260 of the AI server 200 according to an embodiment and redeploying the robots 100 with reference to FIGS. 17 to 24.

After step S130 of FIG. 8, the AI server 200 according to an embodiment periodically measures variations in the density of people per unit quarter and measures density variations (S140).

Step S140 is illustrated in detail in FIG. 17. FIG. 17 is a flowchart illustrating a method of detecting a variation in density per unit quarter by an AI server 200 according to an embodiment of the disclosure.

Referring to FIG. 17, the AI server 200 and/or processor 260 selects at least one or more peak points according to the priorities of the individual unit quarters and unit quarter groups set in steps S120 and S1207 (S1401).

For example, as shown in FIG. 13, when the fourth mid-size group 870, the second mid-size group 830, the third mid-size group 850, and the first mid-size group 810 in the second group 730 are determined to be the first, second, third, and fourth priority, respectively, the AI server 200 may set the fourth mid-size group 870 as the first peak point, the second mid-size group 830 as the second peak point, and the third mid-size group 850 as the third peak point. This is an example method of setting the peak points by the AI server 200 and/or the processor 260 according to an embodiment. Thus, the same method may also be applied to calculating densities and setting peak points for the individual unit quarters.

Thus, the AI server 200 and/or processor according to an embodiment may set the peak points according to the densities also for the individual unit quarters. An example of setting the peak points for the individual unit quarters is shown in FIG. 18.

FIG. 18 is a view illustrating an example of setting a peak point for an individual unit quarter by an AI server 200 according to an embodiment of the disclosure.

Referring to FIG. 18, a certain area 600 includes 25 5×5 square-shaped unit quarters 601, 602, 603, 604, and 605. The AI server 200 may measure the densities using the number of people in each of the 25 unit quarters 601, 602, 603, 604, and 605 and assign priorities to the unit quarters in descending order of density, from the highest density unit quarter to the lowest density unit quarter.

The AI server 200 may select three unit quarters with a high density from among the 25 unit quarters 601, 602, 603, 604, and 605 assigned priorities depending on the densities and set them as peak points. For example, when the first unit quarter 607, second unit quarter 619, and third unit quarter 605 have a higher density than the other 22 unit quarters among the 25 unit quarters 601, 602, 603, 604, and 605, the AI server 200 may set the first unit quarter 607, second unit quarter 619, and third unit quarter 605 as peak points.

The AI server 200 may compare the respective densities of the first unit quarter 607, the second unit quarter 619, and the third unit quarter 605 set as peak points and may set the peak point with the highest density among the three peak points as the first peak point and the peak point with the second highest density as the second peak point. The AI server 200 may set the peak point with the lowest density among the three peak points as the third peak point.

FIG. 18 illustrates an example in which the AI server 200 sets the peak points. Referring to FIG. 18, as the first unit quarter 607, second unit quarter 619, and third unit quarter 605 have a higher density than the other 22 unit quarters, they are selected as peak points by the A1 server 200. It may also be shown that among the first unit quarter 607, second unit quarter 619, and third unit quarter 605, the first unit quarter 607 with the highest density is set as the first peak point, the second unit quarter 619 with the second highest density is set as the second peak point, and the third unit quarter 605 with the lowest density is set as the third peak point.

Referring back to FIG. 17, according to an embodiment, the AI server 200 periodically identifies the number of people located in the individual unit quarter and/or unit quarter group. As used herein, "period" means a period preset by the manager and may be set as various time intervals, such as 30 seconds, 1 minute, 15 minutes, or one hour.

The AI server 200 may use the same method as that of FIG. 9 to identify the number of people in the unit quarter. In other words, the AI server 200 may identify the number of people in the unit quarter, per time interval, via the surveillance cameras and/or microphones of the robots 100 deployed per unit quarter and, based thereupon, monitor variations in density or number of people.

The AI server 200 detects variations in the number of people in the individual unit quarter and/or unit quarter group over time and determines whether the density of the peak point is varied (S1403).

When the density of the unit quarter set as a peak point is increased or decreased by a predetermined level or more, the AI server 200 determines that the people have moved (S1403) and tracks variations in the peak point.

For example, a look at the density calculated per unit quarter in the certain area 600 of FIG. 11 reveals that the AI server 200 may calculate the density of the third unit quarter 605 as 5 with respect to the number of people in the third unit quarter 605 at a first time.

Assuming that the density ranges from 1 to 10, since the density, 5, of the third unit quarter 605 is higher than the densities of the other unit quarters (unit quarters with densities ranging from 1 to 4), the AI server 200 may set the third unit quarter 605 as a peak point. Since the third unit quarter 605 whose density is 5 has the third highest density among the unit quarters of the certain area 600, as compared with the unit quarters with a density of 8 or 7, the AI server 200 may set the third unit quarter 605 as the third peak point.

The AI server 200 may calculate the density of the third unit quarter 605 as 3 with respect to the number of people located in the third unit quarter 605 at a second time which is a predetermined time after the first time. In such a case, the AI server 200 may detect a variation in the density of the third unit quarter 605. The third unit quarter 605 is a unit quarter set as a peak point, and the AI server 200 determines whether the variation in density occurring in the third unit quarter 605 exceeds a predetermined threshold.

The predetermined threshold may be a value range preset by the manager. For example, when the density variation is 1, i.e., when the density is varied from 5 to 4, the AI server 200 may determine that the density variation does not exceed the predetermined threshold. However, when the density varies from 5 to 3 or from 5 to 7, i.e., when the density variation is 2, the AI server 200 may determine that the density variation has exceeded the predetermined threshold. The reference or reference range of the density variation may be varied by the manager or depending on the results of machine learning of the AI server 200 itself.

Turning back to FIGS. 17 and 18, the AI server 200 may set the first unit quarter 607, second unit quarter 619, and third unit quarter 605, among the 25 unit quarters in the controller, as the first to third peak points A1, B1, and C2 at the first time t1 (S1401) and may again measure the densities of the other 22 unit quarters and these peak points at the second time t2 (S1402). The AI server 200 may compare the densities of the first to third peak points A1, B1, and C1 and the other 22 unit quarters measured at the first time t1 with the densities of the first to third peak points A1, B1, and C1 and the other 22 unit quarters measured at the second time t2 (S1403), calculating variations in the density of the first to third peak points A1, B1, and C1 and the other 22 unit quarters (S1403).

Upon determining that the variations in the density of the first to third peak points A1, B1, and C1 have exceeded the predetermined threshold as described above, the AI server 200 gathers location information for the first to third peak points A1, B1, and C1 (S1404).

The location information for the first to third peak points A1, B1, and C1 includes the respective origin coordinates of the first to third unit quarters 607, 619, and 605 which are individual unit quarters corresponding to the first to third peak points A1, B1, and C1 as described above. The origin coordinates may include both GPS coordinates or architectural coordinates as described above.

Since the variations in the density of the first to third peak points A1, B1, and Cl have exceeded the predetermined threshold, the AI server 200 may determine that a new peak point has occurred at the second time t2. The AI server 200 measures the number of people in each individual unit quarter at the second time t2, calculates the density based thereupon, and extracts the unit quarters to be set as peak points.

This process is described below in greater detail with reference to FIG. 19. FIG. 19 is a view illustrating an example of a variation in peak point in a predetermined area over time.

Referring to FIG. 19, the AI server 200 sets the first to third peak points A1, B1, and C1 as the first to third unit quarters 607, 619, and 605 based on the per-unit quarter densities measured and calculated at the first time t1 (S1401).

Thereafter, based on the per-unit quarter densities measured and calculated at the second time t2 (S1402), the AI server 200 may detect that the densities of the first to third peak points A1, B1, and C1 have been varied by a predetermined threshold (S1403). In this case, the AI server 200 sets the first to third peak points A1, B1, and C1 at the second time t2 as the fourth to sixth unit quarters 609, 611, and 622.

Referring back to FIG. 17, the AI server 200 may gather data for variations in density and variations in location between the first to third peak points A1, B1, and C1 set at the second time t2 and the first to third peak points A1, B1, and C1 set at the first time t1 (S1404, S1405, and S1406) and calculate a vector value indicating how the peak points have varied over time based on the data gathered at the first time t1 and the second time t2 (S1407). Based on the vector value, the AI server 200 may calculate the move pattern and facility use pattern of the people in the facility (S1408), analyze the patterns, and determine whether to redeploy the robot 100 per unit quarter (S1409).

The processes of FIG. 17 are described below in greater detail with reference to FIG. 19.

As described above, upon detecting a variation in the density for the peak point between the first time t1 and the second time t2 (S1403), the AI server 200 resets the peak point at the second time t2.

The AI server 200 gathers location information for the first to third peak points A1, B1, and C1 at the first time t1 and location information for the first to third peak points A1, B1, and C1 at the second time t2 (S1404). As described above, the location information includes information for the origin coordinates of the individual unit quarters.

The AI server 200 calculates variations in location per peak point in such a manner as to compare the location of the first peak point A1 at the first time t1 and the location of the first peak point A2 at the second time t2 (S1405).

For example, when the first peak point A1 is the first unit quarter 605 at the first time t1 as shown in FIG. 19, the server 108 gathers location information for the first unit quarter 605 (S1404). Since the first peak point A2 is the fourth unit quarter 609 at the second time t2, the A1 server 200 gathers the location information for the fourth unit quarter 609 (S1404), compares the location information for the first unit quarter 605 and the location information for the fourth unit quarter 609, and calculates a variation in location (A1→A2) for the first peak point (S1405).

In particular, the processor 260 of the AI server 200 according to an embodiment calculates a variation in location between the location of the first to third peak points at the first time t1 and the first to third peak points at the second time t2 using Equation 1 below.

$$\text{Euclidean}(P_{i:After}, P_{i:Before}) \quad\quad [\text{Equation 1}]$$

In Equation 1, $P_{i:After}$ denotes the location values for the first to third peak points at the second time t2, and $P_{i:Before}$ denotes the location values for the first to third peak points at the first time t1.

The above-described location variation values may be measured using other methods, e.g., a Cross Bin scheme which, when a plurality of stimuli are generated per time, compares the magnitude and location of the first-caused stimulus and the magnitude and location of a later-caused stimulus.

The AI server 200 compares the densities of the first to third peak points A1, B1, and C1 at the first time t1 with the densities of the first to third peak points A1, B1, and C1 at the second time t2, calculating variations in the density of the peak point over time (S1406).

For example, as shown in FIG. 19, the AI server 200 compares the density of the second unit quarter 619 which is the second peak point B1 at the first time t1 and the density of the fifth unit quarter 622 which is the second peak point B2 at the second time t2, calculating the variations in the density of the second peak point (S1406).

In particular, the processor 260 of the AI server 200 according to an embodiment compares the densities of the first to third peak points at the first time t1 with the densities of the first to third peak points at the second time t2 using Equation 2 below, calculating the density variations.

$$|A_{i:After} - A_{i:Before}|$$ [Equation 2]

In Equation 2, $A_{i:After}$ denotes the densities of the first to third peak points at the second time t2, and $A_{i:Before}$ denotes the densities of the first to third peak points at the first time t1.

The above-described densities may be measured using other methods, e.g., a Cross Bin scheme which, when a plurality of stimuli are generated per time, compares the magnitude and location of the first-caused stimulus and the magnitude and location of a later-caused stimulus.

The AI server 200 summates the density variations and location variations per peak point as time elapses from the first time t1 to the second time t2 and calculates the vector value for the movement of each peak point (S1407).

For example, as shown in FIG. 19, the AI server 200 summates the location variation caused as the first peak point A1 varies from the first unit quarter 607 to the fourth unit quarter 609 as time elapses from the first time t1 to the second time t2 and the density variation resultant from comparing the density of the first unit quarter 607 and the density of the fourth unit quarter 609, calculating the vector value for the movement of the first peak point (S1407). The AI server 200 calculates the vector value for the movement of the second and third peak points in the same manner (S1407).

As shown in FIG. 19, the vector value for the movement of the first peak point during the period from the first time t1 to the second time t2 may be denoted as A'. The vector value for the movement of the second peak point during the period from the first time t1 to the second time t2 may be denoted as B'. The vector value for the movement of the second peak point during the period from the first time t1 to the second time t2 may be denoted as C'.

In particular, the processor 260 of the AI server 200 according to an embodiment summates the per-peak point location variation and density variation using Equation 3 below.

$$\alpha * \Sigma_{i=1}^{n} P_i + \beta * \Sigma_{i=1}^{n} A_i$$ [Equation 3]

In Equation 3 above, α denotes a first weight, and β denotes a second weight.

The first weight includes information for the expected time of arrival (ETA) of an aircraft, ship, train, bus, or other transportation and stores such as a bath room, duty free shop, restaurant, or ticket box around the robot 100, and the second weight includes information for the workload assigned to the robot 100 per kind of task the robot 100 may perform, e.g., guiding, photographing, or answering inquiries.

When the vector value for the movement of the first to third peak points is calculated (S1407), the AI server 200 calculates the move pattern and facility use pattern of the people in the certain area 600 based on the vector values (S1408).

For example, assuming that the first time t1 is the time of arrival of a specific aircraft, and the arrival hall is located in the first unit quarter 607 as shown in FIG. 18, the AI server 200 may select the first unit quarter 607 as the first peak point as the number of people in the first unit quarter 607 drastically increases and determine that the density of the first unit quarter 607 has soared as the specific aircraft arrives at the first time t1.

The AI server 200 may predict where the people arriving at the arrival hall are heading for using the move pattern of people trained via machine learning or prestored. When the specific aircraft arrives at the first time t1, the AI server 200 may predict that people will use the arrival hall and thus that the density of the first unit quarter 607 including the arrival hall is soaring, determining that the facility use pattern of people at this time is "aircraft arriving and using the arrival hall."

Assuming that the second time t2 is 12:00 PM, and a restaurant or food court is located in the fourth unit quarter 609 as shown in FIG. 18, the AI server 200 may select the fourth unit quarter 609 as the first peak point as the number of people in the fourth unit quarter 609 at the second time t2 soars and may determine that the density of the fourth unit quarter 609 where restaurants are located has drastically increased because 12:00 PM is the lunch time.

The AI server 200 may predict where the people are heading for at 12:00 PM using the move pattern of people trained by machine learning or the move pattern of people pre-stored. The AI server 200 may predict that the density of the fourth unit quarter 609 will soar by expecting that people will use the fourth unit quarter 609 where restaurants are concentrated and determine that the facility use pattern of the people using the fourth unit quarter 609 at this time is "lunch time and using restaurant." The AI server 200 may determine whether to densely deploy the robots 100 in the fourth unit quarter 609 according to the prediction.

The AI server 200 may measure the density of the other unit quarters which are not peak points at the first time t1 and second time t2 each and calculates variations in density (S1409).

The AI server 200 may determine whether to redeploy the robots 100 in the certain area 600 based on the variations in the density of the individual unit quarters which are not the peak points and the people's move pattern and facility use pattern (S1410). As described above, assuming that the second time t2 is 12:00 PM, and restaurants are concentrated in the fourth unit quarter 609 as shown in FIG. 18, the AI server 200 may determine to deploy the robots 100, which used to be in the other unit quarters at the time (12:00 PM), in the first unit quarter 609.

The step S160 of redeploying the robots 100 per unit quarter by the AI server 200 upon determining to redeploy the robots 100 in step S1410 is described with reference to FIGS. 20 to 22.

FIG. 20 is a flowchart illustrating a method of redeploying the robots 100 per unit quarter by the AI server 200 according to an embodiment of the disclosure. FIG. 21 is a layout view illustrating robots deployed in a certain area at a first time, and FIG. 22 is a layout view illustrating robots deployed at a second time.

Referring to FIG. 20, since the AI server 200 has determined to redeploy the robots 100 in step S1410, the AI server 200 generates a robot control signal to move the robots 100 (S1601).

The AI server 200 transmits the robot control signal to each robot 100 (S1602). The robot control signal may be transmitted first to the robot closest to the peak point with a high density. The robot control signal may be transmitted first to the robot 100 that is idle or on duty but does not have a high workload. The robot control signal may be transmitted to the robot 100, which is close to the peak point and is idle or has low workload, earlier than the others.

When the robot control signal is transmitted to each robot 100, each robot 100 receives the robot control signal and sends back, to the AI server 200, a feedback indicating that the control signal has been received, the task being currently performed and its workload, and image and voice data for the unit quarter the robot 100 is currently in. The AI server 200 may receive the feedback, the state information for the robot 100, and the state information for the unit quarter where the robot 100 is in, from the robot 100 (S1603) and update the information for each robot 100 and information for each unit quarter.

The AI server 200 may identify whether there is an idle robot 100 based on the received feedback or state information (S1604).

Referring to FIG. 21, the AI server 200 measures the densities of all the individual unit quarters 601, 602, 603, 604, 605, 607, 610, 616, 619, and 623 included in the certain area 600 at the first time t1 and sets the first to third peak points A1, B1, and C1 (607, 619, 605) based on the measured densities.

The AI server 200 distributes the first to ninth robots R1, R2, R3, R4, R5, R6, R7, R8, and R9 in the certain area 600 based on the state information for the robots 100, location information, and the densities of the first to third peak points 607, 619, and 605 set at the first time t1, as shown in FIG. 21.

Referring to FIG. 21, the first to third robots R1, R2, and R3 are deployed in the first peak point A1 607, the fourth and fifth robots R4 and R5 are deployed in the second peak point B1 619, and the sixth robot R6 is deployed in the third peak point C1 605. The seventh to ninth robots R7, R8, and R9 are idle robots and are dispersed in the individual unit quarters 610, 616, and 623 which have a relatively low density.

As shown in FIG. 21, the first peak point A1 607 is the most-populated unit quarter of the certain area 600 and are thus required to have many robots deployed to serve the people. Thus, the AI server 200 deploys three robots, i.e., the first to three robots R1, R2, and R3, in the first peak point A1 607.

The second peak point B1 619 is the next most-populated unit quarter to the first peak point A1 607 and need to have more robots deployed that the other unit quarters to serve people. However, since the second peak point B1 619 has fewer people than the first peak point A1 607, deploying fewer robots than in the first peak point A1 607 may lead to a better deployment of all the robots and enhancement in work efficiency. Thus, the AI server 200 deploys two robots R4 and R5, which are fewer than in the first peak point A1 607, in the second peak point B1 619.

Likewise, since the third peak point C1 605 has more people than other unit quarters, the third peak point C1 605 needs to have at least one or more robots 100 deployed therein. However, since the third peak point C1 605 has fewer people than the first peak point A1 607 and the second peak point B1 619, the AI server 200 deploys one robot R6, which is fewer than the robots deployed in the first peak point A1 607 and the second peak point B1 619, in the third peak point C1 605 so as to raise the efficiency of deployment and work of all the robots.

The AI server 200 disperses the robots R7, R8, and R9 in the other unit quarters than the first to third peak points A1, B1, and C1, preparing for such a context where the other unit quarters 610, 616, and 623 than the peak point are getting crowded with people as times go by and thus the peak points move.

Referring to FIG. 22, the AI server 200 measures the densities of all the individual unit quarters 601, 602, 603, 604, 605, 607, 609, 610, 616, 619, 622, and 623 included in the certain area 600 at the second time t2 and sets the first to third peak points A2, B2, and C2 (609, 622, 603) based on the measured densities.

Since the first to third peak points 607, 619, and 605 set at the first time t1 have been changed to other unit quarters 609, 622, and 603 at the second time t2, the AI server 200 may determine that the robots need to be redeployed from the locations where the robots were deployed at the first time t1.

In this case, the AI server 200 learns the location information for the first to third peak points A2, B2, and C2 (609, 622, and 603) which have been set as peak points at the second time t2.

Thereafter, the AI server 200 calculates how far the robots R1, R2, R3, R4, R5, R6, R7, R8, and R9 deployed in the unit quarters and now working are away from the first to third peak points A2, B2, and C2 (609, 622, and 603) set as peak points at the second time t2.

Simultaneously, the AI server 200 calculates the workload of the robots according to the tasks the robots R1, R2, R3, R4, R5, R6, R7, R8, and R9 are currently doing.

The AI server 200 determines to redeploy the robots, which are relatively close to the first to third peak points A2, B2, and C2 609, 622, and 603 set at the second time t2 or have a lower workload, in the first to third peak points A2, B2, and C2 (609, 622, and 603).

Considering both the above-described factors, the AI server 200 may determine to redeploy the robots, which are relatively close to the first to third peak points A2, B2, and C2 609, 622, and 603 set at the second time t2 and have a lower workload, in the first to third peak points A2, B2, and C2 (609, 622, and 603).

Referring to FIG. 22, the AI server 200 redeploys the robots R1, R2, R3, R4, R5, R6, R7, R8, and R9 considering both the two factors (the distance between the peak point and each robot and the current workload of each robot). In other words, the first peak point A2 609 at the second time t2 is positioned two unit quarters to the right from the first peak point A1 607 at the first time t1.

The second peak point B2 622 at the second time t2 is positioned three unit quarters to the left and one unit quarter down from the first peak point B1 619 at the first time t1.

The third peak point C1 605 at the second time t2 is positioned two unit quarter to the left from the first peak point B1 605 at the first time t1.

The AI server 200 first deploys the sixth robot R6 and the eighth robot R8, which are positioned close to the first peak point A2 609 at the second time t2, in the first peak point A2 609. Since the sixth robot R6 is providing services in the third peak point C1 605 at the first time t1, the AI server 200 may determine that the sixth robot R6 has a room for workload enough to be deployed in the first peak point A2 609 which has a higher density than the third peak point C1 605 at the second time t2. Thus, the AI server 200 may deploy the sixth robot R6, which is positioned close to the first peak point A2 609 and is determined to have a room for workload enough to be deployed in the first peak point A2 609, in the first peak point A2 609.

Since the eighth robot R8 is in the unit quarter 610 which is not high in density at the first time t1, the AI server 200 may identify the workload of the eighth robot R8 and determine that the eighth robot R8 is idle. Since the eighth robot R8 is in the unit quarter 610 which is close to the first peak point A2 609, the distance to the first peak point A2 609 is short. Thus, the AI server 200 may first deploy the eighth robot R8 in the first peak point A2 609 at the second time t2.

Since the density of people in the first peak point A2 609 at the second time t2 is the highest, the AI server 200 may select more robots to be additionally deployed in the first peak point A2 609, other than the sixth robot R6 and the eighth robot R8. In FIG. 22, the AI server 200 deploys the fifth robot R5 in the first peak point A2 609.

The process of deploying the fifth robot R5 in the first peak point A2 609 by the AI server 200 is as follows. The AI server 200 may search for robots positioned close to the first peak point A2 609 at the second time t2. The AI server 200 determines that the second robot R2, third robot R3, and fifth robot R5, except for the sixth robot R6 and the eighth robot R8, are close to the first peak point A2 609 and identify the workload of the robots.

Since the second robot R2 and the third robot R3 were deployed in the first peak point A1 609 and provided services at the first time t1, the AI server 200 may determine that the second robot R2 and the third robot R3 had high workloads. However, since the fifth robot R5 was deployed in the second peak point B1 619 and provided services at the first time t1, the AI server 200 may determine that the workload of the fifth robot R5 is relatively lower than the workload of the second robot R2 and the third robot R3.

Thus, the AI server 200 may deploy the fifth robot R5, among the second robot R2, third robot R3, and fifth robot R5, in the first peak point A2 609 at the second time t2.

As the density of the unit quarter 609, which used to be the first peak point A1 at the first time t1, is significantly reduced, the second robot R2 and the third robot R3 go idle. At this time, the AI server 200 may deploy the second robot R2 in the third peak point A2 609 formed in the location close to the unit quarter 609 at the second time t2. Since the second robot R2 was deployed in the first peak point A1 and had a high workload at the first time t1, although the second robot R2 is deployed in the third peak point C2 at the second time t2, its workload does not get higher than prior but may rather drop.

In the unit quarter 609 which used to be the first peak point A1 at the first time t1, the first robot R1 is deployed. Thus, although the second robot R2 is deployed in the third peak point C2 at the second time t2, two robots, i.e., the first robot R1 and the third robot R3, are still in the unit quarter 609. The AI server 200 may determine that the state in which two robots are in the unit quarter 609 which is not high in density is inefficient and redeploy the third robot R3 in the unit quarter 613, thereby broadening the overall distribution of the robots.

Although the unit quarter 613 is not high in density, the deployment of the third robot R3 in the unit quarter 613 enables an immediate response to a future variation in the density of the unit quarter 613 and its adjacent unit quarter. That is, as the density of the unit quarter 613 and its adjacent unit quarter soars, the third robot R3 may immediately be deployed in the unit quarter.

As such, previously deploying robots in a low-density unit quarter advantageously allows for a rapid deployment of robots in a unit quarter whose density may soar.

As shown in FIG. 21, the seventh robot 616 and the ninth robot 623 are deployed in the unit quarters 616 and 623, respectively, at the first time t1. As the unit quarters 616 and 623 are not high in density, the seventh root 616 and the ninth robot 623 stay idle. Thereafter, at the second time t2, the unit quarter 622 adjacent to the unit quarters 616 and 623 is set as the second peak point B2 and its density sharply increases. Thus, the AI server 200 may quickly respond to a service request from the people by swiftly moving the seventh robot 616 and the ninth robot 623 to the unit quarter 622 at the second time t2.

In such a manner, the AI server 200 according to an embodiment may deploy the robots distributed at the first time t1 in the first to third peak points at the second time t2.

A method of calculating the workload of each robot by the AI server 200 according to an embodiment is described below with reference to FIGS. 23 and 24.

FIG. 23 is a flowchart illustrating a method of calculating the workload of each robot by the AI server 200 according to an embodiment of the disclosure. FIG. 24 is a graph illustrating an example of applying Gini's coefficient to the workload calculated per robot.

Referring to FIG. 8, the AI server 200 according to an embodiment controls the robot to complete its initial deployment (S130) and then detects a variation in the density of each unit quarter (S140) while calculating the workload of each robot (S150).

Step S150 is described with reference to FIG. 23. Referring to FIG. 23, the AI server 200 calculates the workload of the task being currently performed by each robot (S1501). The AI server 200 identifies whether the current workload calculated per robot is imbalanced or inequal using Gini's coefficient (S1502). In step S1502, to identify whether the current workload is imbalanced or inequal, multiplying the current workload by an absolute workload or summating them is used. This process is described in greater detail with reference to FIG. 24.

A graph for identifying whether the workload for the first to fifth robots R1, R2, R3, R4, and R5 is imbalanced by applying an absolute workload of 100 to the current workload is shown on the left of FIG. 24. A graph for identifying whether the workload for the first to fifth robots R1, R2, R3, R4, and R5 is imbalanced by applying an absolute workload of 500 to the current workload is shown on the right of FIG. 24.

A look at the graph of applying the absolute workload of 100 to the current workload reveals that the upper cap of the complete uniform line is 100.

It may be identified that the graph of measurement of the workload for each robot R1, R2, R3, R4, and R5 at the first time t1 and the graph of measurement of the workload for each robot R1, R2, R3, R4, and R5 at the second time t2 have substantially the same slope.

The workload per robot R1, R2, R3, R4, and R5 makes no or little difference therebetween. The graph of measurement of the workload for each robot R1, R2, R3, R4, and R5 at the first time t1 and the graph of measurement of the workload for each robot R1, R2, R3, R4, and R5 at the second time t2, both, have gentle slopes.

Thus, it is shown from the left-hand graph of FIG. 24 as if a deviation in workload is not significant between the robots R1, R2, R3, R4, and R5 and all of the robots R1, R2, R3, R4, and R5 have even workloads.

However, as shown in the right-hand graph of FIG. 24, if the absolute workload is 500, it may be shown that the graphs of workloads measured for the robots R1, R2, R3, R4, and R5 at the first time t1 and the second time t2 have slopes sharply varied. It is also identified that at the first time t1 and the second time t2 both, the workload of each robot R1, R2, R3, R4, and R5 makes a significant difference. Thus, the degree of workload imbalance between the robots R1, R2, R3, R4, and R5 is represented as very high. Such an occasion arises depending on how much absolute workload is applied to the current workload.

For example, if the absolute workload reflects the number of all the people in the certain area 600, when the absolute workload is 100, the optimal deployment of the robots R1, R2, R3, R4, and R5 results when they are deployed so that each robots serves 20 persons.

As shown in the left-hand graph of FIG. 24, although a difference occurs in the number of people per robot count depending on the location of each robot R1, R2, R3, R4, and R5 and the density of people, such a difference is not significant. That is, as shown in the left-hand graph of FIG. 24, at the first time t1, the second robot R2 provides services to 10 persons, and the fifth robot R5 may provide services to 40 persons. The fourth robot R4 may provide services to 30 persons.

If the absolute workload is 500, this means that the number of all the people in the certain area 600 is 500, and it is the optimal to deploy the robots R1, R2, R3, R4, and R5 so that one robot serves on 100 people.

In such a context, the number of people per robot count makes a significant difference depending on the deployment and density of the robots R1, R2, R3, R4, and R5. Thus, as shown in the right-hand graph of FIG. 24, at the first time t1, the second robot R2 provides services to 50 persons, and the fifth robot R5 may provide services to 200 persons. The fourth robot R4 may provide services to 150 persons. In this case, the number of people each of the second robot R2, fourth robot R4, and fifth robot R5 is in charge of makes a significant difference, and the workload imbalance between the robots worsens.

Thus, the A1 server 200 according to an embodiment selects the ranking of density per unit quarter by relatively comparing the numbers of people in the unit quarters while simultaneously absolutely grasping the number of people per unit quarter, thereby identifying whether a workload imbalance occurs between the robots.

Upon determining that the current workload of the robot is imbalanced (S1504), the AI server 200 may determine to redeploy the robot (S1506) and machine-learn the result of calculation of workload per robot and the elements that have caused the result (S1508).

Upon determining that the current workload of robot is not imbalanced (S1504), the AI server 200 may determine to maintain the current robot deployment (S1507).

Besides calculating the current workload of the robot, the AI server 200 according to an embodiment may previously identify whether the workload of the robot is too excessive when the robot is deployed in the high-density peak point. That is, the AI server 200 may estimate the workload that is to be caused when the robot is deployed in the peak point under the assumption that the robot is to be deployed in the peak point (S1503).

The AI server 200 may calculate the estimated workload RL per robot using Equation 4 to perform step S1503.

$$RL = \alpha * \sum_{i=1}^{n} \frac{Amp(PP_i)}{|Pos(R) - Pos(PP_i)|} + \beta * WL(R) \qquad \text{[Equation 4]}$$

In Equation 4, α denotes a first weight, β denotes a second weight, R denotes each robot, WL denotes the workload of the task currently being performed by the robot R, PP denotes the peak point which is unit quarter higher in density than the other unit quarters, Amp denotes the number of people in the unit quarter, i.e., the density of the unit quarter, and Pos denotes the coordinates of the location of each robot.

That is, the AI server 200 calculates the estimated workload of each robot considering the density of the high-density unit quarter or the peak point and per-robot location values and the current workload caused from the task being currently performed by each robot. Thus, the estimated workload is the value resultant from adding the workload to be caused when each robot is deployed in the high-density unit quarter and performs an additional task to the current workload, and this represents data for variations in the workload of each robot.

Upon determining that the workload of the robot becomes imbalanced if the robot is deployed in the peak point or high-density unit quarter in the future (S1505), the AI server 200 may determine to maintain the current deployment of the robot (S1507).

However, upon determining that the robot is deployed in the peak point or high-density unit quarter in the future and its workload does not become imbalanced (S1505), the AI server 200 may determine to redeploy the robot (S1506) and machine-learn the result of calculation of the estimated workload and elements that had an influence to get the result to come out (S1508).

The AI server 200 may also determine whether the current workload and estimated workload are imbalanced per robot by applying an inequality coefficient to each of the current workload and the estimated workload. In particular, Equation 5 below is used upon applying the inequality coefficient to the estimated workload.

$$\text{Gini} * \Sigma RL \qquad \text{[Equation 5]}$$

In Equation 5, Gini means the inequality coefficient including the absolute workload.

Upon determining whether to redeploy each robot by determining whether the estimated workload of each robot is imbalanced in step S1505, the AI server 200 may control the robot so that the robot for which the estimated workload has been calculated as low is prioritized in moving to the high-density unit quarter over the robot determined to be redeploy by the AI server 200 in step S1410.

For example, although the AI server 200 determines to move the first robot R1 to the first peak point A2 which is high in density in step S1410 and generates a first control command to control the first robot R1 and transmits the first control command to the first robot R1, if the AI server 200 determines that the estimated workload of the first robot R1 is imbalanced in step S1505, the AI server 200 may control to move, first, the second robot R2, which is lower in estimated workload than the first robot R1, to the first peak point A2.

Where the second robot R2 moves to the first peak point A2 earlier than the first robot R1, if the third robot R3, which has the same or similar estimated workload to the second robot R2, is positioned closer to the first peak point A2 than the second robot R2 is, the AI server 200 may control to allow the third robot R3 to move to the first peak point A2 earlier than the second robot R2.

Where there is the fourth robot R4 determined to have an excessively high estimated workload compared with the other robots, the AI server 200 may simultaneously control to allow the fourth robot R4 to stay in the current location.

The AI server 200 may control to allow the fourth robot R4, which has been determined to have an excessively high estimated workload compared with the other robots, to be redeployed in a lower-density unit quarter.

As such, the AI server 200 according to an embodiment may calculate the estimated workload per robot and redeploy the robot (S160).

A method of learning and applying the deployment formation of robots by the AI server 200 according to an embodiment after step S160 of FIG. 8 is described below.

According to an embodiment, the AI server 200 detects a variation in density (S140), redeploys the robot (S160) or calculates the estimated workload per robot (S150) and redeploys the robot (S160).

Thereafter, the AI server 200 according to an embodiment may machine-learn the deployment formation of the robot (S170) and generate a formation for more efficiently deploying the robot later.

A method of machine-learning the deployment formation of robots by the AI server 200 is described below with reference to FIGS. 25 and 26. FIG. 25 is a flowchart illustrating a method of machine-learning the deployment formation of robots by the AI server 200 according to an embodiment. FIG. 26 is a view illustrating an example of selecting the deployment formation of robots in a table depending on weights by the AI server 200.

Referring to FIG. 25, when the robot 100 is redeployed by step S160, the AI server 200 is fed back the post-deployment workload from each robot 100 (S1701). The AI server 200 analyzes the fed-back workload and extracts the kind and size of the weight that has affected the calculation of each workload.

The weight is a numerical value of the estimated time of arrival of an aircraft, ship, train, bus, or other transportation at a certain airport, port, or station, information for the store around the robot, or the kind of task the robot may perform, as described above.

Upon determining that the extracted weight is included in the table previously stored (S1702), the AI server 200 compares the formation set per weight in the table with the extracted weight and selects the formation including the weight which is the same or similar to the extracted weight (S1705).

The AI server 200 transmits the formation to the robots 100 to configure the robots to establish the formation and identifies whether the workload of each robot 100 is imbalanced (S1706). Here, step S1706 may be performed in the same manner as the above-described step S150.

An example of selecting the deployment formation of robots depending on weights by the AI server 200 is described below with reference to FIG. 26($a$).

Assuming that the 'weight B' of FIG. 26($a$) is 100, the maximum value when the arrival of an aircraft is imminent, if there is an aircraft which is to arrive at the airport at 13:00 PM, each robot 100 may obtain information for the estimated time of arrival of the aircraft via the AI server 200. The robots 100 may be deployed directly in the unit quarter where the arrival hall is in or be distributed in the unit quarters near the unit quarter with the arrival hall.

Where 'weight A,' 'weight B,' and 'weight C' each are large or are not less than a predetermined value, the AI server 200 previously stores deployment formation sets (1 set, 2 set, 3 set, 4 set) for robots formed corresponding to 'weight A,' 'weight B,' and 'weight C' in table D1.

Each robot 100 may feed its workload back to the AI server 200. In this case, the A1 server 200 may analyze the workload transmitted from each robot 100 and be aware that it is 'weight B' that has affected the generation of the workload.

In this case, since the estimated time of arrival of the aircraft is imminent, the AI server 200 recognizes that 'weight B' has been calculated as 100, which is the maximum value and searches table D1 for the formation which has the weight as the maximum value.

The AI server 200 selects formation '3 set' where 'weight B' is 100 from table D1 and transmits the same to each robot. Formation '3 set' may be a formation in which one robot is deployed in each inter-gate interval. The robots are controlled to be deployed one in each inter-gate interval according to the '3 set' formation received from the AI server 200.

Thereafter, the AI server 200 identifies whether the workload of each robot 100 is imbalanced in the same step as step S150.

Thus, referring to FIG. 26($a$), it may be identified that the AI server 200 selects (E1), from the table, formation '3 set' constituted of the same or similar weight to the weight extracted from the per-robot workload.

Upon determining that the extracted weight is not in the pre-stored table (S1702), the AI server 200 inserts the weight to the learning model (S1703). The AI server 200 determines that the extracted weight is a new weight influencing the workload and calculates a table including the new weight (S1704).

Thus, referring to FIG. 26($b$), if the table lacks the same or similar value to the weight extracted from the per-robot workloads, the AI server 200 inserts the weight extracted from the workload to the learning model and learns what circumstance the weight has occurred in. In other words, upon recognizing the weight item that was absent from the existing table D2, the AI server 200 learns the weight item and what element the weight item has been produced by.

The AI server 200 stores the result of learning of the new weight item in the database or memory and, as shown in FIG. 26($b$), inserts the new weight to the table D2, thereby updating the table D2 (E2).

The AI server 200 according to an embodiment selects the mode and formation of each robot considering the weights affecting the workload of each robot depending on the state information for each unit quarter and allows the robots to be deployed in each unit quarter, in the mode and formation.

Further, since the AI server 200 according to an embodiment converts the state information for each unit quarter, e.g., the density of people depending on the time of arrival of an aircraft, train, and/or ship, the kind of stores present in each unit quarter, and the task being performed by the robot into a weight and applies it to the workload of robot, the robots may be efficiently deployed considering the state information for each unit quarter when the AI server 200 selects the mode and/or formation necessary when each robot is deployed.

A method of calculating future densities for individual unit quarters by the AI server 200 according to an embodiment is described below with reference to FIGS. 27 to 29.

FIG. 27 is a flowchart illustrating a method of calculating a future density for an individual unit quarter by an AI server according to an embodiment of the disclosure.

When the AI server 200 completes the calculation (S1406) of per-peak point variations and the calculation (S1409) of density variations for the unit quarters which are not peak points, the AI server 200 may identify the variations in density for all the individual unit quarters included in the certain area 600.

Thus, referring to FIG. 27, the processor 260 of the AI server 200 calculates the density variations for all the individual unit quarters using the density variations for the unit quarters, which are not peak points, and the per-peak point density variations which have been calculated thus far (S1420).

The processor 260 of the AI server 200 determines the direction of movement of people per unit quarter using the per-unit quarter image data captured in real-time for each unit quarter (S1421).

In this case, the processor 260 may recognize people's face, i.e., the users' face from the image data using an image recognition model, analyze the direction in which each face is oriented, and determine where the people, i.e., the users, are heading for. Further, the processor 260 may compile the results of analysis for where the individual persons are heading for to determine the direction of movement of the people in each unit quarter.

For example, the processor 260 may extract feature points from the users' face using the image recognition model and represent the direction in which the face is oriented as a vector based on the feature points. The directions of movement for all the users included in the individual unit quarters may be determined via the above-described vector. The direction of movement of the people in the unit quarter may be determined by adding up the vectors extracted per person. The vector resultant from summating the vectors of all the users included in the unit quarter may represent the average direction of movement for the people included in the unit quarter.

Since the above-described vector may be set to have a size proportional to the user's speed, the moving speed, as well as the direction of movement of the people, may be grasped.

The processor 260 of the AI server 200 determines the influx of people per unit quarter using the per-unit quarter image data captured in real-time for each unit quarter (S1422).

For example, assuming that the certain area 600 is an airport, the influx of people at a specific unit quarter without a pathway or gate in the airport, as compared with the other unit quarters with a pathway or gate, may produce such a pattern that the people flow, i.e., move rather than staying. In the unit quarter with a pathway or gate, people may enter or exit the certain area 600, i.e., the airport, via the pathway or gate. Here, the gate may mean a regular door or the gate which is the place where ones leave an airport building to get on a plane.

Thus, the processor 260 may grasp the pathway or gate where people may move per unit quarter and determine the influx or efflux of people through the pathway or gate. The processor 260 may determine the influx of people per unit quarter based on the influx of people through the pathway or gate.

The processor 260 may calculate the future density per unit quarter based on density variations per individual unit quarter, the direction of movement of people, and the influx of people calculated in step S1420 (S1423).

Upon determining the influx of people using the per-unit quarter image data captured in real-time for each unit quarter, the processor 260 may simply calculate the density variations and the influx of people for the individual unit quarter at a specific time.

However, since the density variations for the individual unit quarter calculated in step S1420 are ones obtained by periodically measuring the densities of the individual unit quarter and calculating the difference therebetween, the mean of the density variations during a predetermined period (e.g., 10 seconds, 30 seconds, or one minute) for the individual unit quarter may be calculated based on the density variations accumulated for the individual unit quarter for a predetermined period, the direction of movement and influx of people.

If the processor 260 is able to calculate the density variation only at one time, the density variation for the entire certain area or the individual unit quarter may be significantly influenced by an instantaneous and atypical density variation. Thus, upon controlling the robots to deploy robots in the unit quarter where an instantaneous density variation has occurred, the AI server 200 may experience a computational overload. If a robot has been sent to the unit quarter where an instantaneous density variation has occurred, but the density of the unit quarter is released in such an extent that the robot is no longer required, redeployment of the robot is needed, consuming extra computation.

In other words, if the density of the unit quarter which has experienced an instantaneous density variation is varied while the robot is moved to the unit quarter by the AI server 200, the AI server 200 needs to redeploy the robot, thus losing the consistency in deployment of robot 100. Further, the overall distance of travel of the robot 100 is prolonged, and it will take longer to deploy the robot 100 in the unit quarter where the robot 100 is supposed to be.

However, the mean of the density variations of the individual unit quarters calculated by the processor 260 may be robust against errors or outlier although an instantaneous or irregular density variation occurs in the individual unit quarter.

During this course, the processor 260 may take advantage of the space information for the certain area 600. The space information may include, e.g., the location of gate or pathway or the kind of each space.

The processor 260 of the AI server 200 calculates the future density using the current density, density variations, mean of density variations, direction of movement of people, and influx of people (S1423).

In this case, the processor 260 may calculate the future density per unit quarter further considering, e.g., the move pattern or facility use pattern of people.

For example, if the AI server 200 is previously aware of the pattern in which people move via point A to point B, the processor 260 may calculate the per-unit quarter future densities further considering such move pattern.

Where the space information for the certain area 600 is present in the AI server 200, the processor 260 may calculate the future density further considering such information. Such space information includes information for the kind of the space, features, and contexts that arise in the space.

For example, if the certain area 600 is a movie theater, the space information includes information indicating that the certain area is a theater, how many rooms the theater has, the capacity per room, and the title and actors of the movie now in play, and per-movie schedules. The processor 260 may also figure out when the move starts and ends in which room based on the per-movie schedule included in the space information. Thus, the processor 260 may calculate the future density per unit quarter further considering such space information.

If the certain area 600 is a bus terminal or airport, the space information includes dispatch schedule information (or departure and/or arrival time information), and the processor 260 may grasp when and where the bus or airplane departs or arrives based on the dispatch schedule. Thus, the processor 260 may calculate the per-unit quarter future densities further considering such dispatch information.

Thus, the AI server 200 may calculate the future densities using all elements and information such as the current density, density variations, the mean of density variations, the direction of movement of people per unit quarter, the influx of people, and space information.

The processor 260 may calculate the per-unit quarter future densities using a future density calculation model.

The future density calculation model may be an artificial neural network-based model trained with a machine learning algorithm or deep learning algorithm and may be a model that receives the above-described current density, density variations, mean of density variations, direction of movement of people per unit quarter, influx of people, and space information and, as a result, outputs the future density for the unit quarter.

The future density calculation model may be supervised-trained using all of the previously gathered densities and density variations, mean of density variations, direction of movement of people per unit quarter, influx of people, and space information as learning data. The learning data may be labelled with the density at a future time which is a predetermined time after a specific past time.

For example, if the future density calculation model is a model for calculating the per-unit quarter future densities 30 minutes after a specific time t at which density measurement has been done, the learning data used to train the future density calculation model may include the density, direction of movement of people per unit quarter, influx of people, and space information at the specific time t, as an input feature vector. The learning data may include the density variations, mean of density variations, direction of movement of people per unit quarter, influx of people, and space information, 30 minutes after the specific time t, as label data.

Meanwhile, the future density calculation model may be a model implemented in the learning processor 240, and the model itself and its learning results may be stored in the memory 230 or the model storage unit 231 inside the memory 230.

Referring to FIG. 28, learning data used in the future density calculation model is described in detail. FIG. 28 is a view illustrating an example of training data used to calculate a future density by an AI server according to an embodiment of the disclosure.

Referring to FIG. 28, learning data may include a direction 1301 of movement of people, a map 1302 as space information for a certain area 600, departure and arrival time 1303 as space information for the certain area 600, and a people move pattern 1304.

In the instant embodiment, although each step is performed by the AI server 200, the steps may also be performed by any one AI robot 100 or 100a among a plurality of robots. In this case, the AI robot 100 may be a master robot pre-configured to be able to control the other robots.

A method in which when the AI server 200 determines a robot deployment formation, the robots maintain the formation according to an embodiment is described below with reference to FIGS. 29 to 31.

FIGS. 29, 30, and 31 are views illustrating a process of controlling a plurality of robots to maintain a formation by an AI server according to an embodiment of the disclosure.

Referring to FIGS. 29 to 31, there are shown an AI server 200 and a plurality of access points (APs) 2001, 2002, 2003, and 2004 capable of transmitting/receiving data to/from the AI server 200. The APs may be data signal routers or sub-servers individually installed in the unit quarters. The plurality of APs 2001, 2002, 2003, and 2004 may wirelessly perform data communication with the AI server 200.

Each of the APs 2001, 2002, 2003, and 2004 may receive a control command generated from the AI server 200 and relay the control command to each robot. In particular, the APs 2001, 2002, 2003, and 2004 may be distributed in the individual unit quarters, transmit robot control commands to at least one or more robots 100 deployed in the unit quarter, and receive a feedback from the robot 100 and relays the feedback to the AI server 200.

The APs 2001, 2002, 2003, and 2004 may be configured to be able to perform some of the functions performed by the AI server 200. In such a case, the APs 2001, 2002, 2003, and 2004 may be configured to be able to perform AI functions. The APs 2001, 2002, 2003, and 2004 may be denoted AI sub-servers.

The AI sub-server may be fed back data regarding the number of people in the unit quarter and the workload of robot from the robot 100 in the individual unit quarter and may calculate the current density, density variations, direction of movement of people, and influx of people for the quarter based on the fed-back data.

In this embodiment, an example in which the first to fourth APs 2001, 2002, 2003, and 2004 are distributively deployed in the tenth to fourteenth unit quarters 1610, 1630, 1650, and 1670 is described. Thus, FIGS. 29 to 31 illustrate an example in which the first to fourth APs 2001, 2002, 2003, and 2004 are deployed in the tenth to thirteenth unit quarters 1610, 1630, 1650, and 1670, respectively.

Referring to FIG. 29, the first AP 2001 is installed in the tenth unit quarter 1610, and a first robot 100a-1 is deployed in the tenth unit quarter 1610. The first AP 2001 may relay a robot control command received from the AI server 200 to the first robot 100a-1 and, when the first AP 2001 is configured as an AI sub-server, the first AP 2001 may directly control the operation of the first robot 100a-1.

A second robot 100a-2, a third robot 100a-3, and a fourth robot 100a-4 may be deployed in the eleventh unit quarter 1630, the third unit quarter 1650, and the fourth unit quarter 1670, respectively, and when the APs 2002, 2003, and 2004 are configured as AI sub-servers as described above, they may directly control the robots 100a-2, 100a-3, and 100a-4.

The APs measure the reception sensitivity between the robots and the APs while periodically exchanging signals with the robots in the unit quarters.

A method of controlling an AI server and APs when any one robot departs off its unit quarter is described below with reference to FIG. 30.

FIG. 30 illustrates an example in which the second robot 100a-2 deployed in the eleventh unit quarter 1630 departs off the eleventh unit quarter 1630. In this case, the second AP 2002 may measure the reception sensitivity of the signal received from the second robot 100a-2 and directly analyze the measured reception sensitivity or transmit the reception sensitivity to the AI server 200. To directly analyze the reception sensitivity measured by the second AP 2002, the second AP is preferably configured as an AI sub-server.

Where the reception sensitivity transmitted by the second AP 2002 is smaller than a preset reception sensitivity, the processor 260 of the AI server 200 may determine that the second robot 100a-2 has departed off the eleventh unit quarter 1630. The AI server 200 grasps which AP, except for the second AP 2002, receives the feedback signal from the second robot 100a-2. In the example shown in FIG. 30, it may be identified that the first AP 2001 detects the feedback signal from the second robot 100a-2.

Thus, the AI server 200 may transmit a robot control command to allow the second robot 100a-2 to return to the eleventh unit quarter 1630 to the first AP 2001.

Meanwhile, the AI server 200 may transmit a robot control command to allow the second robot 100a-2 to return to the eleventh unit quarter 1630 to the second AP 2002. In this case, the second AP 2002 may send the robot control command from the AI server 200 to the first AP 2001, and the first AP 2001 may relay the robot control command to the second robot 100a-2.

By the robot control command transmitted to the second robot 100a-2, the second robot 100a-2 may move to the eleventh unit quarter 1630.

If no feedback signal of the second robot 100a-2 is detected from any of the APs 2001, 2002, 2003, and 2004 although the AI server 200 has determined that the second robot 100a-2 departed off the eleventh unit quarter 1630 as shown in FIG. 30, the AI server 200 may transmit a robot control command to allow the second robot 100a-2 to return to the eleventh unit quarter 1630 to all the APs 2001, 2002, 2003, and 2004.

In this case, since the AI server 200 is unable to grasp which unit quarter the second robot 100a-2 is in, the AI server 200 transmits robot control commands to all the APs 2001, 2002, 2003, and 2004.

When the feedback signal of the second robot 100a-2 is not detected from any of the APs 2001, 2002, 2003, and 2004, the AI server 200 may receive image data captured in real-time for the unit quarter from the image capturing device installed in each unit quarter, analyze the image data using the image recognition model, and grasp which unit quarter the second robot 100a-2 is in.

Where the APs 2001, 2002, 2003, and 2004 are configured as AI sub-servers, the above-described operations may be performed by the APs 2001, 2002, 2003, and 2004 themselves.

A method of adjusting the inter-robot interval and formation by the AI server 200 when the robots do not depart off their unit quarter but come close to each other is described below with reference to FIG. 31.

It is assumed that the AI server 200 selects a formation to allow the robots to remain at a predetermined interval and transmits the formation to the first to fourth robots 100a-1, 100a-2, 100a-3, and 100a-4. As shown in FIG. 31, it is assumed that the first robot 100a-1 and the second robot 100a-2 do not depart off the tenth unit quarter 1610 and the eleventh unit quarter 1630 but come close to each other.

In this case, the AI server 200 may determine whether the first root 100a-1 and the second robot 100a-2 are close to each other based on location and distance signals transmitted and received between the first to fourth robots 100a-1, 100a-2, 100a-3, and 100a-4.

In other words, at least two or more of the first to fourth robots 100a-1, 100a-2, 100a-3, and 100a-4 may transmit/receive signals indicating locations and distances therebetween and measure the reception sensitivity of the signals. The reception sensitivity may be transmitted to the AI server 200 via the APs 2001, 2002, 2003, and 2004.

If the distance between the first robot 100a-1 and the second robot 100a-2 reduces as shown in FIG. 31 and, thus, the reception sensitivity of the location and distance signals exchanged between the first robot 100a-1 and the second robot 100a-2 increases, the AI server 200 may recognize the increased reception sensitivity via the first and second APs 2001 and 2002.

The AI server 200 may transmit a robot control command to each of the first and second APs 2001 and 2002 to broaden the distance between the first robot 100a-1 and the second robot 100a-2. The first and second APs 2001 and 2002 may relay the control commands to the first robot 100a-1 and the second robot 100a-2, and the first robot 100a-1 and the second robot 100a-2 may become more distant from each other until the reception sensitivity of the location and distance signals mutually transmitted/received reaches a predetermined magnitude.

As such, the AI server 200 according to an embodiment may leave the plurality of robots in the inter-robot formation while preventing the robots from escaping off a specific unit quarter using the reception sensitivity of the location and distance signals transmitted/received between the robots and the reception sensitivity of feedback signals of robot received by the APs. Thus, the plurality of robots may be prevented from straying out of their quarter and roaming around.

The above-described embodiments of the disclosure may be implemented in code that a computer may read out of a recording medium. The computer-readable recording medium includes all types of recording devices storing data readable by a computer system. Examples of the computer-readable recording medium include hard disk drives (HDDs), solid state disks (SSDs), silicon disk drives (SDDs), read-only memories (ROMs), random access memories (RAMs), CD-ROMs, magnetic tapes, floppy disks, or optical data storage devices, or carrier wave-type implementations (e.g., transmissions over the Internet). Thus, the above description should be interpreted not as limiting in all aspects but as exemplary. The scope of the disclosure should be determined by reasonable interpretations of the appended claims and all equivalents of the disclosure belong to the scope of the disclosure.

What is claimed is:

1. A device for controlling a plurality of robots deployed in a certain area to provide a service to users, the device comprising:
   communications circuitry configured to receive respective captured images of a plurality of unit quarters included in the certain area; and
   a processor configured to determine the number of the users located in each of the unit quarters based on the received images and calculate a density of the users per unit quarter,
   wherein the processor is further configured to:
   periodically measure a variation in the density per unit quarter;
   transmit a first control command for moving at least one first robot to the unit quarter where the variation has been detected to the first robot based on detecting that the variation in the density per unit quarter is not less than a predetermined threshold
   assign priorities to the unit quarters based on the density per unit quarter; and
   calculate an estimated workload of each robot based on a current workload caused by a task being currently performed by each of the plurality of robots, a location value per robot, and a density of a higher-ranking unit quarter,
   wherein the estimated workload is a sum of the current workload and a workload to be caused when each robot is deployed in a higher-density unit quarter to perform an additional task and is data for a variation in workload of each robot.

2. The device of claim 1, wherein the processor selects the highest-density unit quarter as a first peak point and selects each of unit quarters, which are a second peak point and a third peak point, in descending order from the first peak point.

3. The device of claim 2, wherein the processor:
   gathers location information for each of a first unit quarter, a second unit quarter, and a third unit quarter selected as the first peak point, the second peak point, and the third peak point, respectively, at a first time; and gathers location information for each of a fourth unit quarter, a fifth unit quarter, and a sixth unit quarter selected as the first peak point, the second peak point, and the third peak point, respectively, at a second time.

4. The device of claim 3, wherein the processor:

calculates a first location variation value and a first density variation between the first and fourth unit quarters selected as the first peak point;

calculates a second location variation value and a second density variation between the second and fifth unit quarters selected as the second peak point;

calculates a third location variation value and a third density variation between the third and sixth unit quarters selected as the third peak point; and calculates the density variation for other unit quarters than the first to sixth unit quarters.

5. The device of claim 4, wherein the processor:

calculates the first to third location variation values using Equation 1:

Euclidean($P_{i:After}, P_{i:Before}$)      [Equation 1]

wherein $P_{i:After}$ denotes a location value of a unit quarter corresponding to each ranking at the second time, and $P_{i:Before}$ denotes a location value of a unit quarter corresponding to each ranking at the first time, wherein calculates the first to third density variations using Equation 2:

$|A_{i:After} - A_{i:Before}|$      [Equation 2]

wherein $A_{i:After}$ denotes a density of a unit quarter corresponding to each ranking at the second time, and $A_{i:Before}$ denotes a density of a unit quarter corresponding to each ranking at the first time, wherein calculates a moving vector of the first to third peak points using Equation 3:

$\alpha * \Sigma_{i=1}^{n} P_i + \beta * \Sigma_{i=1}^{n} A_i$      [Equation 3]

wherein α denotes a first weight, and β denotes a second weight.

6. The device of claim 1, wherein the processor:

uses Equation 4 below to calculate the estimated workload (RL) of each robot, $$RL = \alpha * \sum_{i=1}^{n} \frac{Amp(PP_i)}{|Pos(R) - Pos(PP_i)|} + \beta * WL(R)$$      [Equation 4]

wherein α denotes a first weight, β denotes a second weight, R denotes each robot, WL denotes the current workload of the task currently being performed by the robot, PP denotes a peak point which is a unit quarter higher in density than the other unit quarters, Amp denotes the number of people in the unit quarter, including the density of the unit quarter, and Pos denotes coordinates of a location of each robot, wherein the peak point means a higher-ranking unit quarter among unit quarters labeled with rankings in descending order from the highest-density unit quarter.

7. The device of claim 6, wherein the first weight includes information for an estimated time of arrival of a transportation including an aircraft, a ship, a train, or a bus and a store located around the robot, and wherein the second weight includes information for a workload assigned to the robot depending on a kind of task that may be performed by the robot.

8. The device of claim 1, wherein the processor generates a second control command to control to allow a second robot with a lower estimated workload among the plurality of robots to move to the higher-ranking unit quarter earlier than the first robot moving in response to the first control command.

9. The device of claim 8, wherein the processor generates a third control command to control to allow a third robot currently positioned closest to the higher-ranking unit quarter, among robots moving to the higher-ranking unit quarter by the second control command, to the higher-ranking unit quarter.

10. The device of claim 1, wherein the processor applies an inequality coefficient to each of the current workload and the estimated workload to determine whether the current workload and the estimated workload are imbalanced per robot.

11. The device of claim 10, wherein the processor uses Equation 5 below to determine the imbalance:

Gini*ΣRL      [Equation 5]

wherein Gini means the inequality coefficient including an absolute workload.

12. The device of claim 11, wherein the processor generates a fourth control command to leave a fourth robot in a current location based on the estimated workload of the fourth robot is greater than a preset threshold compared with the estimated workload of the other robots.

13. The device of claim 11, wherein the processor generates a fifth control command to redeploy a fourth robot in a lower-ranking unit quarter based on the estimated workload of the fourth robot is greater than a preset threshold compared with the estimated workload of the other robots.

14. The device of claim 13, wherein the processor:

after the at least one first robot is redeployed, receives a feedback for workload from the first robot; and extracts a weight from the workload and selects a formation to be formed by the at least one first robot according to the weight.

15. The device of claim 14, wherein the processor:

learns the weight via a machine learning algorithm; and modifies the formation according to a result of the learning.

16. A method of dividing a certain area into a plurality of unit quarters and controlling a plurality of robots to be deployed in at least one or more unit quarters using a control device, the method performed by an electronic device and comprising:

receiving respective captured images of the unit quarters;

determining the number of users located in each unit quarter based on the received images;

calculating a density of the users per unit quarter;

assigning priorities to the unit quarters based on the density per unit quarter;

calculating an estimated workload of each robot based on a current workload caused by a task being currently performed by each of the plurality of robots, a location value per robot, and a density of a higher-ranking unit quarter, the estimated workload being a sum of the current workload and a workload to be caused when each robot is deployed in a higher-density unit quarter to perform an additional task and being data for a variation in workload of each robot periodically measuring a variation in the density per unit quarter;

determining whether the variation is not less than a predetermined threshold; and transmitting a first control command, for moving at least one first robot to the unit quarter where the variation has been detected, to the first robot based on that the variation is not less than the predetermined threshold.

17. The method of claim 16, wherein calculating the density of the users per unit quarter comprises:

selecting the highest-density unit quarter as a first peak point and selects each of unit quarters, which are a second peak point and a third peak point, in descending order from the first peak point, wherein periodically measuring the variation in the density per unit quarter comprises:

determining a variation in location of the first to third peak points at a first time and the first to third peak points at a second time; and calculating the variation in the density of other unit quarters than the unit quarters corresponding to the first to third peak points.

18. The method of claim 17, wherein transmitting the first control command, for moving at least one first robot to the unit quarter where the variation has been detected, to the first robot comprises:

calculating a current workload of a task being currently performed by each of the plurality of robots;

calculating coordinates of a location of each robot;

calculating a distance between the higher-ranking unit quarter and each robot; and calculating an estimated workload of each robot.

* * * * *